(12) United States Patent
Kawakami et al.

(10) Patent No.: US 10,252,774 B1
(45) Date of Patent: Apr. 9, 2019

(54) BICYCLE OPERATING DEVICE

(71) Applicant: Shimano Inc., Sakai, Osaka (JP)

(72) Inventors: Tatsuya Kawakami, Osaka (JP);
Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/794,382

(22) Filed: Oct. 26, 2017

(51) Int. Cl.
*B62M 25/04* (2006.01)
*B62K 23/06* (2006.01)

(52) U.S. Cl.
CPC ............. *B62M 25/04* (2013.01); *B62K 23/06* (2013.01); *B62M 25/045* (2013.01); *Y10T 74/20438* (2015.01)

(58) Field of Classification Search
CPC ....... B62M 25/04; B62M 25/045; B62K 3/06; Y10T 74/20438
See application file for complete search history.

(56) References Cited

U.S. PATENT DOCUMENTS

| | | | |
|---|---|---|---|
| 4,055,093 A | 10/1977 | Ross | |
| 4,267,742 A | 5/1981 | Cabeza | |
| 4,279,174 A | 7/1981 | Ross | |
| 5,577,969 A | 11/1996 | Watarai | |
| 5,653,649 A | 8/1997 | Watarai | |
| 5,970,816 A | 10/1999 | Savard | |
| 7,013,751 B2 * | 3/2006 | Hilsky | B62K 23/06 |
| | | | 16/421 |
| 7,281,489 B2 * | 10/2007 | Kawakami | B62K 23/06 |
| | | | 116/28.1 |
| 7,421,926 B2 | 9/2008 | Kawakami | |
| 9,199,688 B2 * | 12/2015 | Shahana | B62K 23/06 |
| 2005/0241430 A1 * | 11/2005 | Kawakami | B62K 23/06 |
| | | | 74/502.2 |
| 2009/0308194 A1 | 12/2009 | Shahana | |
| 2016/0059933 A1 | 3/2016 | Miki et al. | |

FOREIGN PATENT DOCUMENTS

DE        1220754 B  *  7/1966 ............ B62M 25/04

* cited by examiner

*Primary Examiner* — Patrick Cicchino
(74) *Attorney, Agent, or Firm* — Global IP Counselors, LLP

(57) ABSTRACT

A bicycle operating device includes a base member, first and second cable control bodies, first and second positioning mechanisms, an operating member and an input mechanism. The first positioning mechanism selectively maintains the first cable control body in a first predetermined position. The second positioning mechanism selectively maintains the second cable control body in a second predetermined position. The input mechanism moves the first and second cable control bodies between the first and second predetermined positions in accordance with a predetermined operation sequence having a changing point to change operation from the first cable control body to the second cable control body. The input mechanism moves the first cable control body by at least two of the first predetermined positions in a single continuous operation of the operating member. The input mechanism includes a restricting structure that prohibits movement of the first cable control body at the changing point.

17 Claims, 34 Drawing Sheets

| RD Stage | 1 (Top) | 2-6 | 7 | 8 | 9 | 10 | 11 (Low) |
|---|---|---|---|---|---|---|---|
| FD Top Stage Pull ↓ | Pull RD | Pull RD | Pull RD | Pull RD | Pull RD | Pull RD | Pull FD |
| FD Top Stage Release ↑ | Stop | Release RD | Release RD | Release RD | Release RD | Release RD | Release RD |
| FD Low Stage Pull ↓ | – | – | – | Pull RD | Pull RD | Pull RD | Stop |
| FD Low Stage Release ↑ | – | – | – | Release FD | Release RD | Release RD | Release RD |

BICYCLE OPERATING DEVICE

BACKGROUND

Field of the Invention

This invention generally relates to a bicycle operating device. More specifically, the present invention relates to a bicycle operating device that selectively controls a pair of control cables.

Background Information

Bicycles are often provided with one or more bicycle components that can be operated and/or adjusted by a rider while riding. Examples of some these bicycle components include a gear changer (e.g., a derailleur or an internally geared hub), a suspension and a seatpost. A bicycle operating device is usually provided on a bicycle (e.g., on a bicycle handlebar) for a rider to operate and/or adjust these bicycle components. Typically, a bicycle control cable interconnects the bicycle operating device to a cable operated bicycle component of the bicycle. Most conventional bicycle control cables have, for example, a tubular outer case and an inner wire that can be inserted into and passed through the outer case. The inner wire protrudes beyond both ends of the outer case and each end of the inner wire is connected to either the bicycle control device or the bicycle component. This type of bicycle control cable is often called a Bowden type of bicycle control cable. With this type of bicycle control cable, the bicycle operating device pulls and releases the inner wire of the bicycle control cable to change an operating position or state of the bicycle component.

SUMMARY

Generally, the present disclosure is directed to various features of a bicycle operating device. In one feature, a bicycle operating device is provided in which selectively controls a pair of control cables.

In view of the state of the known technology and in accordance with a first aspect of the present disclosure, a bicycle operating device is provided that basically comprises a base member, a first cable control body, a first positioning mechanism, a second cable control body, a second positioning mechanism, an operating member and an input mechanism. The first cable control body is movably mounted to the base member. The first cable control body includes a first cable attachment structure. The first positioning mechanism is operatively coupled to the first cable control body to selectively maintain the first cable control body in one of a plurality of first predetermined positions. The second cable control body is movably mounted to the base member. The second cable control body includes a second cable attachment structure. The second positioning mechanism is operatively coupled to the second cable control body to selectively maintain the second cable control body in one of a plurality of second predetermined positions. The operating member is movably arranged between an initial position and an operated position. The input mechanism operatively couples the operating member to the first and second cable control bodies to move the first cable control body between the first predetermined positions and the second cable control body between the second predetermined positions in accordance with a predetermined operation sequence. The predetermined operation sequence includes a changing point to change operation from the first cable control body to the second cable control body. The input mechanism is configured to move the first cable control body by at least two of the first predetermined positions in a single continuous operation of the operating member from the initial position to the operated position to perform a multiple movement operation. The input mechanism includes a restricting structure that is configured to prohibit movement of the first cable control body at the changing point such that the first cable control body is not moved over the changing point during the single continuous operation.

With the bicycle operating device according to the first aspect, it is possible to prevent a miss-shifting operation at the changing point during a multiple shifting operation.

In accordance with a second aspect of the present invention, the bicycle operating device according to the first aspect is configured so that the input mechanism includes a pulling pawl structure that selectively engages the first cable control body and the second cable control body, and does not change engagement between the first cable control body and the second cable control body during the single continuous operation.

With the bicycle operating device according to the second aspect, it is possible to prevent a miss-upshifting operation at the changing point during a multiple shifting operation.

In accordance with a third aspect of the present invention, the bicycle operating device according to the second aspect is configured so that the pulling pawl structure is configured to change the engagement from the first cable control body to the second cable control body in a state where the operating member returns from the operated position to the initial position at the changing point.

With the bicycle operating device according to the third aspect, it is possible to positively change a shifting object at the changing point.

In accordance with a fourth aspect of the present invention, the bicycle operating device according to the third aspect is configured so that the input mechanism includes a first cam member that changes the engagement of the pulling pawl structure from the first cable control body to the second cable control body.

With the bicycle operating device according to the fourth aspect, it is possible to automatically change a shifting object at the changing point.

In accordance with a fifth aspect of the present invention, the bicycle operating device according to the fourth aspect is configured so that the first cam member is configured to move together with the one of the first cable control body and the second cable control body as the operating member moves from the initial position to the operated position.

With the bicycle operating device according to the fifth aspect, it is possible to automatically change a shifting object at the changing point.

In accordance with a sixth aspect of the present invention, the bicycle operating device according to any one of the second to fifth aspects is configured so that the pulling pawl structure is configured to change the engagement from the first cable control body to the second cable control body at an end position of the first predetermined positions of the first cable control body.

With the bicycle operating device according to the sixth aspect, it is possible to simplify an input mechanism to change a shifting object.

In accordance with a seventh aspect of the present invention, the bicycle operating device according to any one of the first to sixth aspects is configured so that the restricting structure includes a stopper configured to stop the operation of the operating member toward the operated position at the changing point.

With the bicycle operating device according to the seventh aspect, it is possible to physically restrict movement of a first cable control body at the changing point.

In accordance with an eighth aspect of the present invention, the bicycle operating device according to the seventh aspect is configured so that the stopper includes a first abutment that abuts a part that moves together with the first operating member 30 at the changing point to prohibit movement of the first cable control body over the changing point as the operating member starts to be operated from a first predetermined point toward the changing point in the single continuous operation. The first predetermined point is adjacent to the changing point in the predetermined operation sequence.

With the bicycle operating device according to the eighth aspect, it is possible to prevent a multiple shifting operation from occurring over the changing point.

In accordance with a ninth aspect of the present invention, the bicycle operating device according to the eighth aspect is configured so that the stopper includes a second abutment that abuts a part at the changing point to prohibit movement of the first cable control body over the changing point as the operating member starts to be operated from a second predetermined point toward the changing point in the single continuous operation. The second predetermined point is away from the changing point than the first predetermined point in the predetermined operation sequence.

With the bicycle operating device according to the ninth aspect, it is possible to conduct a multiple shifting operation, but can prevent the shifting over the changing point.

In accordance with a tenth aspect of the present invention, the bicycle operating device according to the ninth aspect is configured so that the restricting structure does not restrict the operating member as the operating member starts to be operated from a third predetermined point toward the changing point during the multiple movement operation. The third predetermined point is away from the changing point than the second predetermined point in the predetermined operation sequence.

With the bicycle operating device according to the tenth aspect, it is possible to conduct at least a triple shifting operation before reaching the changing point.

In accordance with an eleventh aspect of the present invention, the bicycle operating device according to any one of the first to sixth aspects is configured so that the restricting structure includes a second cam member configured to change a position of the stopper between an abutting position and a non-abutting position.

With the bicycle operating device according to the eleventh aspect, it is possible to automatically move a restricting structure.

In accordance with a twelfth aspect of the present invention, the bicycle operating device according to the eleventh aspect is configured so that the second cam member is moved by at least one of the first cable control body and the second cable control body.

With the bicycle operating device according to the twelfth aspect, it is possible to automatically move a restricting structure in accordance with a position of one of a first cable control body and a second cable control body.

In accordance with a thirteenth aspect of the present invention, the bicycle operating device according to any one of the first to sixth aspects is configured so that the operating member is configured to release the first cable control body and the second cable control body to move in a cable release direction.

With the bicycle operating device according to the thirteenth aspect, it is possible to perform a multiple release shifting operation.

In accordance with a fourteenth aspect of the present invention, the bicycle operating device according to the thirteenth aspect is configured so that the changing point corresponds to an intermediate position of the first predetermined positions.

With the bicycle operating device according to the fourteenth aspect, it is possible to change a shifting object at an intermediate position during a releasing shifting operation.

In accordance with a fifteenth aspect of the present invention, the bicycle operating device according to any one of the first to fourteenth aspects further comprises an additional operating member movably arranged between an additional initial position and an additional operated position, and operatively coupled to the input mechanism to move the first cable control body between the first predetermined positions and the second cable control body between the second predetermined positions in accordance with the predetermined operation sequence.

With the bicycle operating device according to the fifteenth aspect, it is possible to distinguish between a pulling shifting operation and a releasing shifting operation by selecting one of an operating member and an additional operating member.

In accordance with a sixteenth aspect of the present invention, the bicycle operating device according to the fifteenth aspect is configured so that one of the operating member and the additional operating member is a cable pulling lever and the other of the operating member and the additional operating member is a cable releasing lever.

With the bicycle operating device according to the sixteenth aspect, it is possible to distinguish between a pulling shifting operation and a releasing shifting operation by selecting one of an operating member and an additional operating member.

In accordance with a seventeenth aspect of the present invention, the bicycle operating device according to any one of the first to sixteenth aspects is configured so that the first positioning mechanism includes a first positioning pawl and a first positioning ratchet. The first positioning ratchet is coupled to the first cable control body. The second positioning mechanism includes a second positioning pawl and a second positioning ratchet. The second positioning ratchet is coupled to the second cable control body.

With the bicycle operating device according to the seventeenth aspect, it is possible to prevent a miss-shifting operation at the changing point during a multiple shifting operation.

Also, other objects, features, aspects and advantages of the disclosed bicycle operating device will become apparent to those skilled in the art from the following detailed description, which, taken in conjunction with the annexed drawings, discloses preferred embodiments of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
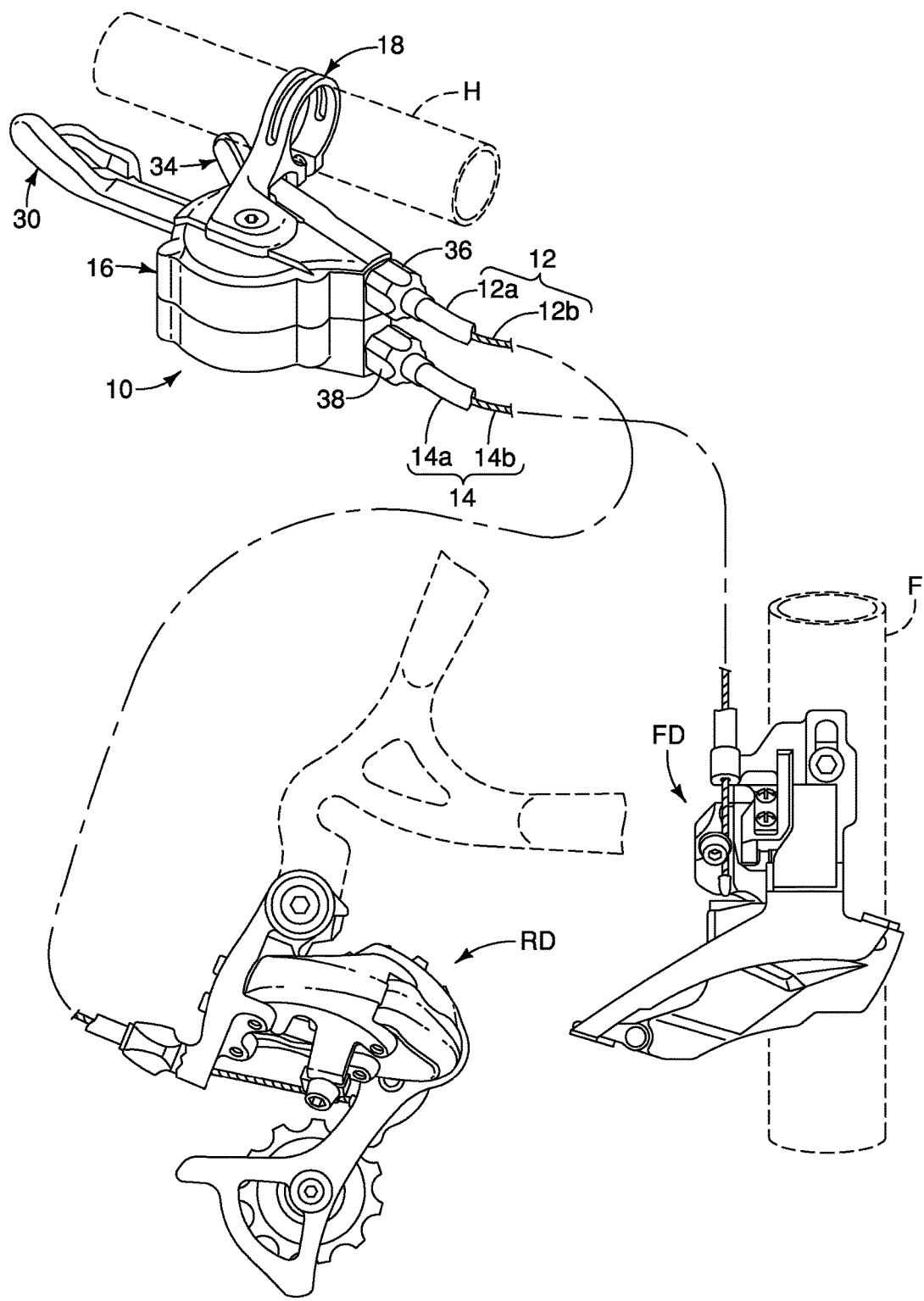
FIG. 1 is an overall system diagram of a bicycle shifting system (one example of a bicycle control system) that includes a bicycle operating device in accordance with one illustrated embodiment.

Referring initially to FIG. 1, a bicycle control system 1 is illustrated in accordance with one illustrative embodiment. In the illustrated embodiment, the bicycle control system 1 is a bicycle shifting system that includes a bicycle operating device 10, a first (rear) gear changer RD and a second (front) gear changer FD. Here, the first (rear) gear changer RD is a rear derailleur and the second (front) gear changer FD is a front derailleur. However, the first and second gear changers RD and FD are not limited to derailleurs. For example, the first (rear) gear changer RD can be an internally geared hub. Moreover, the bicycle operating device 10 can be used to operate other bicycle components (e.g., a suspension device, a height adjustable seatpost, etc.) as needed and/or desired. The bicycle operating device 10 is mounted on a bicycle handlebar H so as to be operated by rider's right hand. However, the bicycle operating device 10 can be configured to be mounted on the bicycle handlebar H so as to be operated by rider's left hand as needed and/or desired. The first and second gear changers RD and FD are mounted to a bicycle F in a conventional manner.

As seen in FIG. 1, the bicycle operating device 10 is operatively coupled to the first gear changer RD by a first control cable 12. The first control cable 12 is a conventional bicycle operating cable that has an outer case 12a covering an inner wire 12b. In other words, the first control cable 12 is a Bowden type cable in which the inner wire 12b is slidably received within the outer case 12a. The bicycle operating device 10 operates the first gear changer RD by selectively pulling and releasing the inner wire 12b. Similar, the bicycle operating device 10 is operatively coupled to the second gear changer FD by a second control cable 14. The second control cable 14 is a conventional bicycle operating cable that has an outer case 14a covering an inner wire 14b. In other words, the second control cable 14 is a Bowden type cable in which the inner wire 14b is slidably received within the outer case 14a. The bicycle operating device 10 operates the second gear changer FD by selectively pulling and releasing the inner wire 14b. Since the first and second gear changers RD and FD are well known bicycle components, the first and second gear changers RD and FD will not be discussed and/or illustrated in detail herein.

Figures 2, 3:
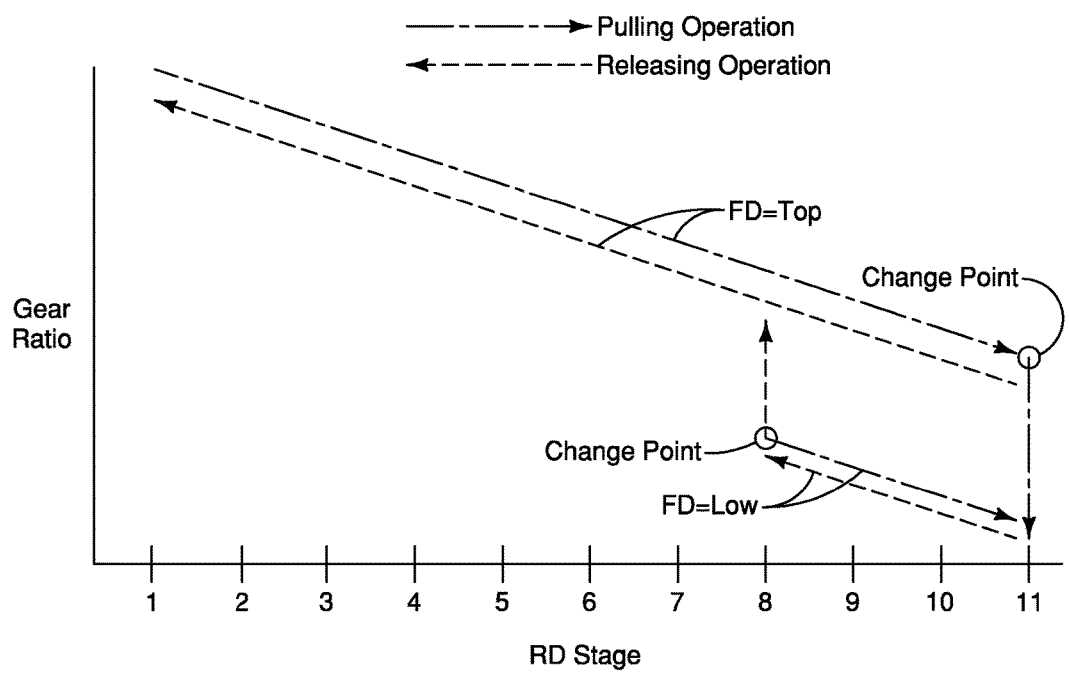
FIG. 2 is a shift sequence table indicating a shifting sequence of a rear derailleur and a front derailleur using the bicycle operating device illustrated in FIG. 1 to shift both the rear derailleur and the front derailleur.
FIG. 3 is a shift sequence graph correlating a gear ratio of the rear derailleur and the front derailleur with respect to a gear stage of the rear derailleur that uses the bicycle operating device illustrated in FIG. 1 to shift both the rear derailleur and the front derailleur.
Figure 4:
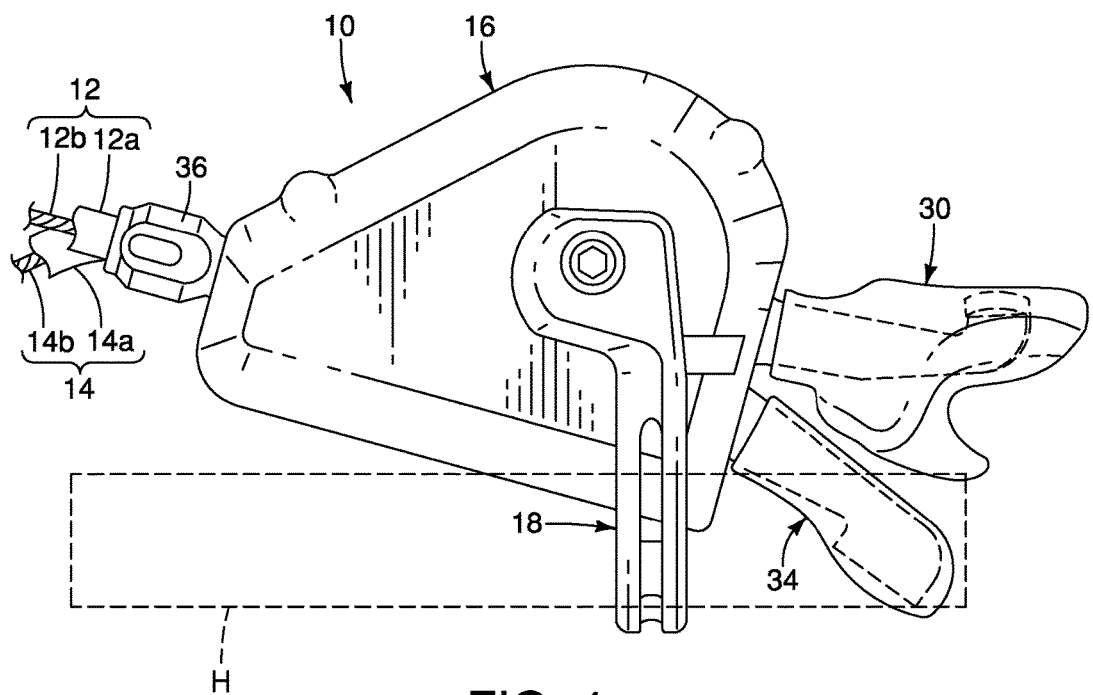
FIG. 4 is an enlarged top plan view of a right end of a bicycle handlebar that is equipped with the bicycle operating device illustrated in FIG. 1.

Referring now to FIGS. 1 to 7, the bicycle operating device 10 will now be discussed in more detail. Basically, the bicycle operating device 10 is configured to control two cable operated bicycle components in a prescribed sequence. As seen in FIGS. 1 and 2, the bicycle operating device 10 comprises a housing 16 and a handlebar clamp 18. Here, for example, the housing 16 has a two-piece construction (i.e., upper and lower housing parts) that is fastened together by a plurality of screws (not shown). The housing parts are hard rigid members constructed of a suitable material such as a hard plastic or a lightweight metal. However, the housing 16 can have a variety of configurations as needed and/or desired. As seen in FIG. 1, the handlebar clamp 18 is detachably coupled to the upper housing part of the housing 16. The handlebar clamp 18 is a conventional tube clamp that constitutes an example of a handlebar mounting member. Here, the handlebar clamp 18 includes a tightening bolt or other tightening member that is configured to squeeze the handlebar clamp 18 onto the handlebar H.

As seen in FIGS. 2 to 7, in the illustrated embodiment, the bicycle operating device 10 comprises a base member 20, a first cable control body 22, a second cable control body 24, a first positioning mechanism 26, a second positioning mechanism 28, a first operating member 30 and an input mechanism 32. In the illustrated embodiment, the bicycle operating device 10 further comprises an additional or second operating member 34.

The base member 20 is enclosed inside the housing 16. The base member 20 is a rigid support structure that movably supports the first and second cable control bodies 22 and 24, the first and second positioning mechanisms 26 and 28, and the first and second operating members 30 and 34. The first and second control cables 12 and 14 are coupled to the base member 20 by a pair of control cable barrel adjusters 36 and 38. Here, the first and second cable control bodies 22 and 24 are pivotally mounted to the base member 20 by a main axle 40 (e.g., a bolt in the illustrated embodiment). As discussed below, parts of the first and second positioning mechanisms 26 and 28 are pivotally mounted to the base member 20 by the main axle 40. Also, a part of the first operating member 30 is pivotally mounted to the base member 20 by the main axle 40. Finally, the second operating member 34 is pivotally mounted to the base member 20 by the main axle 40.

The main axle 40 has a center longitudinal axis that defines a main operating axis A1 of the first and second cable control bodies 22 and 24. Rotation of the first cable control body 22 in a first direction D1 releases the inner wire 12b of the first control cable 12 from the housing 16. On the other hand, rotation of the first cable control body 22 in a second direction D2 pulls the inner wire 12b of the first control cable 12 into the housing 16. The first and second directions D1 and D2 are opposite rotational directions with respect to the main operating axis A1. Similarly, the second cable control body 24 rotates in the first direction D1 to release the inner wire 14b of the second control cable 14 from the housing 16. On the other hand, rotation of the second cable control body 24 in the second direction D2 pulls the inner wire 14b of the second control cable 14 into the housing 16.

As explained below, the first and second operating members 30 and 34 are operatively coupled to the first and second cable control bodies 22 and 24 to change predetermined positions of the first and second cable control bodies 22 and 24 relative to the base member 20 via the first and second positioning mechanisms 26 and 28. In the illustrated embodiment, the predetermined positions of the first cable control body 22 correspond to predetermined gear stages of the first gear changer RD, while the predetermined positions of the second cable control body 24 correspond to predetermined gear stages of the second gear changer FD. Here, the first gear changer RD has eleven predetermined gear stages, while the second gear changer FD has two predetermined gear stages (a low position and a top position). However, the bicycle operating device 10 can be reconfigured to operate a pair of gear changers have different numbers of predetermined gear stages.

As seen in FIGS. 1 to 7, the first and second operating members 30 and 34 and the first and second cable control bodies 22 and 24 are in rest positions. The term "rest position" as used herein refers to a state in which the part (e.g., the first operating member 30) remains stationary without the need of a user holding the part in that state corresponding to the rest position. As explained below, the first and second operating members 30 and 34 are each movably arranged to be moved by a user from an initial position to an operated position. The terms "operated position" and "actuated position" as used herein refer to a state in which the part (e.g., the first operating member 30) is temporarily held by an external force (e.g., a user holding the part in a state corresponding to the operated position). In the illustrated embodiment, the initial positions of the first and second operating members 30 and 34 correspond to rest positions.

Figure 8:
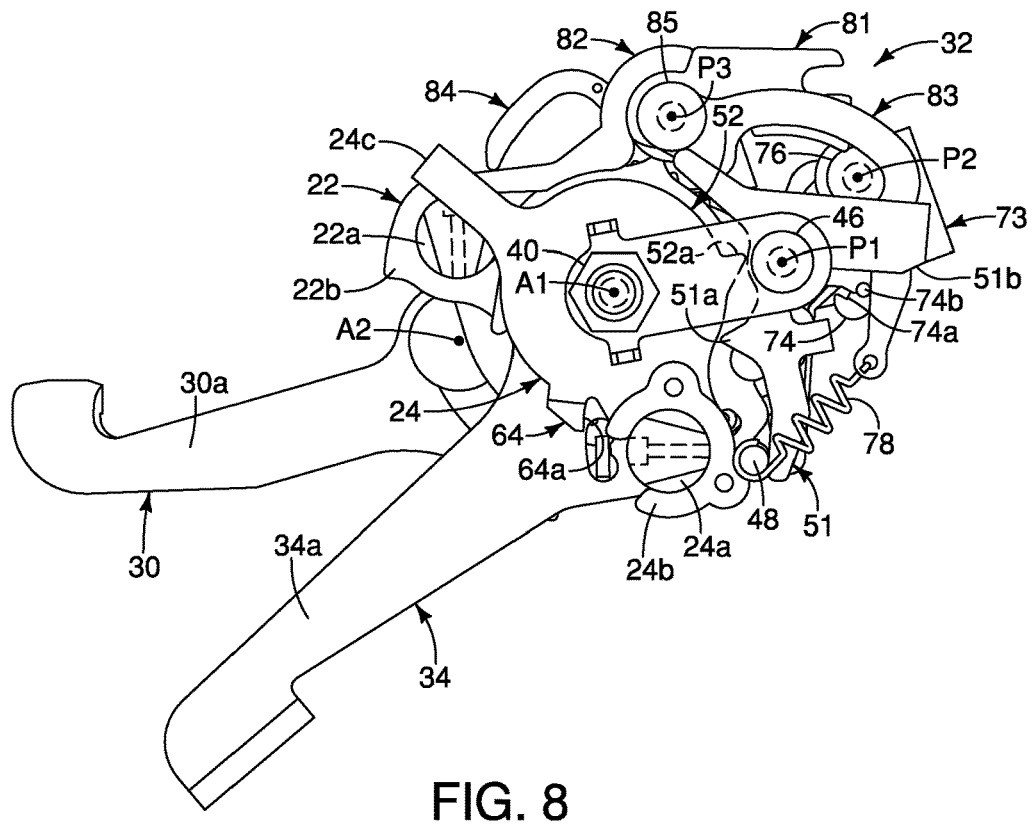
FIG. 8 is a bottom plan view of the selected internal parts of the bicycle operating device illustrated in FIG. 7 with a first cable control body in a fully pulled position (low position or eleventh gear stage) and a second cable control body in a fully released position (top position)
Figure 11:
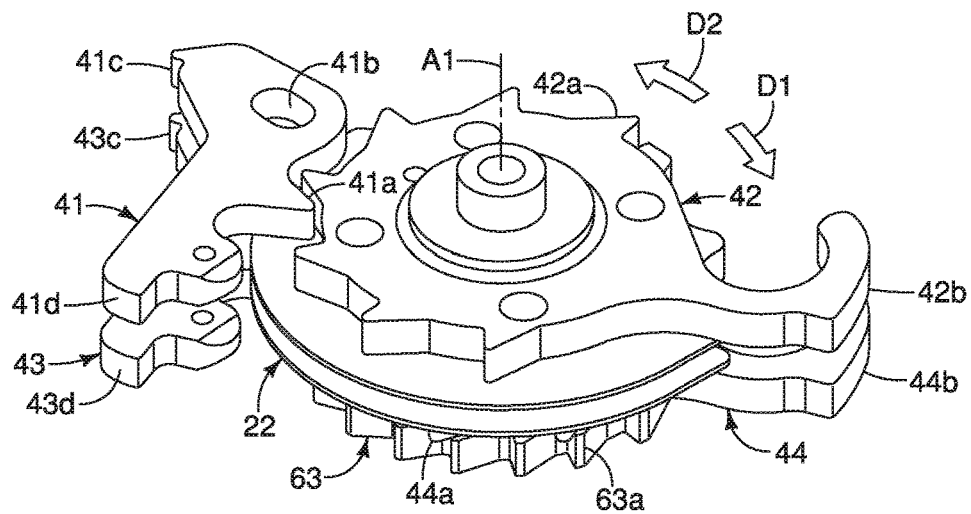
FIG. 11 is a perspective view of selected internal parts of the bicycle operating device illustrated in FIGS. 1 and 4 to 9 that form a first positioning mechanism for the first cable control body.
Figure 12:
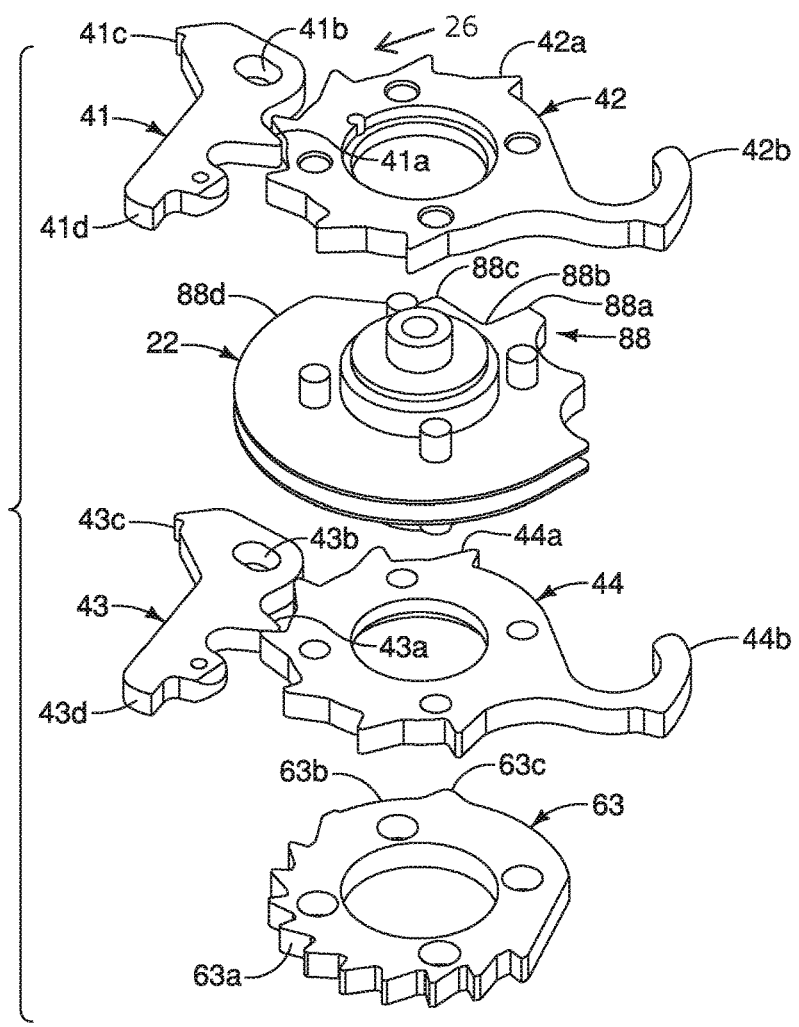
FIG. 12 is an exploded perspective view of the selected internal parts of the bicycle operating device illustrated in FIG. 11 that form the first positioning mechanism for the first cable control body.

Referring to FIGS. 8, 11 and 12, the first cable control body 22 will now be discussed. The first cable control body 22 is also referred to as a wire take-up member that is attached to one end of the inner wire 12b of the first control cable 12. The first cable control body 22 is movably mounted to the base member 20. The first cable control body 22 includes a first cable attachment structure 22a. The first cable attachment structure 22a is removably attached to a mounting part 22b of the first cable control body 22. The mounting part 22b is rotatably mounted on the main axle 40. However, as will become apparent from this disclosure, the first cable control body 22 does not rotate a full three hundred and sixty degrees about the main operating axis A1. The mounting part 22b is generally a spool shaped member with a cable receiving groove on its peripheral edge.

Figure 6:
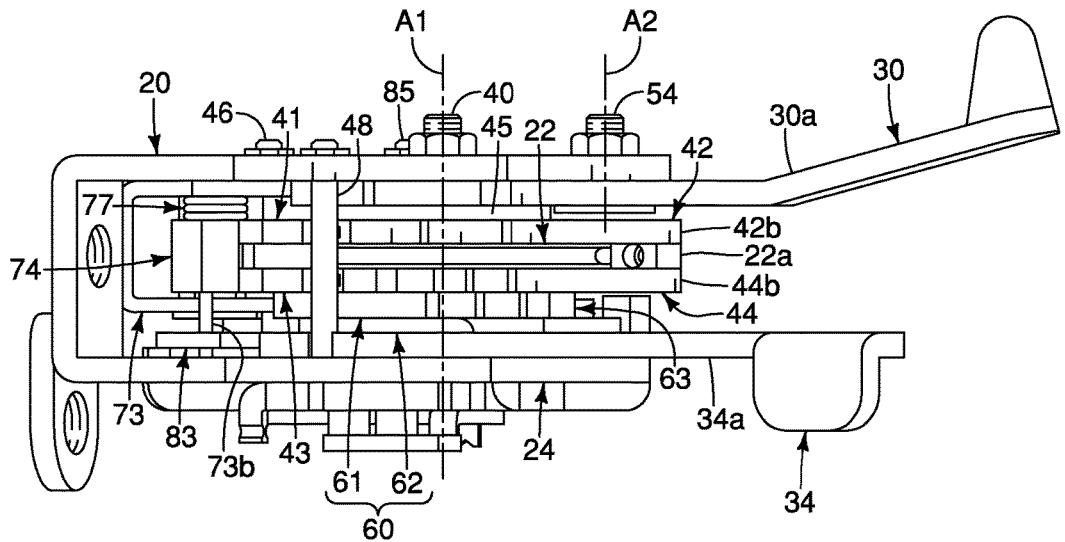
FIG. 6 is a side elevational view of the internal parts of the bicycle operating device illustrated in FIG. 5.
Figure 7:
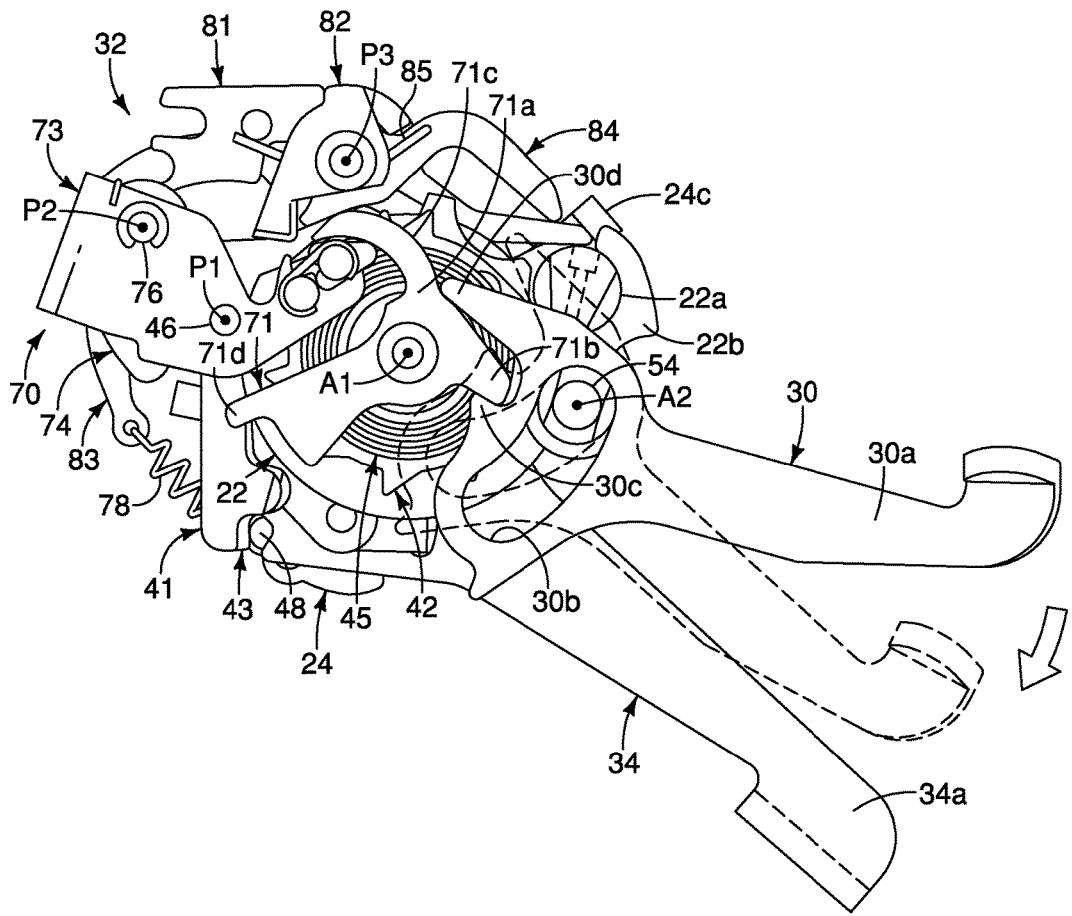
FIG. 7 is a top plan view of selected internal parts of the bicycle operating device illustrated in FIGS. 1 and 4 to 6.

Referring to FIGS. 6 to 8, the second cable control body 24 will now be discussed. The second cable control body 24 is also referred to as a wire take-up member that is attached to one end of the inner wire 14b of the second control cable 14. The second cable control body 24 is movably mounted to the base member 20. The second cable control body 24 includes a second cable attachment structure 24a. The second cable attachment structure 24a is removably attached to a mounting part 24b of the second cable control body 24. The mounting part 22b is rotatably mounted on the main axle 40. However, as will become apparent from this disclosure, the second cable control body 24 does not rotate a full three hundred and sixty degrees about the main operating axis A1.

Referring mainly to FIGS. 11 and 12, the first positioning mechanism 26 will now be discussed. The first positioning mechanism 26 is operatively coupled to the first cable control body 22 to selectively maintain the first cable control body 22 in one of a plurality of first predetermined positions. The first positioning mechanism 26 includes a first positioning pawl 41 and a first positioning ratchet 42. In the illustrated embodiment, the first positioning mechanism 26 further includes an additional first positioning pawl 43 and an additional first positioning ratchet 44. However, it will be apparent that the additional first positioning pawl 43 and the additional first positioning ratchet 44 can be omitted if fewer first predetermined positions are needed and/or desired.

The first positioning ratchet 42 is coupled to the first cable control body 22. Likewise, the additional first positioning ratchet 44 is coupled to the first cable control body 22. Here, the first positioning ratchets 42 and 44 are fixed to the first cable control body 22 so that the first cable control body 22 and the first positioning ratchets 42 and 44 are rotatably mounted to rotate together as unit about the main operating axis A1. However, one or both of the first positioning ratchets 42 and 44 can be integrally formed as a one-piece member with the first cable control body 22 if needed and/or desired.

Figure 5:
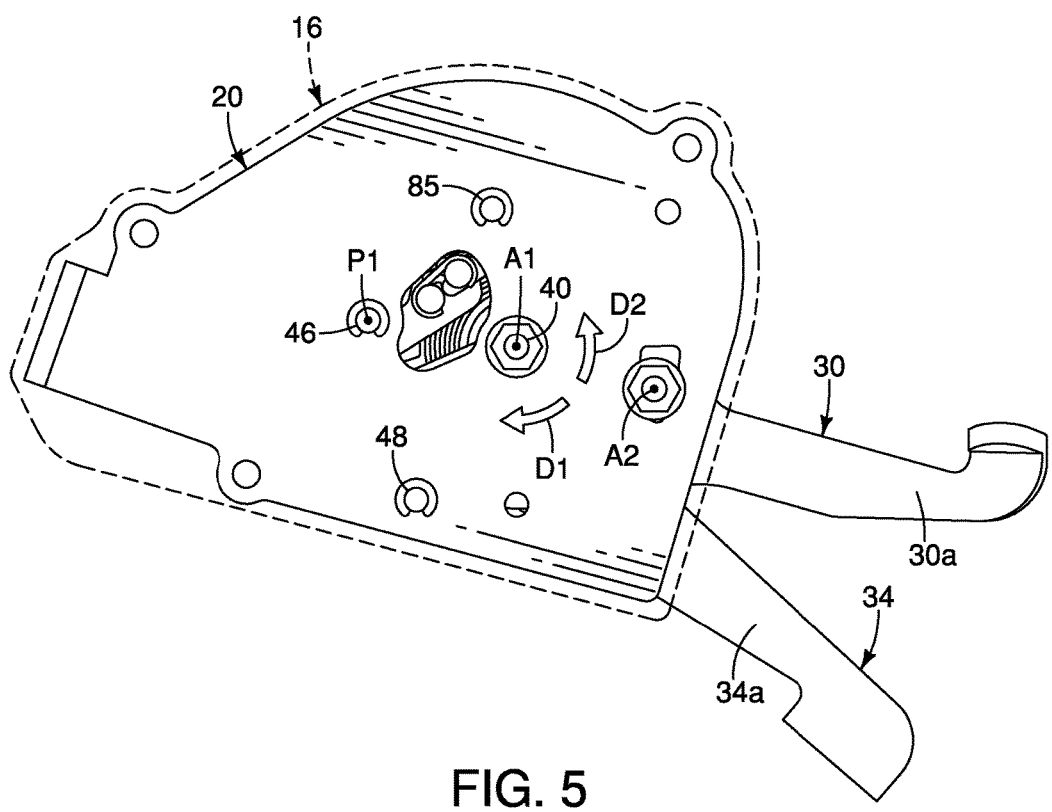
FIG. 5 is an enlarged top plan view of the bicycle operating device illustrated in FIGS. 1 and 4 with a housing of the bicycle operating device removed to reveal internal parts of the bicycle operating device.

A biasing element 45 (see FIG. 7) is provided between the first positioning ratchet 42 and the base member 20 to bias the first cable control body 22 and the first positioning ratchets 42 and 44 in the first direction D1 about the main operating axis A1. As shown in FIG. 5, the biasing element 45 can be a flat torsion spring that is coiled around the main axle 40 with a first free end engaged with a hole in the first positioning ratchet 42 and a second end contacting an abutment on the base member 20. The first positioning ratchet 42 has a plurality of first positioning teeth 42a and a cable attachment hook 42b, while the additional first positioning ratchet 44 has a plurality of additional first positioning teeth 44a and an additional cable attachment hook 44b. The first positioning teeth 42a are offset from the additional first positioning teeth 44a about the main operating axis A1 so that the first positioning teeth 42a and 44a alternate about the main operating axis A1.

The first positioning pawls 41 and 43 are each movably arranged between a holding position and a non-holding position. In particular, the first positioning pawl 41 is pivotally mounted on a pivot shaft 46 that is attached to the base member 20. The pivot shaft 46 defines a first pivot axis P1 that is parallel to the operating axes A1 and A2. In the holding position, the first positioning pawl 41 engages one of the first positioning teeth 42a of the first positioning ratchet 42 to hold the first cable control body 22 and the first positioning ratchets 42 and 44 from rotating with respect to the base member 20. In the non-holding position, the first positioning pawl 41 is disengaged from the first positioning teeth 42a of the first positioning ratchet 42 to release the first cable control body 22 and the first positioning ratchets 42 and 44 for rotating with respect to the base member 20. Likewise, the additional first positioning pawl 43 is pivotally mounted on the pivot shaft 46. In the holding position, the additional first positioning pawl 43 engages one of the additional first positioning teeth 44a of the additional first positioning ratchet 44 to hold the first cable control body 22 and the first positioning ratchets 42 and 44 from rotating with respect to the base member 20. In the non-holding position, the additional first positioning pawl 43 is disengaged from the first positioning teeth 44a of the additional first positioning ratchet 44 to release the first cable control body 22 and the first positioning ratchets 42 and 44 for rotating with respect to the base member 20. As explained later, the first positioning pawls 41 and 43 are biased towards engagement with the first positioning ratchets 42 and 44, respectively.

The first positioning pawl 41 has a first stop tooth 41a that engages one of the first positioning teeth 42a of the first positioning ratchet 42 to hold the first cable control body 22 while in the holding position. The first positioning pawl 41 has a mounting slot 41b that receives the pivot shaft 46. The mounting slot 41b is elongated so that the first positioning pawl 41 can both pivot and move laterally on the pivot shaft 46. The first positioning pawl 41 further has a first abutment 41c that is hooked during a cable releasing operation to pivot and/or laterally shift the first positioning pawl 41 with respect to the first positioning ratchet 42. The first positioning pawl 41 also has a first abutment 41d that contacts a stop pin 48 of the base member 20.

The additional first positioning pawl 43 has an additional first stop tooth 43a that engages one of the first positioning teeth 44a of the additional first positioning ratchet 44 to hold the first cable control body 22 while in the holding position. The additional first positioning pawl 43 has an additional mounting slot 43b that receives the pivot shaft 46. The mounting slot 43b is elongated so that the additional first positioning pawl 43 can both pivot and move laterally on the pivot shaft 46. The additional first positioning pawl 43 further has an additional first abutment 43c that is hooked during a cable releasing operation to pivot and/or laterally shift the additional first positioning pawl 43 with respect to the first positioning ratchet 44. The additional first positioning pawl 43 also has an additional first abutment 43d that contacts the stop pin 48 of the base member 20.

The additional first positioning teeth 44a of the additional first positioning ratchet 44 are angularly offset from the first positioning teeth 42a of the first positioning ratchet 42 with respect to the main operating axis A1. In this way, the first positioning pawls 42 and 44 alternately engaged with the first positioning ratchets 42 and 44 to prevent rotation of the first cable control body 22. In other words, when the first positioning pawl 41 is engaged with one of the first positioning teeth 42a of the first positioning ratchet 42, the additional first positioning pawl 43 is not engaged with one of the additional first positioning teeth 44a of the additional first positioning ratchet 44. Likewise, when the additional first positioning pawl 43 is engaged with one of the additional first positioning teeth 44a of the additional first positioning ratchet 44, the first positioning pawl 41 is not engaged with one of the first positioning teeth 42a of the first positioning ratchet 42.

Referring to FIGS. 6 and 7, the second positioning mechanism 28 will now be discussed. The second positioning mechanism 28 is operatively coupled to the second cable control body 24 to selectively maintain the second cable control body 24 in one of a plurality of second predetermined positions. Preferably, a biasing member (not shown) is provided to bias the second cable control body 24 in the first direction D1 (a cable releasing direction) towards the top position about the main operating axis A1. The second positioning mechanism 28 includes a second positioning pawl 51 and a second positioning ratchet 52. Here, the second positioning pawl 51 has a second stop tooth 51a and the second positioning ratchet 52 has a second positioning tooth 52a. The second positioning pawl 51 is pivotally mounted on the pivot shaft 46. The second positioning ratchet 52 is coupled to the second cable control body 24. The second positioning tooth 52a of the second positioning ratchet 52 is disposed on a peripheral edge of the mounting part 24b of the second cable control body 24. Thus, in the illustrated embodiment, the second positioning ratchet 52 is integrally formed as a part of the second cable control body 24. In other words, the mounting part 24b of the second cable control body 24 and the second positioning ratchet 52 are the same part in the illustrated embodiment. However, the second positioning ratchet 52 can be a separate part that is at least fixed to the second cable control body 24 with respect to the rotational direction about the main operating axis A1.

Figure 9:
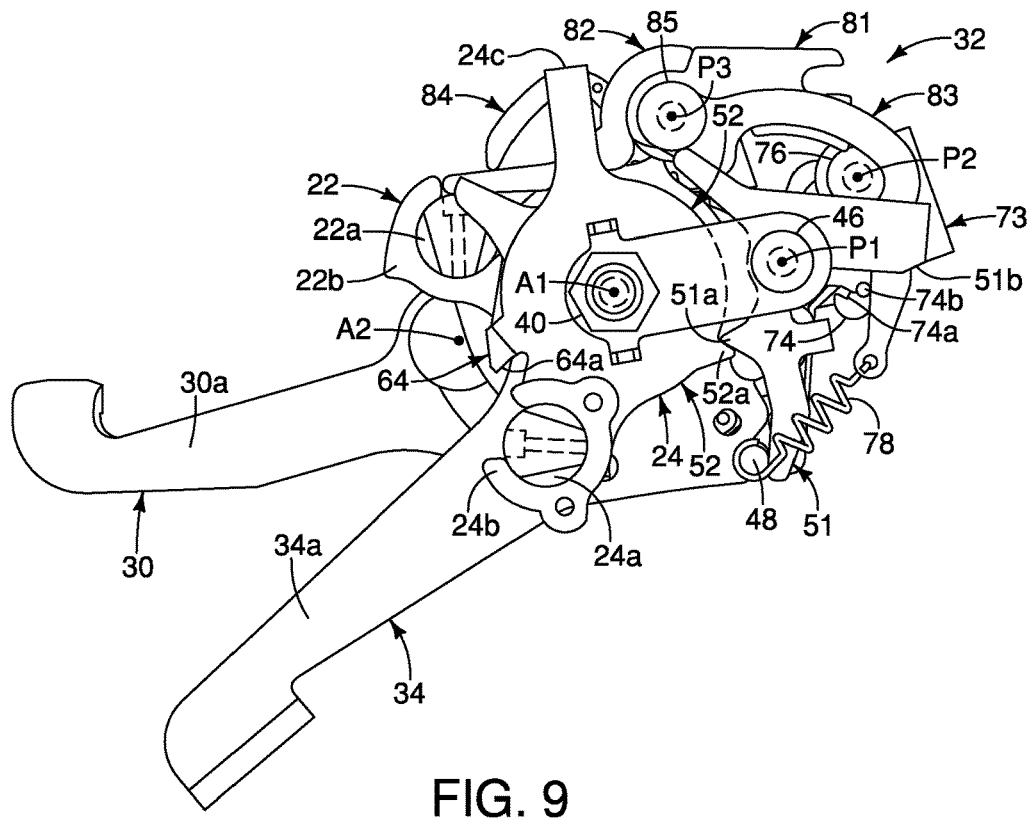
FIG. 9 is a bottom plan view of the selected internal parts of the bicycle operating device illustrated in FIGS. 7 and 8 with the first cable control body in a fully released position (top position or first gear stage) and a second cable control body in a fully released position (low position)
Figure 10:
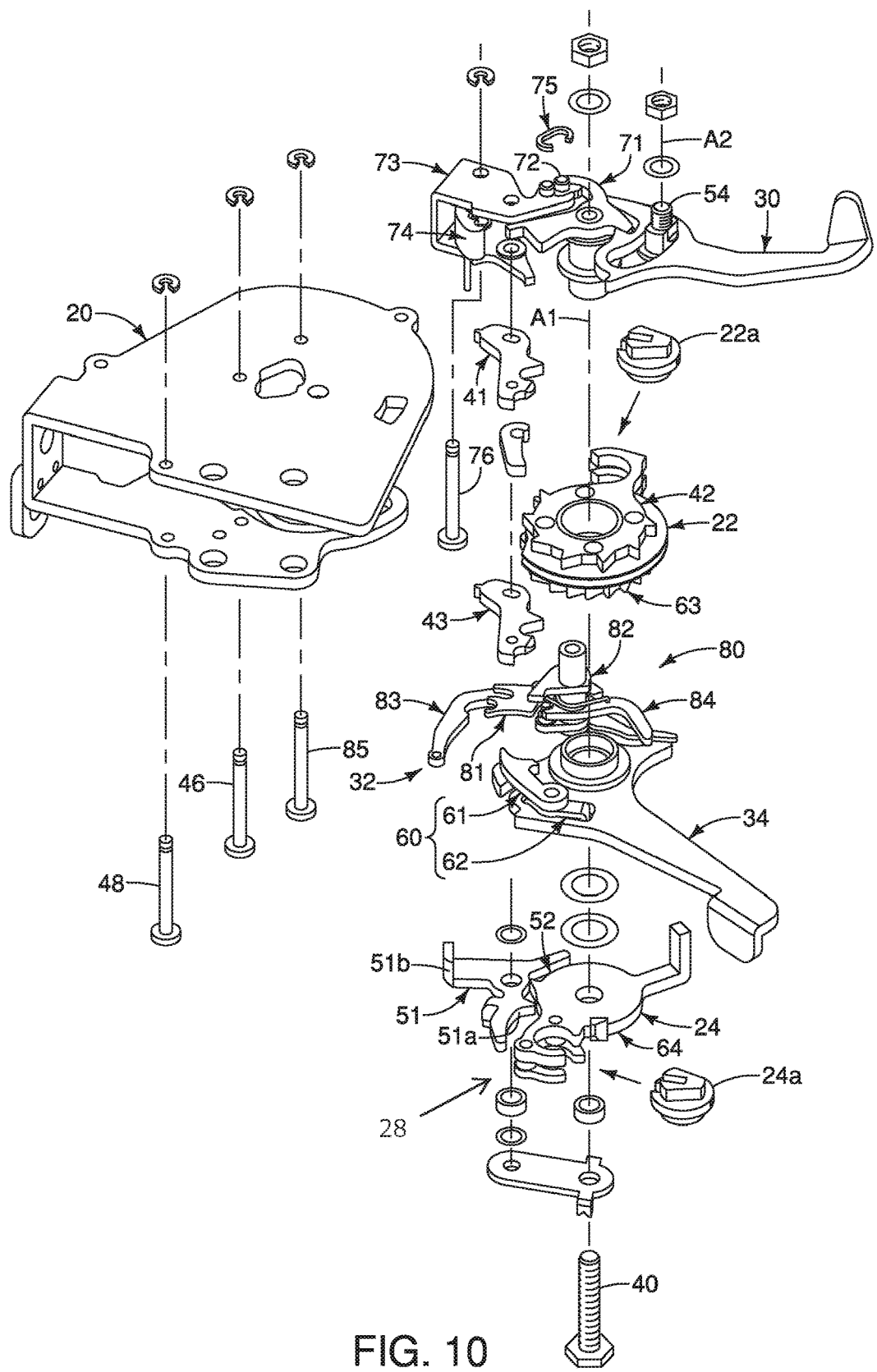
FIG. 10 is an exploded perspective view of the selected internal parts of the bicycle operating device illustrated in FIGS. 7 to 9.

The second stop tooth 51a of the second positioning pawl 51 engages the second positioning tooth 52a of the second positioning ratchet 52 to hold the second cable control body 24 in the low position or the low gear stage as seen in FIG. 9. When the second positioning pawl 51 is pivoted away from the second positioning ratchet 52, the second stop tooth 51a disengages the second positioning tooth 52a to release the second cable control body 24 to the top position or the top gear stage as seen in FIG. 9. Since the second cable control body 24 has only two of the second predetermined positions in the illustrated embodiment, the second positioning ratchet 52 has only one positioning tooth. If the second cable control body 24 had three or more of the second predetermined positions, then the second positioning ratchet 52 would be provided with more than one second positioning tooth.

The first cable control body 22, the second cable control body 24, the first positioning mechanism 26, and the second positioning mechanism 28 collectively define a cable position maintaining mechanism that selectively positions the inner wires 12b and 14b by pulling and releasing the inner wires 12b and 14b with respect to the housing 16. The housing 16 covers the cable position maintaining mechanism of the bicycle operating device 10. On the other hand, user portions of the first and second operating members 30 and 34 extend out of the housing 16 for operating the cable position maintaining mechanism to change the gear ratio between the first and second gear changers RD and FD.

Referring to FIGS. 2 to 9, the first operating member 30 and the second or additional operating member 34 will now be discussed. The first operating member 30 has a user operated portion 30a projects outside of the housing 16 for a user to operate the first operating member 30. The first operating member 30 can be operated by a user such that the first operating member 30 pivots about the main operating axis A1 or a secondary operating axis A2 that is parallel to the main operating axis A. In particular, the first operating member 30 is movably mounted to the base member 20 by a mounting bolt 54 that defines the secondary operating axis A2 of the first operating member 30. The first operating member 30 has an arcuate slot 30b that receives the mounting bolt 54 so that the first operating member 30 pivots about the main operating axis A1. The first operating member 30 has a first projection 30c and a second projection 30d, which are engaged with the input mechanism 32 as discussed later.

One of the first operating member 30 and the additional or second operating member 34 is a cable pulling lever and the other of the operating member and the additional or second operating member 34 is a cable releasing lever. In the illustrated embodiment, the first operating member 30 is a cable releasing lever that is movably supported by the base member 20 and projects outside of the housing 16 for a user to operate the free end of the cable releasing lever. Thus, the first operating member 30 constitutes a user operated releasing member or lever that releases the inner wires 12b and 14b from the housing 16. In the illustrated embodiment, the second or additional operating member 34 is a cable pulling lever that is movably supported by the base member 20 and projects outside of the housing 16 for a user to operate the free end of the cable pulling lever. Thus, the second or additional operating member 34 constitutes a user operated pulling member or lever that pulls the inner wires 12b and 14b into the housing 16.

Figure 13:
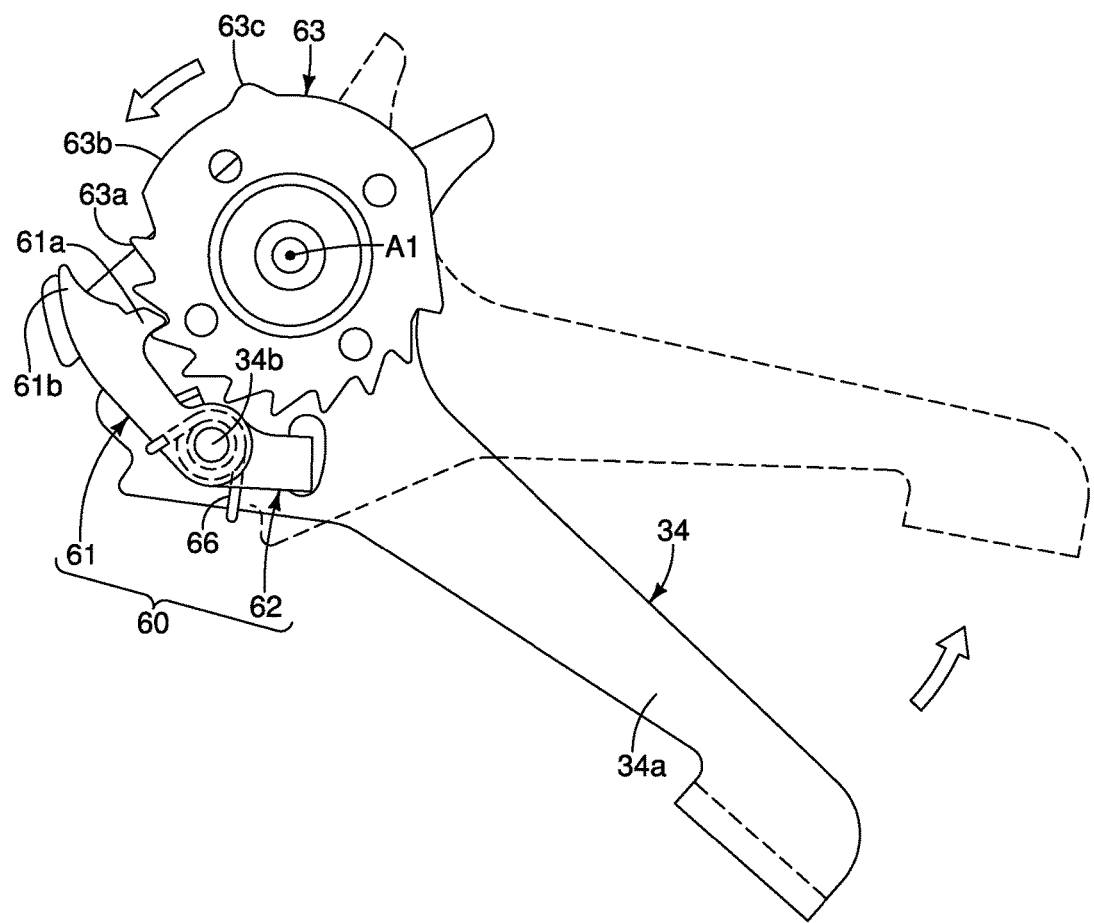
FIG. 13 is a top plan view of selected internal parts of the bicycle operating device illustrated in FIGS. 1 and 4 to 9 that form a cable pulling mechanism for the first and second cable control bodies (not shown)
Figure 17:
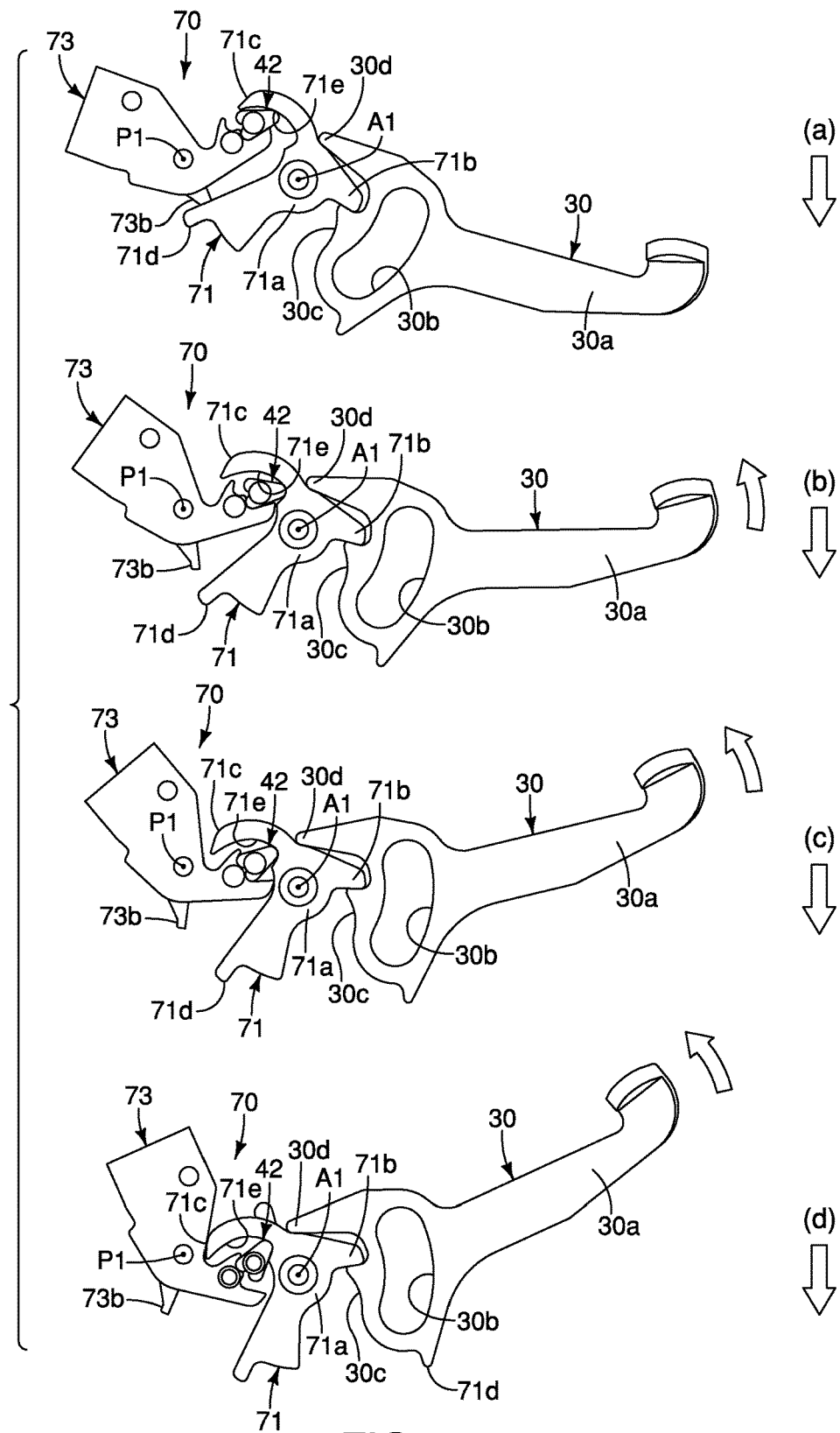
FIG. 17 is a series of top plan views of selected internal parts of the bicycle operating device illustrated in FIGS. 1 and 4 to 9 showing a cable releasing operation.
Figure 18:
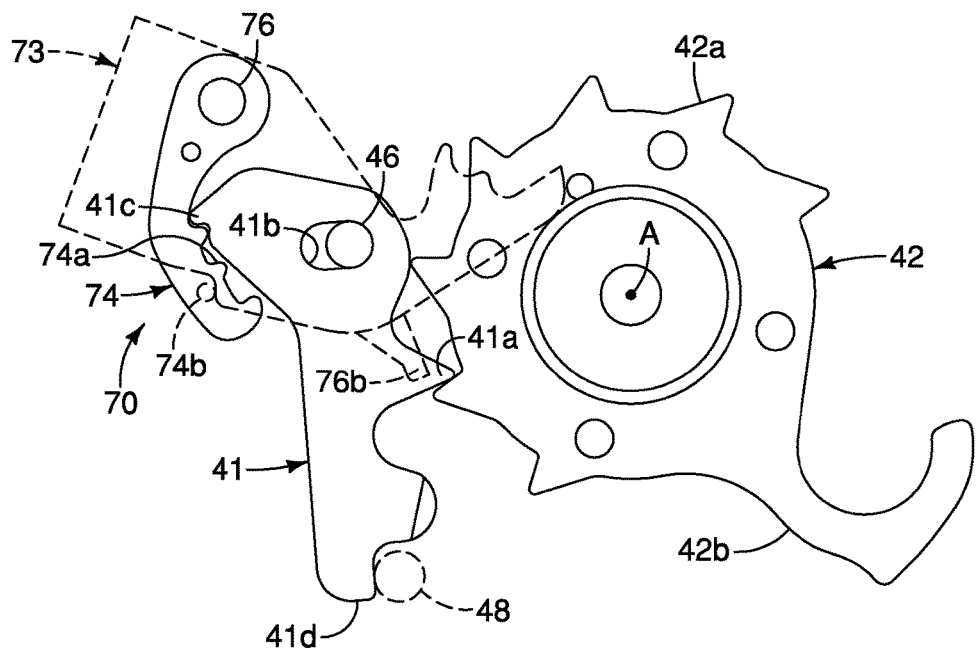
FIG. 18 is a pair of top plan view of selected parts of a first positioning mechanism for the bicycle operating device illustrated in FIGS. 1 and 4 to 9 showing the first positioning mechanism in an initial or rest position prior to operation of the release lever.
Figure 18:
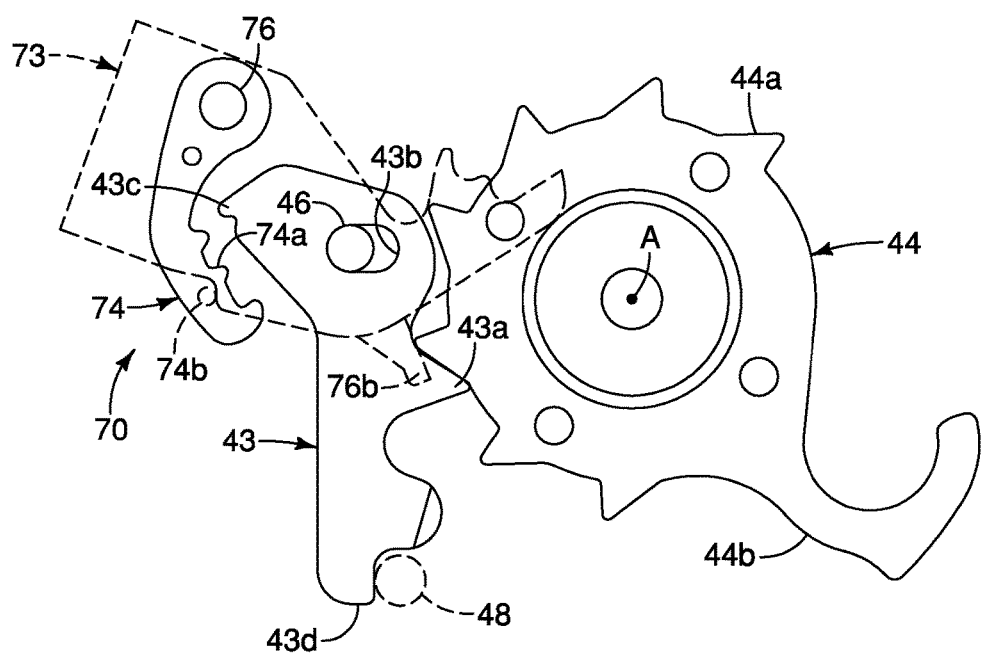
Figure 19:
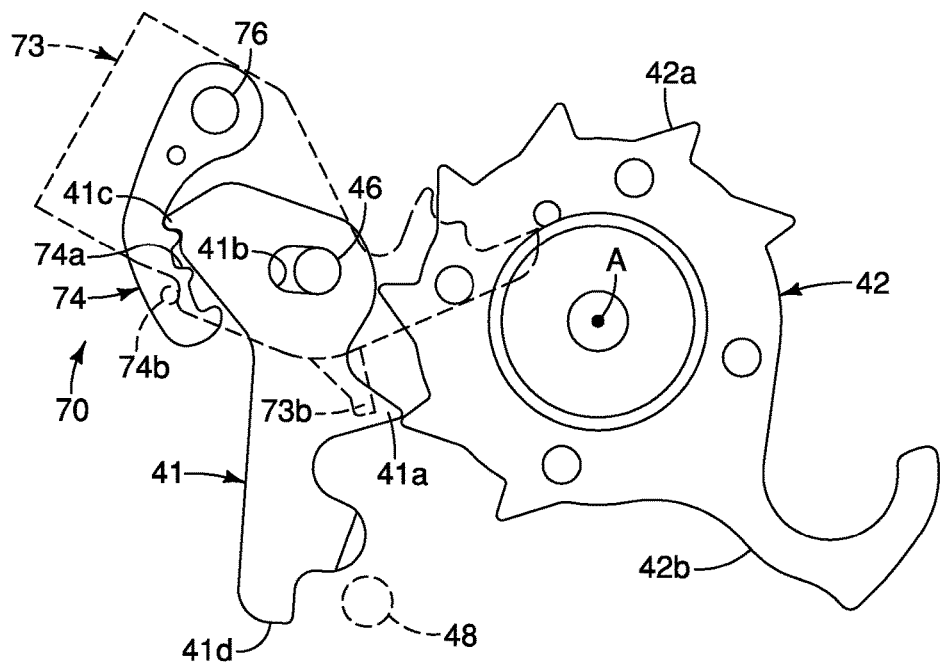
FIG. 19 is a pair of top plan views of the selected parts of the first positioning mechanism illustrated in FIG. 18, but showing a start of releasing action for the first positioning mechanism as a result of the release lever (not shown) being moved from the rest position to a partially shifted position which causes one of the first positioning pawls to move from a holding position towards a releasing position away from one of the first positioning ratchets.
Figure 19:
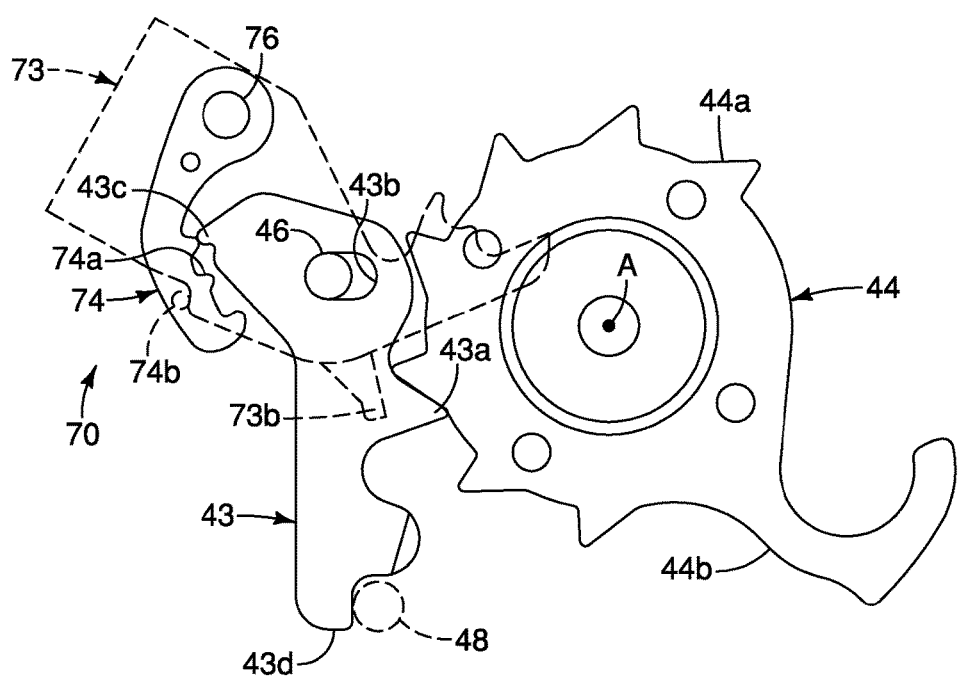
Figure 20:
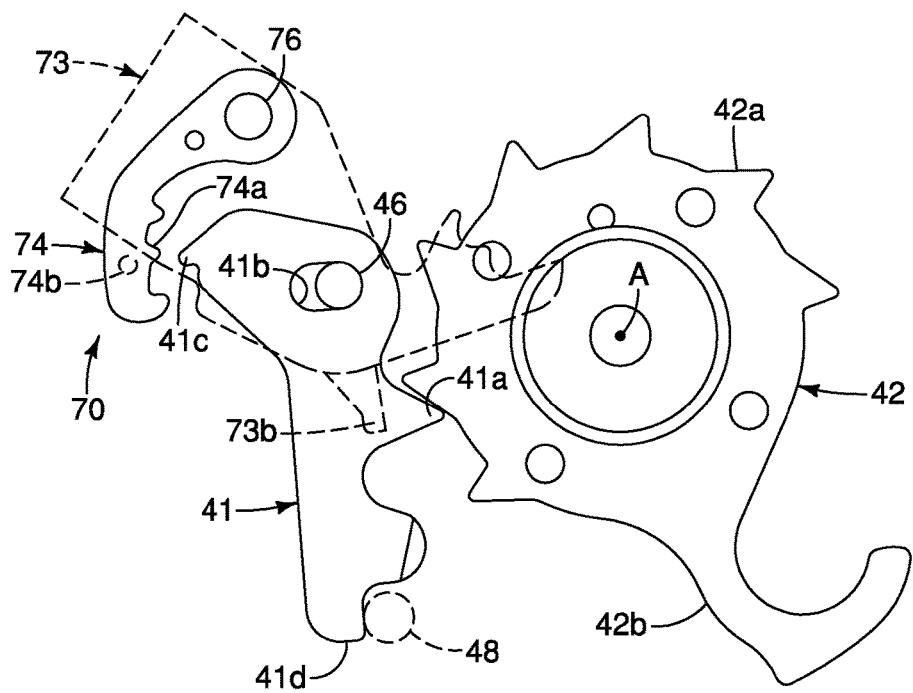
FIG. 20 is a pair of top plan views of the selected parts of the first positioning mechanism illustrated in FIGS. 18 and 19, but showing the first positioning mechanism fully moved causing the one of the first positioning pawls to release the first control body by one gear stage or position and the other one of the first positioning pawls to move to a holding position to hold the first control body in the next gear stage or position as a result of the release lever (not shown) being moved further from the partially shifted position of FIG. 19.
Figure 20:
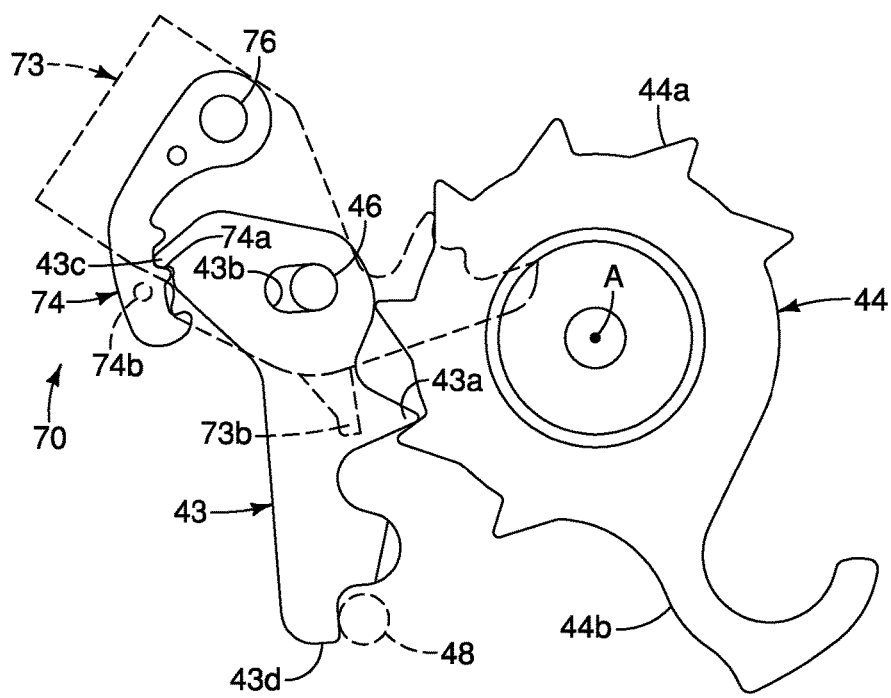

Referring to FIGS. 7 and 17, the first operating member 30 is movably arranged between an initial position (shown in solid lines in FIG. 7 and view (a) of FIG. 17) and an operated position (shown in broken lines in FIG. 13 and views (b) to (d) of FIG. 17). Here, the first operating member 30 can be operated in either direction as seen in FIGS. 7 and 17 with respect to the housing 16 from the rest position to perform a cable releasing operation as explained later. Of course, alternatively, the first operating member 30 can be configured such that the first operating member 30 can be pivoted in only one direction to perform a cable releasing operation. The first operating member 30 is configured to release the first cable control body 22 and the second cable control body 24 to move in the cable release direction D1. The first operating member 30 is operatively coupled to the input mechanism 32 to move the first cable control body 22 between the first predetermined positions and the second cable control body 24 between the second predetermined positions in accordance with the predetermined operation sequence.

Referring to FIGS. 13 and 17, the second or additional operating member 34 is pivotally mounted to the base member 20 by the main axle 40 to pivot about the main operating axis A1. In this way, the second or additional operating member 34 is movably arranged between an additional initial position (shown in solid lines in FIG. 13) and an additional operated position (shown in broken lines in FIG. 13). Preferably, the additional operating member 34 is biased in the first direction D1 to the additional initial position (i.e., a rest position) by a biasing element (not shown) such that the additional operating member 34 is a trigger lever. The additional operating member 34 is operatively coupled to the input mechanism 32 to move the first cable control body 22 between the first predetermined positions and the second cable control body 24 between the second predetermined positions in accordance with the predetermined operation sequence.

Referring to FIGS. 10 and 13 to 23, the input mechanism 32 will now be discussed. The input mechanism 32 operatively couples the first operating member 30 to the first and second cable control bodies 22 and 24 to move the first cable control body 22 between the first predetermined positions and the second cable control body 24 between the second predetermined positions in accordance with the predetermined operation sequence (see FIG. 2). The predetermined operation sequence includes a changing point to change operation from the first cable control body 22 to the second cable control body 24. As explained below, the input mechanism 32 is configured to move the first cable control body 22 by at least two of the first predetermined positions in a single continuous operation of the first operating member 30 from the initial position to the operated position to perform a multiple movement operation. The phrase "single continuous operation" refers to the first operating member 30 or the second operating member 34 being operated from by a user in a single continuous movement in one direction with a single progressive moment that does not include backtracking in the opposite direction. While only the first cable control body 22 is illustrated as being configured to move at least two of the first predetermined positions by a single continuous operation of the first operating member 30, it will be apparent that the second cable control body 24 can be configured to move at least two of the second predetermined positions by a single continuous operation of the second operating member 34 if needed and/or desired.

In the illustrated embodiment, the input mechanism 32 can be divided into a pulling input mechanism and a releasing input mechanism. The pulling input mechanism of the input mechanism 32 includes a pulling pawl structure 60 that selectively engages the first cable control body 22 and the second cable control body 24. The pulling pawl structure 60 is configured to change the engagement from the first cable control body 22 to the second cable control body 24 in a state where the first operating member 30 returns from the operated position to the initial position at the changing point. As explained below, the pulling pawl structure 60 is configured to change the engagement from the first cable control body 22 to the second cable control body 24 at an end position of the first predetermined positions of the first cable control body 22. In other words, the pulling pawl structure 60 does not change engagement between the first cable control body 22 and the second cable control body 24 when the first cable control body 22 is in one of the intermediate positions (i.e., the second to tenth predetermined positions of the first cable control body 22 in the illustrated embodiment). Further, in the illustrated embodiment, the pulling pawl structure 60 does not change engagement between the first cable control body 22 and the second cable control body 24 during the single continuous operation. In other words, the pulling pawl structure 60 does not change engagement between the first cable control body 22 and the second cable control body 24 when the first cable control body 22 is being moved during a single continuous operation.

Figure 14:
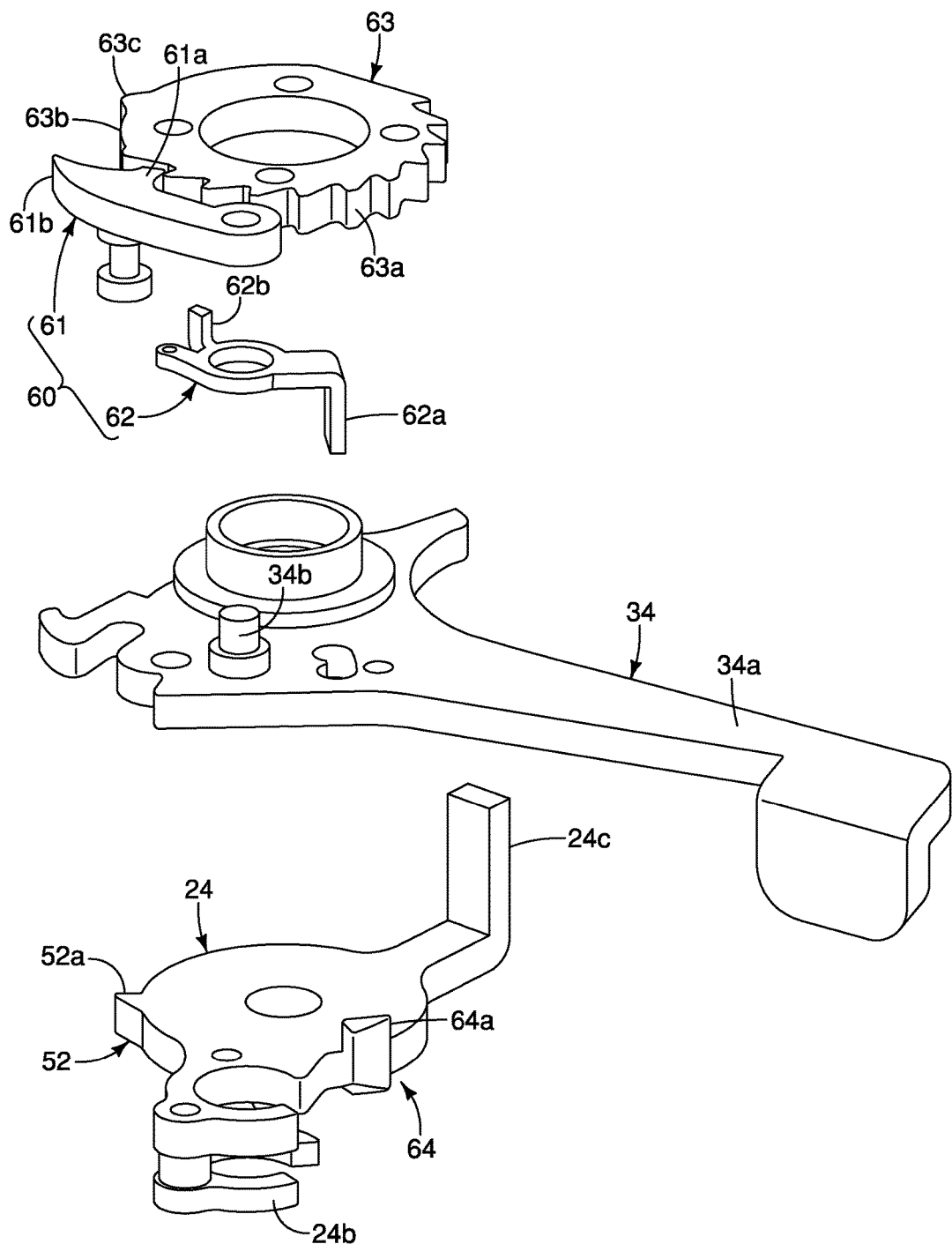
FIG. 14 is an exploded perspective view of the selected internal parts of the bicycle operating device illustrated in FIG. 13 that form the cable pulling mechanism for the first cable control body and the second cable control body.
Figure 15:
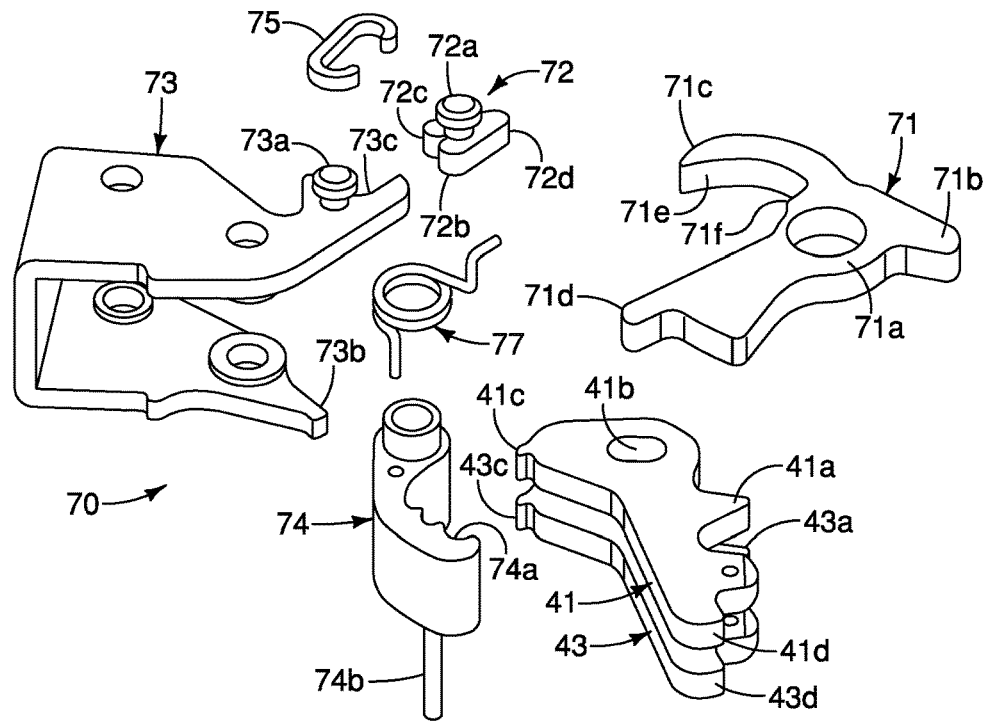
FIG. 15 is a first exploded perspective view of selected internal parts of the bicycle operating device illustrated in FIGS. 1 and 4 to 9 that form a part of an input mechanism and are used for releasing the first cable control body and the second cable control body.

In the illustrated embodiment, as seen in FIGS. 13 and 14, the pulling pawl structure 60 basically includes a first pulling pawl 61 and a second pulling pawl 62. Here, the first and second pulling pawls 61 and 62 are pivotally supported on a post 34b of the second operating member 34. The first pulling pawl 61 has a tooth or prong 61a and a projection 61b. The second pulling pawl 62 has a tooth or prong 62a and an abutment 62b. The first pulling pawl 61 is arranged to cooperate with a first pulling ratchet 63, while the second pulling pawl 62 is arranged to cooperate with a second pulling ratchet 64. The first pulling ratchet 63 is mounted to the first cable control body 22, while the second pulling ratchet 64 is part of the second cable control body 24. Thus, the first pulling pawl 61 is configured to engage the first pulling ratchet 63 to move the first pulling ratchet 63 and the first cable control body 22 as a unit. On the other hand, the second pulling pawl 62 is configured to engage the second pulling ratchet 64 to move the second pulling ratchet 64 and the second cable control body 24 as a unit.

The first pulling ratchet 63 includes a plurality of first ratchet or pulling teeth 63a. The tooth 61a of the first pulling pawl 61 engages one of the pulling teeth 63a of the first pulling ratchet 63 to rotate the first cable control body 22 about the operating axis A1 in the second direction D2, the first cable control body 22 is also rotated in the second direction D2. In other words, when the second operating member 34 is pivoted about the main operating axis A1 in the second direction D2, the first cable control body 22 is also rotated in the second direction D2 by the tooth 61a of the first pulling pawl 61 that engages one of the pulling teeth 63a of the first pulling ratchet 63. A first pulling mechanism is formed by the second operating member 34, the first pulling pawl 61 and the first pulling ratchet 63. A pulling mechanism such as the first pulling mechanism is relatively conventional, and thus, the first pulling mechanism will not be discussed in detail herein.

The first pulling mechanism (the second operating member 34, the first pulling pawl 61 and the first pulling ratchet 63) is used to move the first cable control body 22 from the first gear stage or the first position of the first predetermined positions to the eleventh gear stage or the eleventh position of the first predetermined positions. However, once the first cable control body 22 is in the eleventh gear stage or the eleventh position of the first predetermined positions, the second operating member 34 rotates the second cable control body 24 using a second pulling mechanism is formed by the second operating member 34, the second pulling pawl 62 and the second pulling ratchet 64. The second pulling ratchet 64 has only one second ratchet or pulling tooth 64a that is disposed on a peripheral edge of the mounting part 24b of the second cable control body 24. The tooth 62a of the second pulling pawl 62 is configured to engage the pulling tooth 64a of the second pulling ratchet 64 to move the second cable control body 24.

Since the second cable control body 24 has only two of the second predetermined positions in the illustrated embodiment, the second pulling ratchet 64 has only one pulling tooth. However, if the second cable control body 24 had three or more of the second predetermined positions, then the second pulling ratchet 64 would be provided with more of the second pulling teeth.

In the illustrated embodiment, the first and second pulling pawls 61 and 62 are both mounted on the second operating member 34. However, it will be apparent from this disclosure that the first and second pulling pawls 61 and 62 could be movably mounted on another part and be directly or indirectly operated by the second operating member 34. Here, as mentioned above, the first and second pulling pawls 61 and 62 are pivotally supported on a post 34b of the second operating member 34. The first and second pulling pawls 61 and 62 are biased by a biasing element 66 (e.g., a torsion spring) with respect to the second operating member 34. In particular, the first pulling pawl 61 is biased towards the first pulling ratchet 63 by the biasing element 66 which mounted on the post 34a of the second operating member 34. Thus, the first pulling pawl 61 is biased towards engagement with one of the first pulling teeth 63a of the first pulling ratchet 63 while the second operating member 34 is in a rest position. The second pulling pawl 62 is biased out of engagement with the second pulling tooth 64a of the second pulling ratchet 64 while the second operating member 34 is in a rest position. As explained below, the projection 61b of the first pulling pawl 61 engages a part of the input mechanism 32 during a cable releasing operation to pivot the first pulling pawl 61 to disengage the tooth 61a of the first pulling pawl 61 from the pulling teeth 63a of the first pulling ratchet 63.

Here, in the illustrated embodiment, the first pulling ratchet 63 is a separate part from the first cable control body 22. However, the first pulling ratchet 63 can be integrally formed with the first cable control body 22 as a one-piece member. Likewise, in the illustrated embodiment, the second pulling ratchet 64 is integrally formed as a part of the second cable control body 24. In particular, the mounting part 24b of the second cable control body 24 and the second pulling ratchet 64 are the same part in the illustrated embodiment. However, the second pulling ratchet 64 can be a separate part that is fixed to the second cable control body 24 at least with respect to the rotational direction about the main operating axis A1.

In the illustrated embodiment, the input mechanism 32 includes a first cam member 63b that changes the engagement of the pulling pawl structure 60 from the first cable control body 22 to the second cable control body 24. The first cam member 63b is configured to move together with the one of the first cable control body 22 and the second cable control body 24 as the first operating member 30 moves from the initial position to the operated position. In the illustrated embodiment, the first cam member 63b is configured to move together with the first cable control body 22. In particular, in the illustrated embodiment, the first cam member 63b is formed as part of the first pulling ratchet 63. However, the first cam member 63b can be a separate part from the first pulling ratchet 63 as well as a separate part from the first cable control body 22.

In the illustrated embodiment, the releasing input mechanism of the input mechanism 32 includes a releasing pawl structure 70 that selectively engages the first and second cable control bodies 22 and 24. The releasing pawl structure 70 is configured to selectively release the first and second cable control bodies 22 and 24 with respect to the base member 20. The releasing pawl structure 70 basically includes an input part 71, an indexing part 72, a pawl support 73 and a release pawl 74. The input part 71, the indexing part 72 and the pawl support 73 cooperate to form a click or index mechanism to provide a haptic feedback to the user via the first operating member 30. The click or index mechanism provides the user with an indication to indicate that the first operating member 30 has been operated a predetermined amount during a cable releasing operation to move the first cable control body 22 by one of the first predetermined positions.

The input part 71 is pivotally arranged in accordance with an operation of the first operating member 30. More specifically, the input part 71 is pivotally mounted on the main axle 40. Preferably, the input part 71 is biased to a rest position by a biasing element (not shown) such that the first operating member 30 is a trigger lever. The pawl support 73 is pivotally arranged with respect to the input part 71 in accordance with the operation of the first operating member 30. More specifically, the pawl support 73 is pivotally mounted to the base member 20 by the pivot shaft 46 that forms the first pivot axis P1. The indexing part 72 is movably arranged between the input part 71 and the pawl support 73 to transmit movement from the input part 71 to the pawl support 73. The indexing part 72 is coupled to the pawl support 73 by a clip 75. In particular, the clip 75 is disposed on a post 73a of the pawl support 73 and a post 72a of the indexing part 72. The clip 75 is constructed of a suitable material that is slightly resilient material (i.e. metal or plastic) and maintains its performed state. In this way, the pawl support 73 and the indexing part 72 are retained in contact with each together, but are allowed some relative movement therebetween in response to the operation of the first operating member 30.

The pawl support 73 also has an abutment 73b that engages the projection 61b of the first pulling pawl 61 to move the first pulling pawl 61 out of engagement with the first pulling ratchet 63 during a cable releasing operation. In particular, as the pawl support 73 pivots from the rest position about the first pivot axis P1 during a cable releasing operation, the abutment 73b engages the projection 61a of the first pulling pawl 61 to pivot the first pulling pawl 61 and disengage the tooth 61a of the first pulling pawl 61 from the pulling teeth 63a of the first pulling ratchet 63.

The release pawl 74 is pivotally mounted on the pawl support 73 by a pivot pin 76 for moving the first positioning pawls 41 and 43 from their holding positions to their non-holding positions in response to the operation of the first operating member 30. The pivot pin 76 defines a second pivot axis P2 that is parallel to the first pivot axis P1. The release pawl 74 has a plurality of teeth 70a for selectively engaging the first abutments 41c and 43c of the first positioning pawls 41 and 43. When one of the teeth 70a of the release pawl 74 engages the first abutment 41c of the first positioning pawl 41 during a cable releasing operation, the first positioning pawl 41 is pivoted to disengage the first positioning pawl from the first positioning ratchet 42. Likewise, when one of the teeth 70a of the release pawl 74 engages the first abutment 43c of the additional first positioning pawl 43 during a cable releasing operation, the additional first positioning pawl 43 is pivoted to disengage the additional first positioning pawl 43 from the first positioning ratchet 44. The release pawl 74 is biased about the pivot pin 76 away from the first positioning pawls 41 and 43 by a first biasing element 77 (FIG. 6) that is mounted on the pivot pin 76. However, a second biasing element 78 is provided for biasing towards the first positioning pawls 41 and 43. The biasing force of the second biasing element 78 is greater than the biasing force of the first biasing element 77 so that the release pawl 74 is engaged with one of the first positioning pawls 41 and 43 (see FIGS. 18 and 20) when the first operating member 30 is in the initial or rest position.

The release pawl 74 also has a control member 74b that is biased into contact with the base member 20 to establish a rest position of the release pawl 74. The control member 74b is also used during a cable releasing operation of the second cable control body 24 to move the second positioning pawl 51 to a releasing or non-holding position for disengaging the second stop tooth 51a from the second positioning tooth 52a to release the second cable control body 24 to move from the low position (the low gear stage) as seen in FIG. 9 to the top position or the top gear stage as seen in FIG. 8. The second positioning pawl 51 has an abutment 51b that is contacted by the control member 74b during a cable releasing operation of the second cable control body 24 to move the second positioning pawl 51 to a releasing or non-holding position.

Here in the illustrated embodiment, the input part 71 is a separate part from the first operating member 30 so that the input part 71 is pivoted about the main operating axis A1 in the second direction D2 when the first operating member 30 is operated in either direction with respect to the housing 16 from the rest position as seen in FIG. 7 and view (a) of FIG. 17. Of course, alternatively, the first operating member 30 can be configured such that the first operating member 30 can be pivoted in only one direction to perform a cable releasing operation. In other words, the input part 71 can be integrally formed with the first operating member 30 as a single piece if it is desirable for the first operating member 30 to be operated only in a single direction.

The input part 71 has a central portion 71a, a first projection 71b, a second projection 71c and a third projection 71d. The central portion 71a defines an opening that receives the main axle 40. Preferably, a bushing is provided in the opening of the central portion 71a to allow smooth movement of the input part 71 on the main axle 40. The first projection 71b extends outwardly from the central portion 71a with respect to the main operating axis A1. The first projection 71b of the input part 71 engages the first projection 30c of the first operating member 30, while the second projection 30d of the first operating member 30 engages the central portion 71a of the input part 71. In this way, when the first operating member 30 is moved away from the handlebar H, the first operating member 30 and the input part 71 move together as a single unit about the main operating axis A1. However, when the first operating member 30 is moved towards the handlebar H, the first operating member 30 moves relative the input part 71 by pivoting on the mounting bolt 54 about the secondary operating axis A2.

The second projection 71c of the input part 71 includes a sliding surface 71e that contacts the indexing part 72. More specifically, as seen in FIG. 17, the indexing part 72 contacts the sliding surface 71e and slides along the sliding surface 71e as the first operating member 30 moves from the rest position (view (a) of FIG. 17) toward the first position (view (b) of FIG. 17). The first position (view (b) of FIG. 17) is arranged between the rest position (view (a) of FIG. 17) and the second position (view (c) of FIG. 17).

Figure 16:
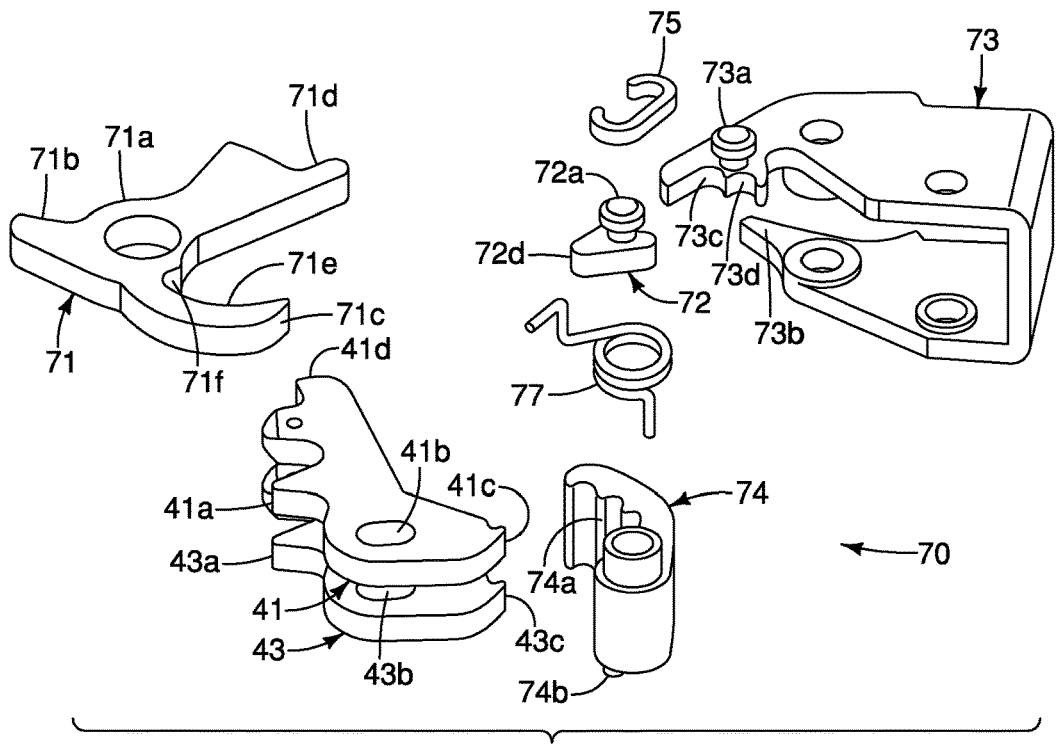
FIG. 16 is a second exploded perspective view of the selected internal parts of the bicycle operating device illustrated in FIG. 15 that form a part of the input mechanism and are used for releasing the first cable control body and the second cable control body.

The central portion 71a of the input part 71 includes an abutment surface 71f as seen in FIG. 16. The abutment surface 71f is located at inner end of the sliding surface 71e with respect to the main operating axis A1. The indexing part 72 contacts the abutment surface 71f after the indexing part 72 slides along the sliding surface 71e during movement of the first operating member 30 from the rest position (view (a) of FIG. 17) toward the first position (view (b) of FIG. 17). The indexing part 72 pivots on the abutment surface 71f as the first operating member 30 moves from the first position (view (b) of FIG. 17) toward the second position (view (c) of FIG. 17).

The indexing part 72 includes a first curved protrusion 72b, a second curved protrusion 72c and a third curved protrusion 72d. The third curved protrusion 72d is configured to slide along the sliding surface 71e of the input part 71. On the other hand, the first curved protrusion 72b and the second curved protrusion 72c are configured to contact the pawl support 73 as explained below. The indexing part 72 is pivotally disposed as the first operating member 30 moves from the first position (view (b) of FIG. 17) toward the second position (view (c) of FIG. 17).

The pawl support 73 further includes a first curved recessed surface 73c and a second curved recessed surface 73d. The first curved protrusion 72b contacts the first curved recessed surface 73c while the indexing part 72 slides along the sliding surface 71e during movement of the first operating member 30 from the initial or rest position (view (a) of FIG. 17) to the first position (view (b) of FIG. 17). The second curved protrusion 72c contacts the second curved recessed surface 73d after the indexing part 72 pivots on the abutment surface 71f as the first operating member 30 moves from the first position (view (b) of FIG. 17) toward the second position (view (c) of FIG. 17). The pawl support 73 is pivotally disposed about the second pivot axis P2 as the first operating member 30 moves from the first position (view (b) of FIG. 17) toward the second position (view (c) of FIG. 17).

Figure 21:
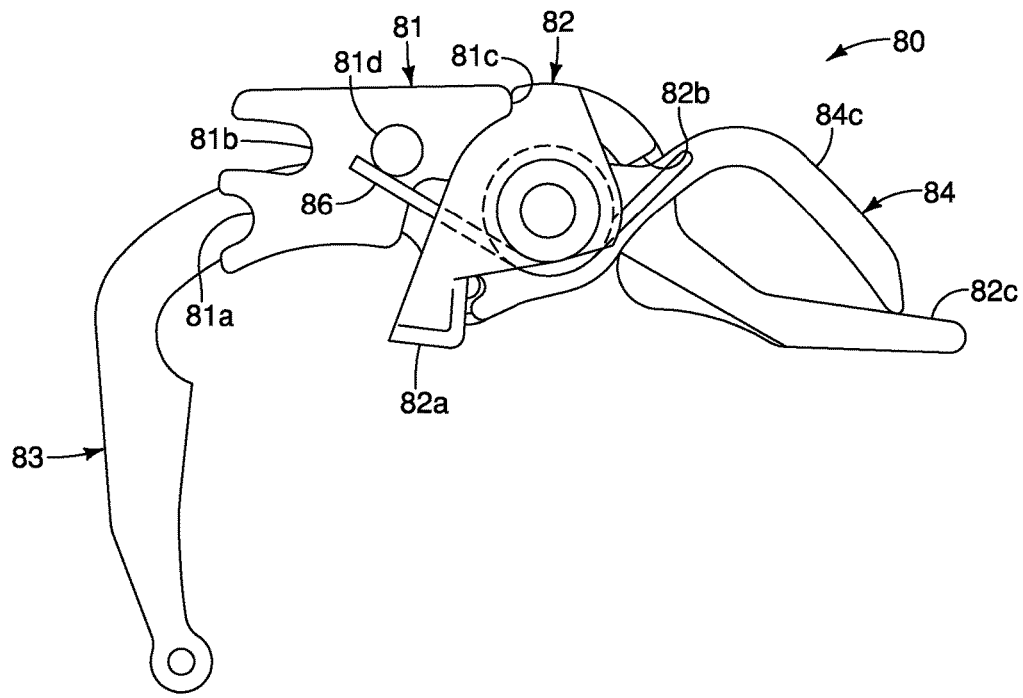
FIG. 21 is a top plan view of selected internal parts of a restricting structure of the bicycle operating device illustrated in FIGS. 1 and 4 to 9 that are configured to prohibit movement of the first cable control body at a changing point such that the first cable control body is not moved over the changing point.
Figure 22:
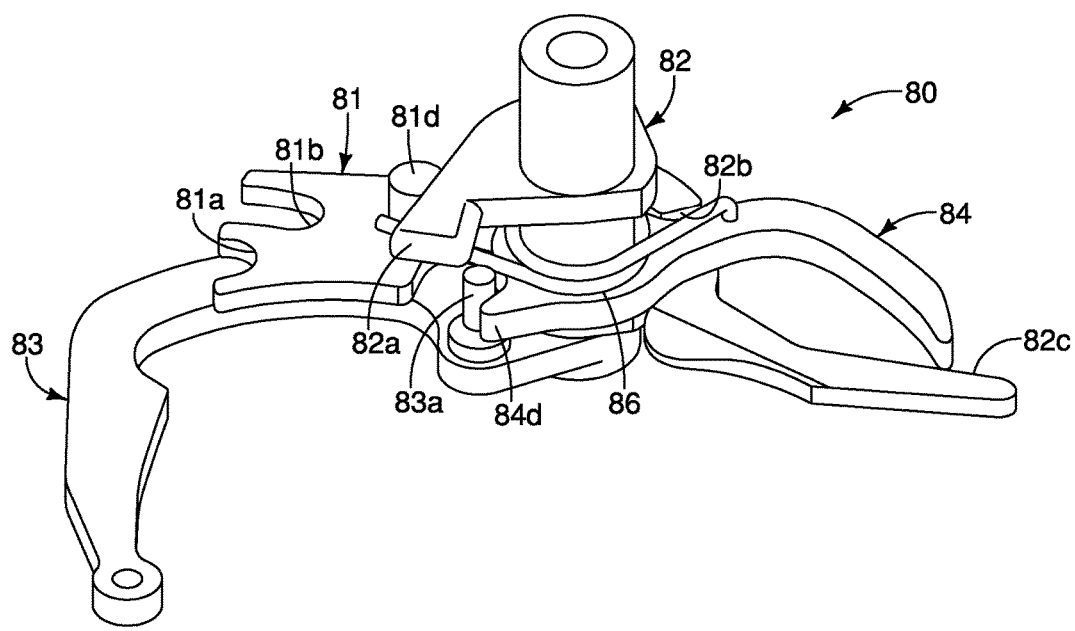
FIG. 22 is a perspective view of the selected internal parts of the restricting structure illustrated in FIG. 21 that is configured to prohibit movement of the first cable control body at the changing point such that the first cable control body is not moved over the changing point.
Figure 23:
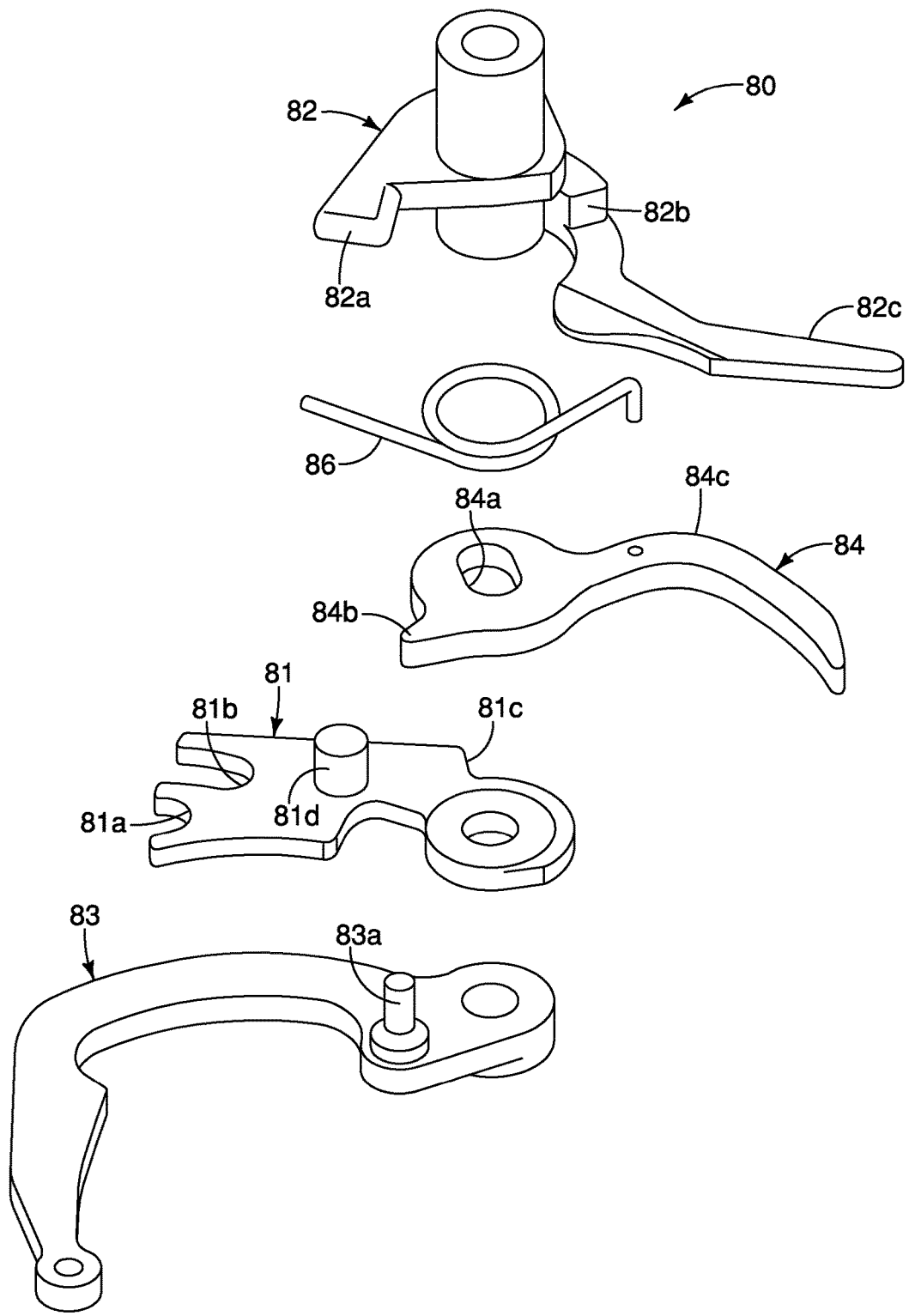
FIG. 23 is an exploded perspective view of the selected internal parts of the restricting structure illustrated in FIGS. 21 and 22 that are configured to prohibit movement of the first cable control body at the changing point such that the first cable control body is not moved over the changing point.

As seen in FIGS. 21 to 23, the input mechanism 32 further includes a restricting structure 80 that is configured to prohibit movement of the first cable control body 22 at the changing point such that the first cable control body 22 is not moved over the changing point during the single continuous operation. As mentioned above, the "changing point" refers to a point in the predetermined operation sequence (see FIGS. 2 and 3) that the bicycle operating device 10 switches from operating one of the first and second cable control bodies 22 and 24 to operating the other one of the first and second cable control bodies 22 and 24. In the illustrated embodiment, the predetermined operation sequence has two changing points (i.e., an end changing point and an intermediate changing point). In particular, one of the changing points (the end changing point) occurs at the low position (the end or eleventh gear stage of RD Stage) when the second operating member 34 is operated to perform a cable pulling operation. The other changing point (the intermediate changing point) occurs at an intermediate position (i.e., the eighth gear stage of RD Stage in the illustrated embodiment) when the first operating member 30 is operated to perform a cable release operation. However, the bicycle operating device 10 can be configured such the changing points occur at other gear stages as needed and/or desired.

In the illustrated embodiment, the restricting structure 80 includes a stopper 81 configured to stop the operation of the first operating member 30 toward the operated position at the changing point. In other words, the stopper 81 is configured to prevent the user from operating both of one of the first and second gear changers RD and FD and then operating the other one of the first and second gear changers RD and FD in single continuous operation. For example, in the illustrated embodiment, the first operating member 30 can be operated to move (release) the first cable control body 22 up to three of the first predetermined positions in a single continuous operation of the first operating member 30 while the first predetermined position corresponds to one of the first gear stage to the eleventh gear stage and the second predetermined position corresponds to the top position or top gear stage. Also, for example, in the illustrated embodiment, the first operating member 30 can be operated to move (release) the first cable control body 22 up to three of the first predetermined positions in a single continuous operation of the first operating member 30 while the first predetermined position corresponds to the eleventh gear stage and the second predetermined position corresponds to the low position or low gear stage. However, when the second cable control body 24 is in the low position or low gear stage and the first cable control body 22 is in the ninth gear stage or the tenth gear stage, the stopper 81 stops the first operating member 30 from being moved passed the eighth gear stage. In other words, while the first cable control body 22 is in the ninth gear stage, the first cable control body 22 can only be shifted only one of the first predetermined positions (i.e., one gear stage) due to position of the stopper 81 blocking the first operating member 30 from being fully operated. Also, while the first cable control body 22 is in the tenth gear stage, the first cable control body 22 can be shifted one or two of the first predetermined positions (i.e., one or two gear stages) due to position of the stopper 81 blocking the first operating member 30 from being fully operated. Finally, when the second cable control body 24 is the low position or low gear stage and the first cable control body 22 is in the eighth gear stage, next operation is upshift of the second cable control body 24 and the first cable control body 22 does not move due to position of the stopper 81 blocking the first operating member 30 from being fully operated. Rather, when the second cable control body 24 is in the low position or low gear stage and the first cable control body 22 is in the eighth gear stage, the first operating member 30 can be partially operated to move the second stop tooth 51a of the second positioning pawl 51 out of engagement with the second positioning tooth 52a of the second positioning ratchet 52 to move the second cable control body 24 is moved by toward the top position or top gear stage by a biasing force.

In the illustrated embodiment, the restricting structure 80 further includes a second cam member 82 configured to change a position of the stopper 81 between an abutting position and a non-abutting position. Here, the stopper 81 and the second cam member 82 are pivotally mounted on a pivot axis P3 to change between the abutting position and the non-abutting position. As explained below, the second cam member 82 is moved by at least one of the first cable control body 22 and the second cable control body 24. Here, the second cam member 82 is pivoted by the first cable control body 22 when the first cable control body 22 is rotated while the second cable control body 24 is in the top position, and is pivoted by the second cable control body 24 when the second cable control body 24 is rotated from the low position to the top position. Specifically, the second cam member 82 includes a first cammed portion 82a that contacts the first cable control body 22 for pivoting the stopper 81 and the second cam member 82 about the pivot axis P3 as the first cable control body 22 rotates about the main operating axis A1 while the second cable control body 24 is in the top position. The second cam member 82 further includes a second cammed portion 82b that contacts a camming portion 24c of the second cable control body 24 when the second cable control body 24 is rotated from the low position to the top position.

In the non-abutting position, the stopper 81 does not restrict the movement of the first operating member 30. In a first abutting position, the stopper 81 restricts the movement of the first operating member 30 for permitting the first cable control body 22 move only one of the first predetermined positions (i.e., one gear stage) during a cable releasing operation. In a second abutting position, the stopper 81 restricts the movement of the first operating member 30 for permitting the first cable control body 22 move a maximum of two of the first predetermined positions (i.e., two gear stages) during a cable releasing operation.

In particular, the stopper 81 includes a first abutment 81a that abuts a part that moves together with the first operating member 30 (i.e., the pivot pin 76 of the pawl support 73 in the illustrated embodiment) at the changing point to prohibit movement of the first cable control body 22 over the changing point as the first operating member 30 starts to be operated from a first predetermined point toward the changing point in the single continuous operation. The first predetermined point is adjacent to the changing point in the predetermined operation sequence. In the illustrated embodiment, during a cable releasing operation, the first abutment 81a of the stopper 81 abuts the pivot pin 76 at the changing point (i.e., the eighth position or eighth gear stage of the first cable control body 22 in the illustrated embodiment). In this way, the stopper 81 prohibits movement of the first cable control body 22 over the changing point (i.e., the eighth position or eighth gear stage of the first cable control body 22 in the illustrated embodiment) as the first operating member 30 starts to be operated from a first predetermined point (i.e., the ninth position or ninth gear stage of the first cable control body 22 in the illustrated embodiment) toward the changing point (i.e., the eighth position or eighth gear stage of the first cable control body 22 in the illustrated embodiment) in the single continuous operation of the first operating member 30.

The stopper 81 further includes a second abutment 81b that abuts a part (i.e., the pivot pin 76 of the pawl support 73 in the illustrated embodiment) at the changing point to prohibit movement of the first cable control body 22 over the changing point as the first operating member 30 starts to be operated from a second predetermined point toward the changing point in the single continuous operation. The second predetermined point is away from the changing point than the first predetermined point in the predetermined operation sequence. The changing point corresponds to an intermediate position of the first predetermined positions. In the illustrated embodiment, during a cable releasing operation, the second abutment 81b of the stopper 81 abuts the pivot pin 76 at the changing point (i.e., the eighth position or eighth gear stage of the first cable control body 22 in the illustrated embodiment). In this way, the stopper 81 prohibits movement of the first cable control body 22 over the changing point (i.e., the eighth position or eighth gear stage of the first cable control body 22 in the illustrated embodiment) as the first operating member 30 starts to be operated from a second predetermined point (i.e., the tenth position or tenth gear stage of the first cable control body 22 in the illustrated embodiment) toward the changing point (i.e., the eighth position or eighth gear stage of the first cable control body 22 in the illustrated embodiment) in the single continuous operation of the first operating member 30.

However, when the stopper 81 is in the non-abutting position, the first operating member 30 is not restricted by the stopper 81. Rather, the first operating member 30 can be fully operated such that the first cable control body 22 can be moved three of the first predetermined positions in the single continuous operation of the first operating member 30. Of course, when the stopper 81 is in the non-abutting position, the first operating member 30 can be operated such that the first cable control body 22 is moved one, two or three of the first predetermined positions in the single continuous operation of the first operating member 30. In other words, the restricting structure 80 does not restrict the first operating member 30 as the first operating member 30 starts to be operated from a third predetermined point toward the changing point during the multiple movement operation. The third predetermined point is away from the changing point than the second predetermined point in the predetermined operation sequence. In the illustrated embodiment, third predetermined point corresponds to the eleventh position (the eleventh gear stage) of the first predetermined positions of the first cable control body 22. The second predetermined point corresponds to the tenth position (the tenth gear stage) of the first predetermined positions of the first cable control body 22. The first predetermined point corresponds to the ninth position (the ninth gear stage) of the first predetermined positions of the first cable control body 22.

During a cable releasing operation with the first cable control body 22 in the eleventh position (the eleventh gear stage), the pivot pin 76 is not blocked by the stopper 81. In this way, the restricting structure 80 does not restrict the first operating member 30 as the first operating member 30 starts to be operated from the eleventh position (the eleventh gear stage) of the first cable control body 22 toward the changing point (i.e., the eighth position or eighth gear stage of the first cable control body 22) during the multiple movement operation.

Also, in the illustrated embodiment, the restricting structure 80 further includes a switching part 83 and a release control member 84. Here, the switching part 83 and the release control member 84 both pivot on the pivot axis P3 with respect to the base member 20. In particular, the base member 20 includes a mounting pin 85 that defines the pivot axis P3. Thus, the stopper 81, the second cam member 82, the switching part 83 and the release control member 84 are pivotally mounted to the base member 20 by the mounting pin 85. A biasing member 86 is disposed between the stopper 81 and the release control member 84 to biasing the stopper 81 and the release control member 84 in opposite directions about the pivot axis P3. Thus, as viewed from a top plan view, the stopper 81 is biased in a clockwise direction about the pivot axis P3 and the release control member 84 is biased in a counterclockwise direction about the pivot axis P3. The stopper 81 has a third abutment 81c that is biased into contact with the second cam member 82. Thus, the release control member 84 is biased into contact with an abutment 82c of the second cam member 82 by the biasing member 86. In this way, the second cam member 82 is held between the stopper 81 and the release control member 84 by the biasing member 86. Here, the biasing member 86 is a torsion spring that has a coiled portion is mounted on the mounting pin 85, a first leg portion abutting a projection 81d of the stopper 81 and a second leg portion abutting disposed in a hole of the release control member 84.

As mentioned above, the second cam member 82 is pivoted about the pivot axis P3 as the first cable control body 22 rotates about the main operating axis A1. More specifically, as seen in FIG. 12, the first cable control body 22 includes a cam 88 that includes a first camming surface 88a, a second camming surface 88b, a third camming surface 88c and a fourth camming 88d. The first to fourth camming surfaces 88a, 88b, 88c and 88d contact the second cam member 82 to rotate the second cam member 82 about the pivot axis P3 as the first cable control body 22 rotates about the main operating axis A1.

Figure 59:
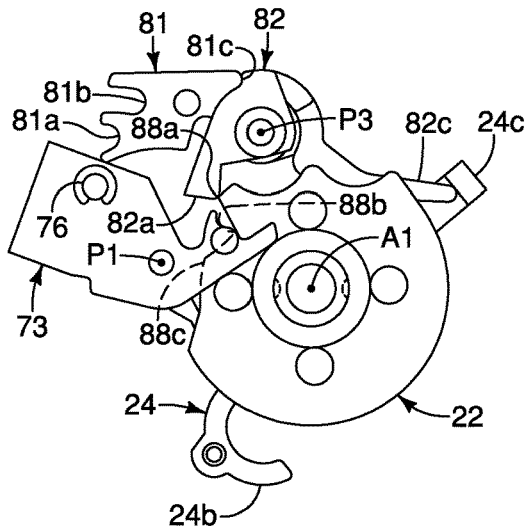
FIG. 59 is a top plan view of the selected parts of the restricting structure, the input mechanism and the first and second control bodies of the bicycle operating device illustrated in FIGS. 1 and 4 to 9 showing an initial or rest position in which the first control body is in the fully pulled position (low position or eleventh gear stage) and the second control body in the fully released position (top position)
Figure 60:
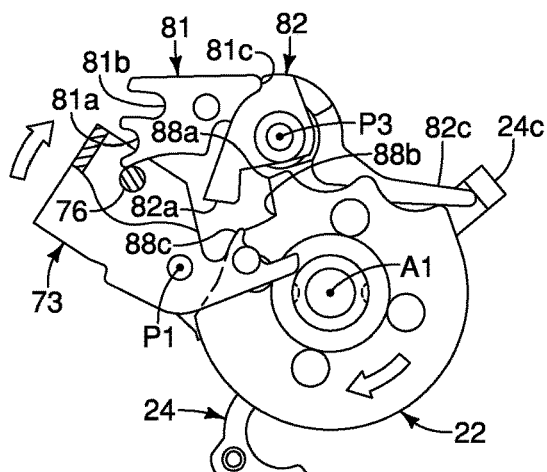
FIG. 60 is a top plan view of the selected parts of the restricting structure, the input mechanism and the first and second control bodies illustrated in FIG. 59 showing the pawl support being moved during a cable releasing operation for releasing the first control body from the eleventh gear stage or position in FIG. 59 to the tenth gear stage or position.
Figure 61:
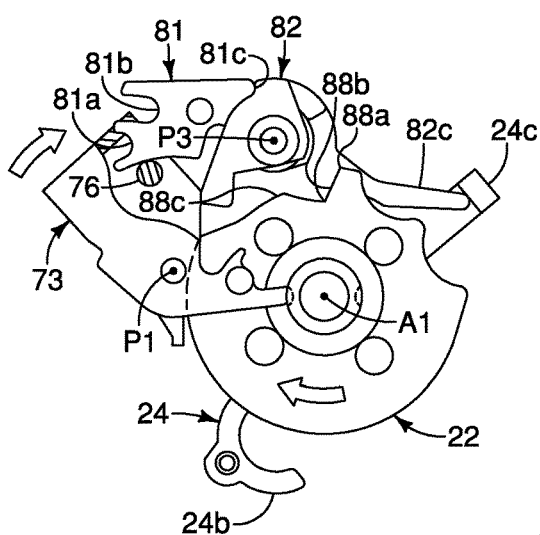
FIG. 61 is a top plan view of the selected parts of the restricting structure, the input mechanism and the first and second control bodies illustrated in FIGS. 59 and 60, but showing the pawl support being moved farther and the first control body moved from the tenth gear stage or position in FIG. 60 to the ninth gear stage or position in a single continuous operation from the initial or rest position in FIG. 59.
Figure 62:
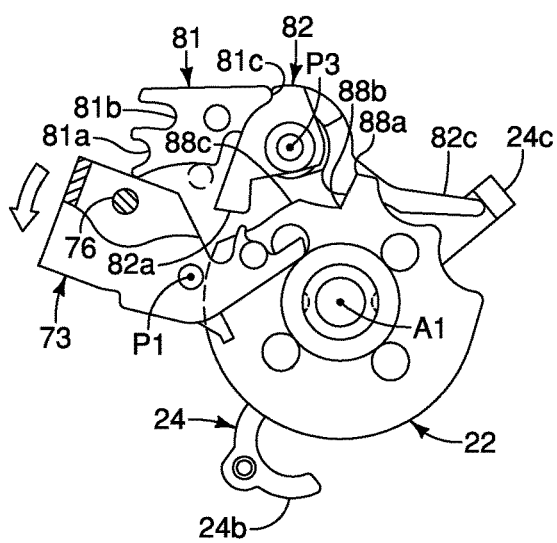
FIG. 62 is a top plan view of the selected parts of the restricting structure, the input mechanism and the first and second control bodies illustrated in FIGS. 59 to 61, but showing the pawl support being returned to the initial or rest position with the first control body in the ninth gear stage and the second control body in the top position.
Figure 63:
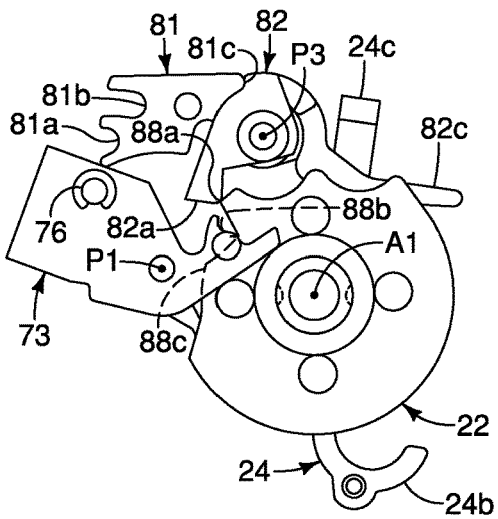
FIG. 63 is a top plan view of the selected parts of the restricting structure, the input mechanism and the first and second control bodies illustrated in FIGS. 59 to 62, but showing an initial or rest position in which the first control body is in the fully pulled position (low position or eleventh gear stage) and the second control body in the fully pulled position (low position)
Figure 64:
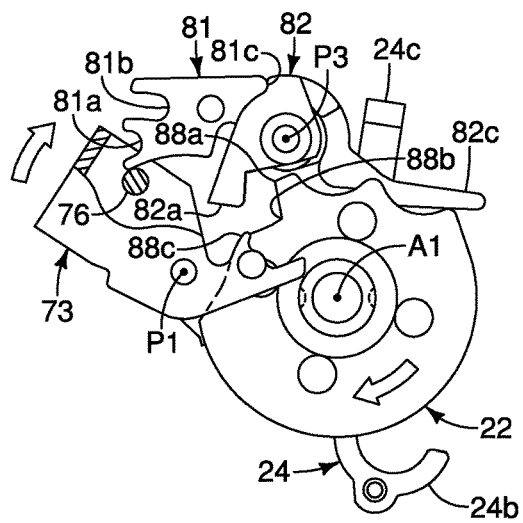
FIG. 64 is a top plan view of the selected parts of the restricting structure, the input mechanism and the first and second control bodies illustrated in FIG. 63, but showing the pawl support being moved during a cable releasing operation for releasing the first control body from the eleventh gear stage or position in FIG. 63 to the tenth gear stage or position.
Figure 65:
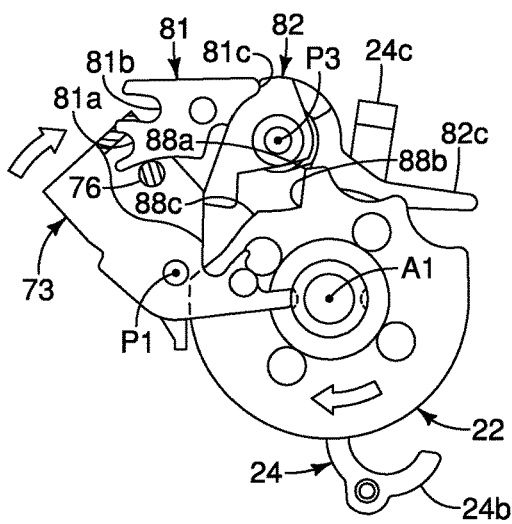
FIG. 65 is a top plan view of the selected parts of the restricting structure, the input mechanism and the first and second control bodies illustrated in FIGS. 63 and 64, but showing the pawl support being moved farther and the first control body moved from the tenth gear stage or position in FIG. 60 to the ninth gear stage or position in a single continuous operation from the initial or rest position in FIG. 59.
Figure 66:
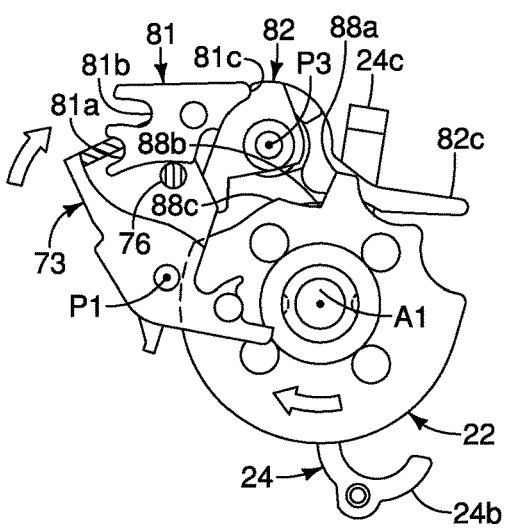
FIG. 66 is a top plan view of the selected parts of the restricting structure, the input mechanism and the first and second control bodies illustrated in FIGS. 63 to 65, but showing the pawl support being moved farther and the first control body moved from the ninth gear stage or position in FIG. 65 to the eighth gear stage or position in a single continuous operation from the initial or rest position in FIG. 59.
Figure 67:
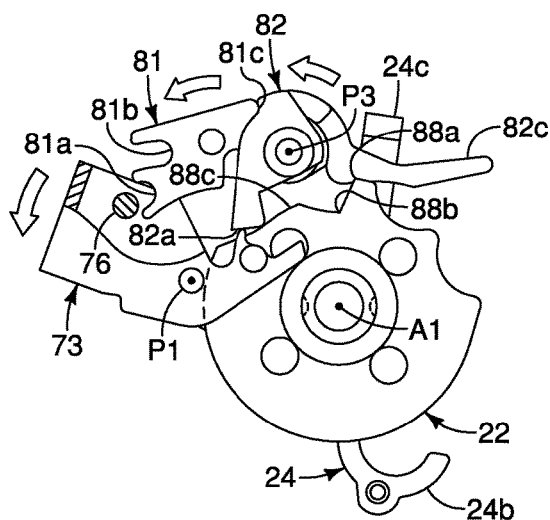
FIG. 67 is a top plan view of the selected parts of the restricting structure, the input mechanism and the first and second control bodies illustrated in FIGS. 59 to 66, but showing the pawl support being returned to the initial or rest position with the first control body in the eighth gear stage and the second control body in the top position.
Figure 68:
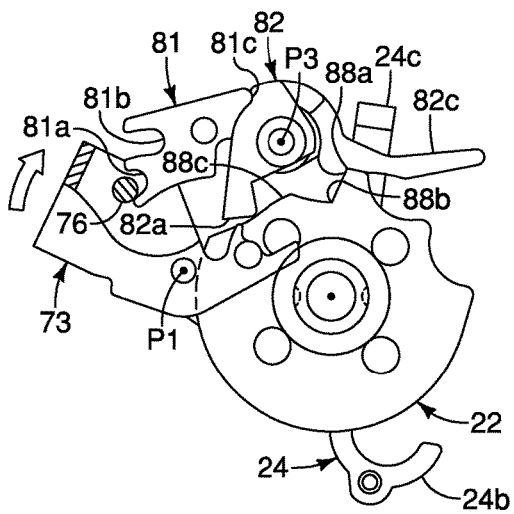
FIG. 68 is a top plan view of the selected parts of the restricting structure, the input mechanism and the first and second control bodies illustrated in FIG. 67, but showing the pawl support being partially moved during a cable releasing operation for releasing the second control body from the top position in FIG. 67 to the low position.
Figure 69:
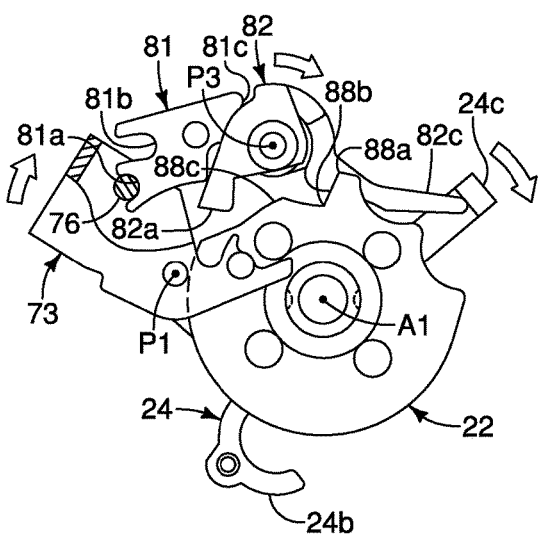
FIG. 69 is a top plan view of the selected parts of the restricting structure, the input mechanism and the first and second control bodies illustrated in FIGS. 67 and 68, but showing the pivot pin of the release pawl contacting the stopper to prohibit further movement of the first operating member in the cable releasing direction and the second control body moved from the top position in FIGS. 67 and 68 to the low position.
Figure 70:
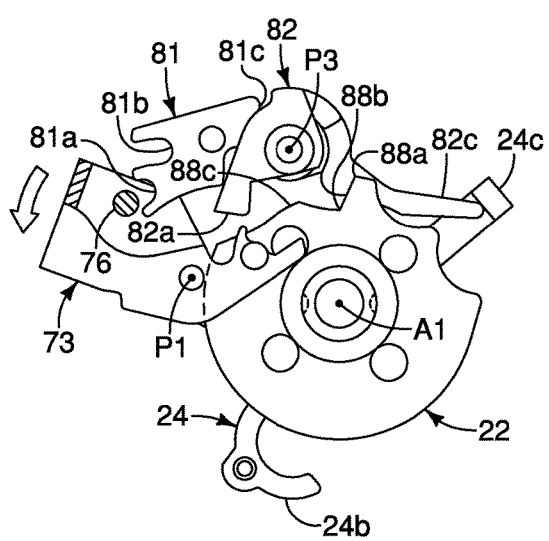
FIG. 70 is a top plan view of the selected parts of the restricting structure, the input mechanism and the first and second control bodies illustrated in FIGS. 67 to 69, but showing the pawl support being returned to the initial or rest position without the first control body being moved from the eighth gear stage and the second control body in the low position.
Figure 71:
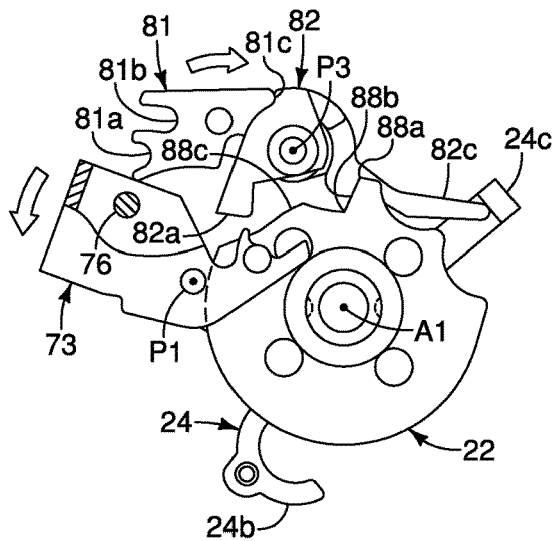
FIG. 71 is a top plan view of the selected parts of the restricting structure, the input mechanism and the first and second control bodies illustrated in FIGS. 67 to 70, but showing the stopper pivoting out of the path of the pivot pin of the release pawl.
Figure 72:
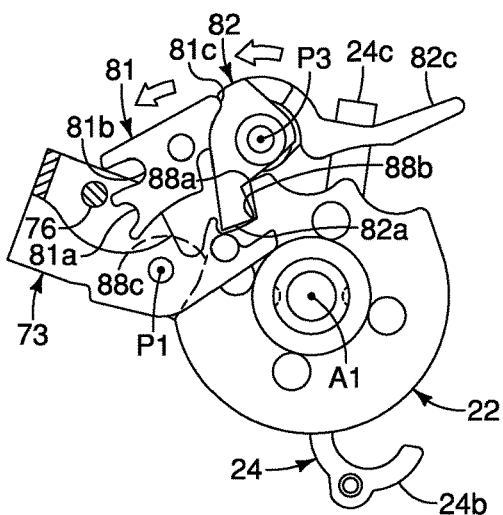
FIG. 72 is a top plan view of the selected parts of the restricting structure, the input mechanism and the first and second control bodies illustrated in FIGS. 59 to 62, but showing an initial or rest position in which the first control body is in the tenth gear stage and the second control body in the low position such that only two consecutive gear stages can be released in a single continuous operation of the first operating member.
Figure 73:
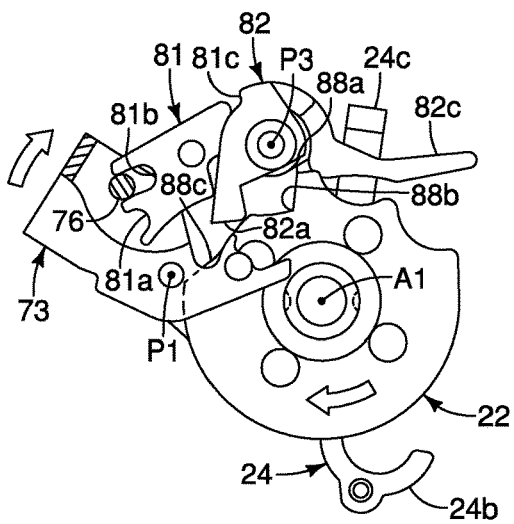
FIG. 73 is a top plan view of the selected parts of the restricting structure, the input mechanism and the first and second control bodies illustrated in FIG. 72, but showing the pawl support being moved during a cable releasing operation for releasing the first control body from the tenth gear stage or position in FIG. 72 to the ninth gear stage or position.
Figure 74:
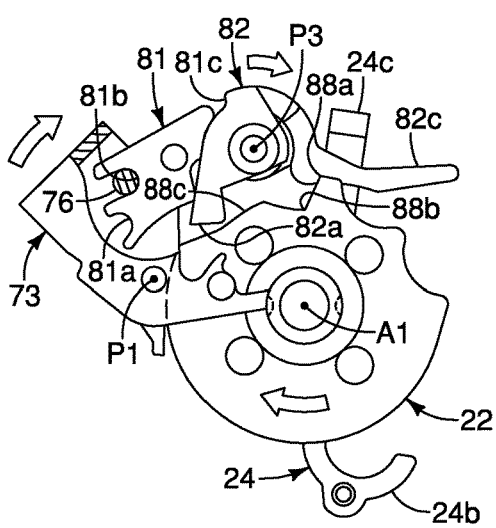
FIG. 74 is a top plan view of the selected parts of the restricting structure, the input mechanism and the first and second control bodies illustrated in FIGS. 72 and 73, but showing the pawl support being moved farther and the first control body moved from the ninth gear stage or position in FIG. 73 to the eighth gear stage or position in a single continuous operation from the initial or rest position in FIG. 72.
Figure 75:
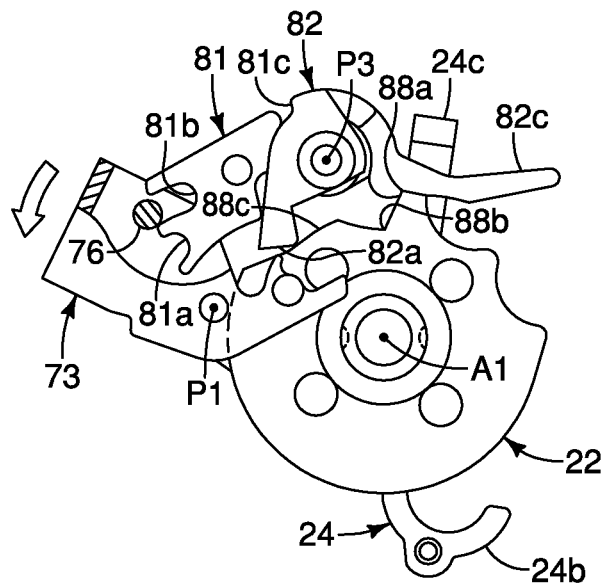
FIG. 75 is a top plan view of the selected parts of the restricting structure, the input mechanism and the first and second control bodies illustrated in FIGS. 72 to 74, but showing the pawl support returning to the initial or rest position with the first control body in the eighth gear stage and the second control body in the top position.

Specifically, the second cam member 82 includes a first cammed portion 82a that contacts the cam 88 of the first cable control body 22 for pivoting the stopper 81 and the second cam member 82 about the pivot axis P3 as the first cable control body 22 rotates about the main operating axis A1. The first camming surface 88a, contacts the second cam member 82 while the first cable control body 22 is in the eleventh position as seen in FIGS. 59 and 63. The second camming surface 88b contacts the second cam member 82 while the first cable control body 22 is in the tenth position as seen in FIG. 72. The third camming surface 88c contacts the second cam member 82 while the first cable control body 22 is in the ninth position as seen in FIG. 73. The fourth camming surface 88d contacts the second cam member 82 while the first cable control body 22 is in any one of the first to seventh positions. In the eighth position of the first cable control body 22, the second cam member 82 does not contact the cam 88 of the first cable control body 22 while the second cable control body 24 is in the top position as seen in FIG. 71.

The second cam member 82 further includes a second cammed portion 82b that contacts a camming portion 24c of the second cable control body 24. The camming portion 24c of the second cable control body 24 rotates the second cam member 82 in a clockwise direction as viewed from a top plan view when the second cable control body 24 is moved from the low position to the top position.

As viewed from a top plan view, the switching part 83 is biased in a counterclockwise direction about the pivot axis P3 by the second biasing element 78, which is attached between the stop pin 48 and a free end of the switching part 83. Here, the biasing element 78 is a tension spring. However, other types biasing elements can be used. In the rest position, the switching part 83 is biased against the control pin 74a of the release pawl 74. In this way, the switching part 83 is pivoted about the pivot axis P3 in a clockwise direction as the first operating member 30 is moved from the rest position to the operated position. The switching part 83 pivots about the pivot axis P3 in a counterclockwise direction as the first operating member 30 moves back to the rest position from the operated position.

The release control member 84 is configured to move the switching part 83 such that the release pawl 74 pivots away from the first positioning pawls 41 and 43 under the biasing force of the biasing element 77 when the first cable control body 22 is at the changing point (i.e., the eighth position or eighth gear stage of the first cable control body 22 in the illustrated embodiment) and the second cable control body 24 is in the low position. In this way, the release pawl 74 will not engage the first positioning pawls 41 and 43 as the first operating member 30 is moved from the rest position to the operated position while the eighth position or eighth gear stage of the first cable control body 22 in the illustrated embodiment) and the second cable control body 24 is in the low position. More specifically, the release control member 84 has a slot 84a that receives the mounting pin 85. The slot 84a allows the release control member 84 to both pivot about the pivot axis P3 and the move in a generally radial direction with respect to the main operating axis A1. The release control member 84 contacts a cam 63c of the first pulling ratchet 63 when the first cable control body 22 is in the eighth position as seen in FIGS. 30 to 35 for moving the release control member 84 outward away from the first cable control body 22. This situation occurs when the first cable control body 22 is in the eighth and the first operating lever is operated to switch the second cable control body 24 from the low position to the top position. More specifically, the outward movement of the release control member 84 rotated the switching part 83 in the clockwise direction so that the release pawl 74 pivots away from the first positioning pawls 41 and 43 and the control pin 74a of the release pawl 74 rotates the second positioning pawl 51 to the releasing or non-holding position by the control pin 74a contacting the abutment 51b of the second positioning pawl 51.

Figure 24:
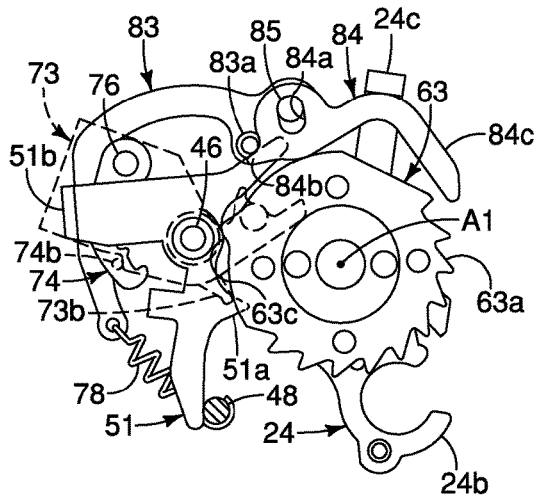
FIG. 24 is a top plan view of the selected parts of the first positioning mechanism, the input mechanism and the restricting structure of the bicycle operating device illustrated in FIGS. 1 and 4 to 9 showing an initial or rest position in which the first pulling ratchet is in a fully pulled position (low position or eleventh gear stage) and the second positioning ratchet in a fully pulled position (low position)
Figure 25:
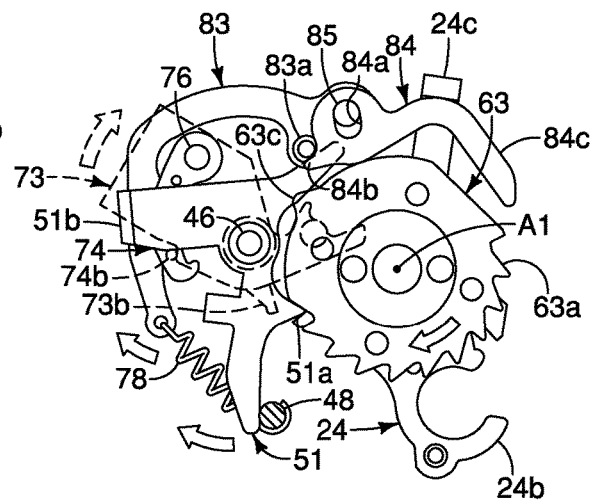
FIG. 25 is a top plan view of the selected parts of the first positioning mechanism, the input mechanism and the restricting structure illustrated in FIG. 24, but showing a cable releasing operation for releasing the first control body (not shown) starting from the eleventh gear stage or position in FIG. 24 causing one of the first positioning pawls to release from one of the first positioning ratchets (not shown)
Figure 26:
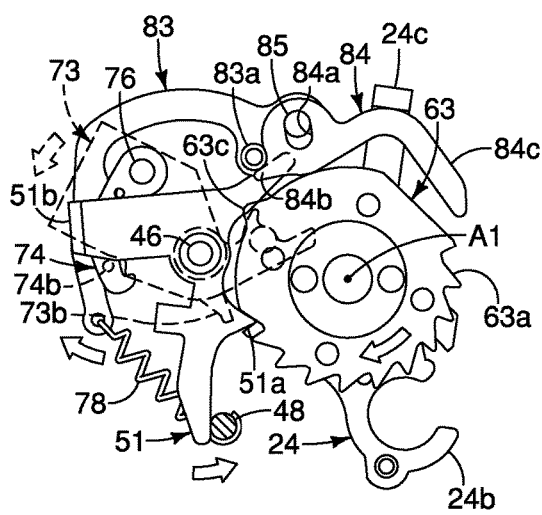
FIG. 26 is a top plan view of the selected parts of the first positioning mechanism, the input mechanism and the restricting structure illustrated in FIGS. 24 and 25, but showing a returning motion of the cable releasing operation of FIG. 25 after shifting from the eleventh gear stage or position of the first control body to the tenth gear stage or position of the first control body.
Figure 27:
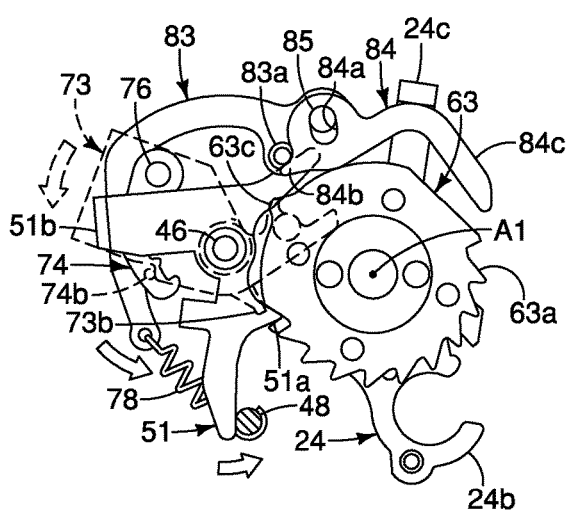
FIG. 27 is a top plan view of the selected parts of the first positioning mechanism, the input mechanism and the restricting structure illustrated in FIGS. 24 to 26, but showing the initial or rest position corresponding to the tenth gear stage or position of the first control body.
Figure 28:
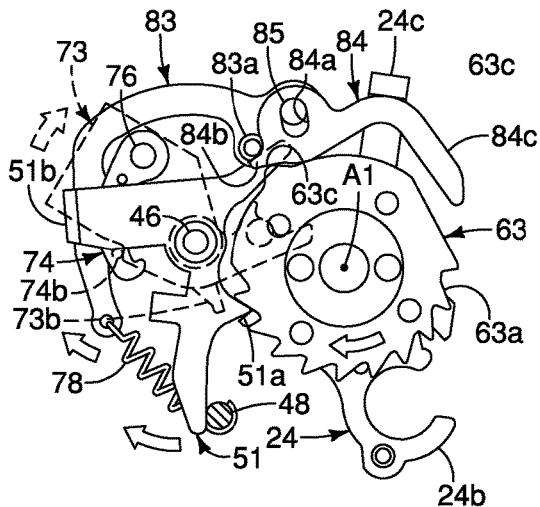
FIG. 28 is a top plan view of the selected parts of the first positioning mechanism, the input mechanism and the restricting structure illustrated in FIGS. 24 to 27, but showing a cable releasing operation for releasing the first control body (not shown) starting from the tenth gear stage or position in FIG. 27 causing one of the first positioning pawls to release from one of the first positioning ratchets (not shown)
Figure 29:
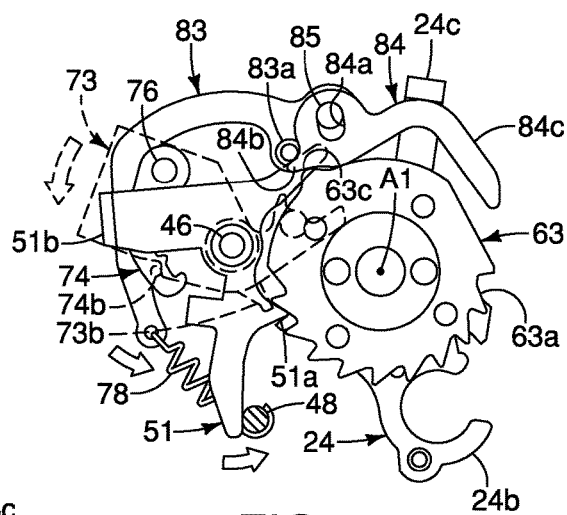
FIG. 29 is a top plan view of the selected parts of the first positioning mechanism, the input mechanism and the restricting structure illustrated in FIGS. 24 to 28, but showing the selected parts returned to the initial or rest positions corresponding to the ninth gear stage or position of the first control body after shifting from the tenth gear stage or position in FIG. 28 to the ninth gear stage or position of the first control body.
Figure 30:
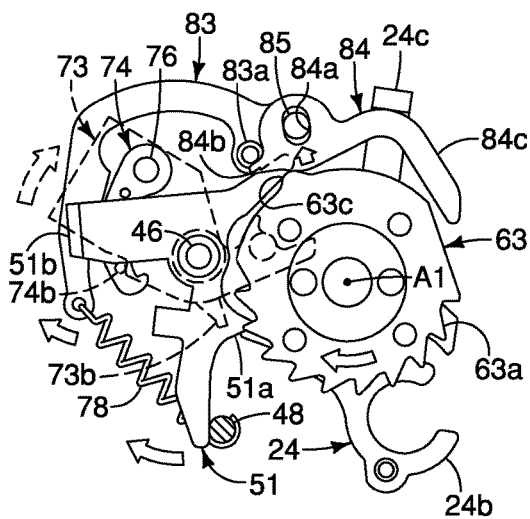
FIG. 30 is a top plan view of the selected parts of the first positioning mechanism, the input mechanism and the restricting structure illustrated in FIGS. 24 to 29, but showing a cable releasing operation for releasing the first control body (not shown) starting from the ninth gear stage or position in FIG. 29 causing one of the first positioning pawls to release from one of the first positioning ratchets (not shown)
Figure 31:
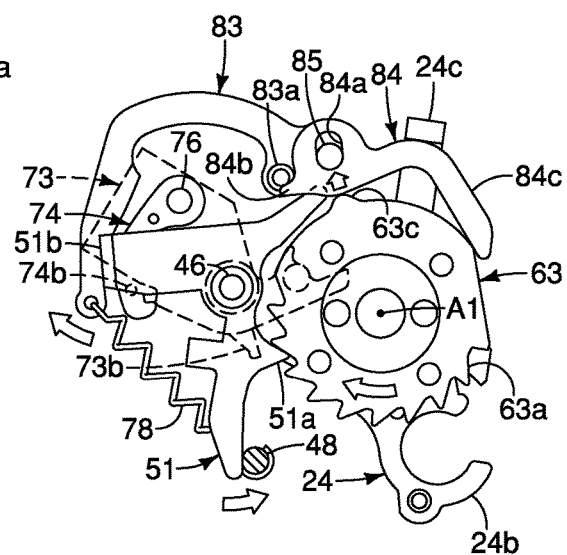
FIG. 31 is a top plan view of the selected parts of the first positioning mechanism, the input mechanism and the restricting structure illustrated in FIG. 24, but an intermediate position during the cable releasing operation for releasing the first control body (not shown) from the ninth gear stage or position in FIG. 30 causing movement of the restricting structure.
Figure 32:
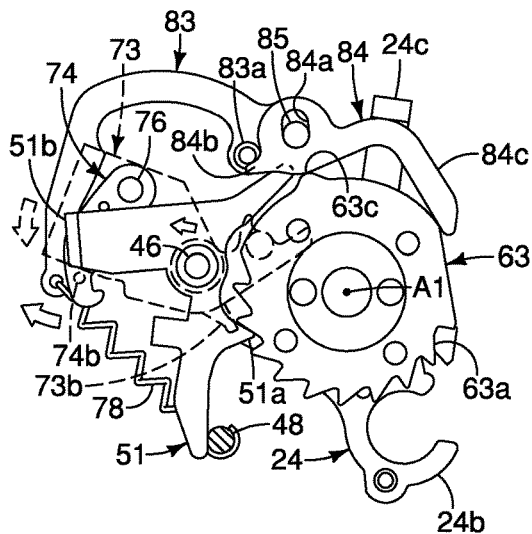
FIG. 32 is a top plan view of the selected parts of the first positioning mechanism, the input mechanism and the restricting structure illustrated in FIGS. 24 to 31, but showing the selected parts returned to the initial or rest positions corresponding to the eighth gear stage or position of the first control body (not shown) after shifting from the ninth gear stage or position in FIG. 31 to the eighth gear stage or position of the first control body.
Figure 33:
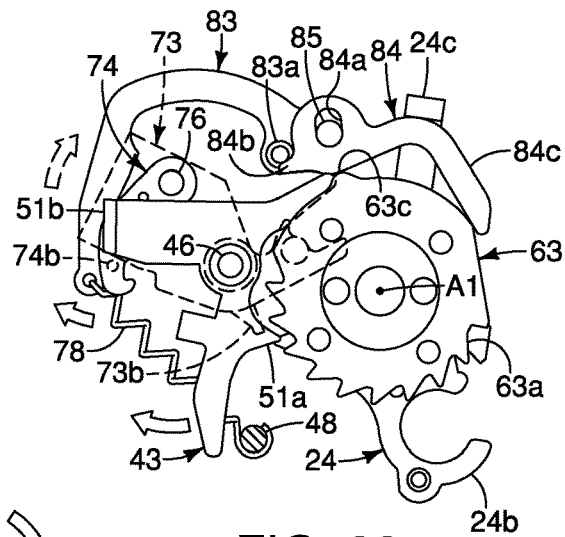
FIG. 33 is a top plan view of the selected parts of the first positioning mechanism, the input mechanism and the restricting structure illustrated in FIGS. 24 to 32, but showing a cable releasing operation for releasing the second control body starting from the eighth gear stage or position of the first control body causing the second positioning pawl to release from the second positioning ratchet that is part of the second control body.
Figure 34:
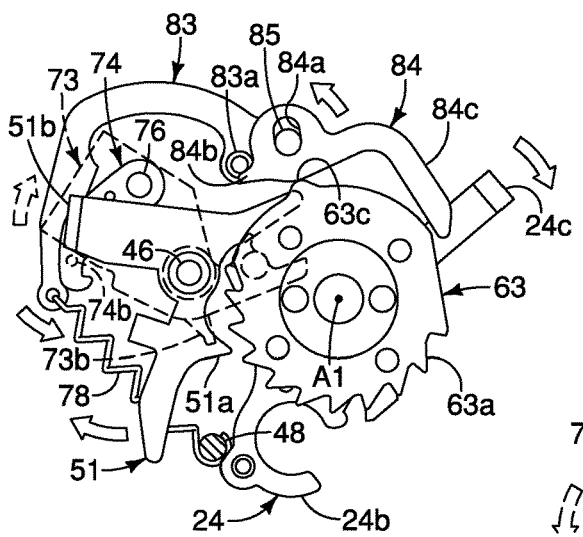
FIG. 34 is a top plan view of the selected parts of the first positioning mechanism, the input mechanism and the restricting structure illustrated in FIGS. 24 to 33, but an intermediate position during the cable releasing operation of the second control body, while the first control body is in the eighth gear stage or position, such that the second control body has moved to the fully released position (top position)
Figure 35:
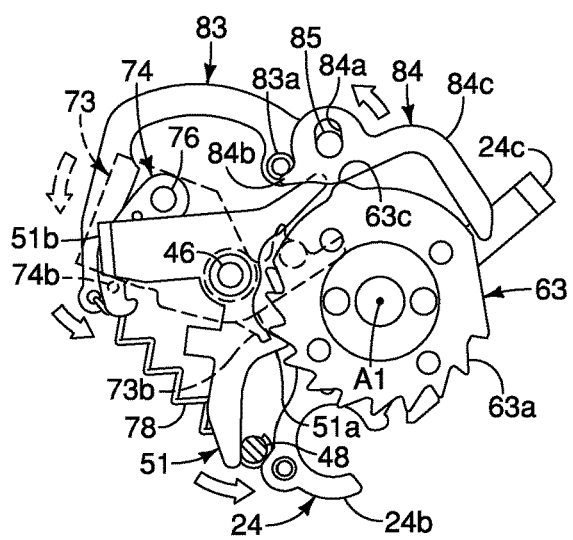
FIG. 35 is a top plan view of the selected parts of the first positioning mechanism, the input mechanism and the restricting structure illustrated in FIGS. 24 to 34, but showing the switching part and the release control member returning to their initial or rest positions with the first control body in the eighth gear stage or position and the second control body in the fully released position (top position)
Figure 36:
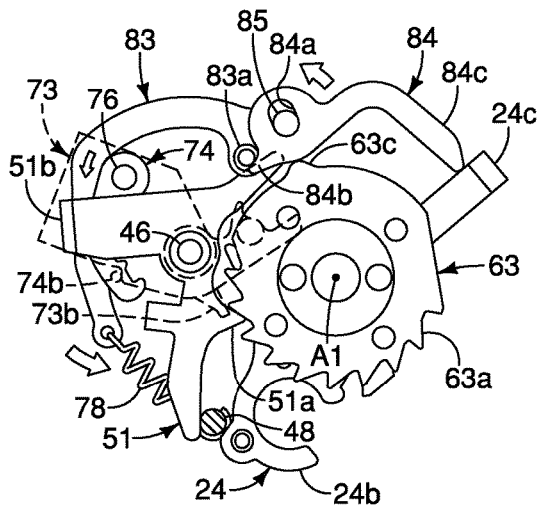
FIG. 36 is a top plan view of the selected parts of the first positioning mechanism, the input mechanism and the restricting structure illustrated in FIGS. 24 to 35, but showing the second pulling pawl, the switching part and the release control member returned to their initial or rest positions with the first control body in the eighth gear stage or position and the second control body in the fully released position (top position)
Figure 37:
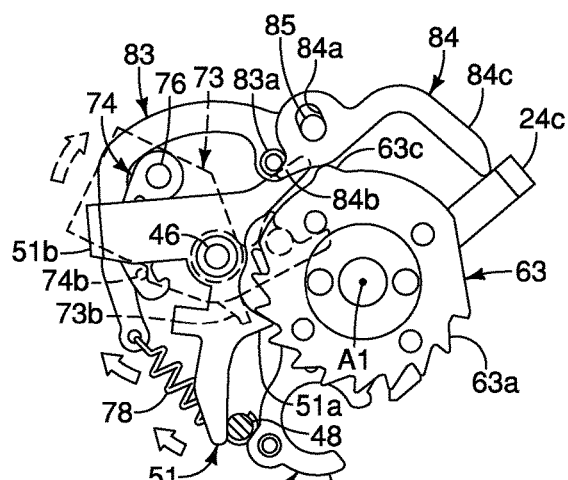
FIG. 37 is a top plan view of the selected parts of the first positioning mechanism, the input mechanism and the restricting structure illustrated in FIGS. 24 to 36, but showing a cable releasing operation for releasing the first control body (not shown) starting from the eighth gear stage or position of the first control body causing one of the first positioning pawls to release from one of the first positioning ratchets (not shown)
Figure 38:
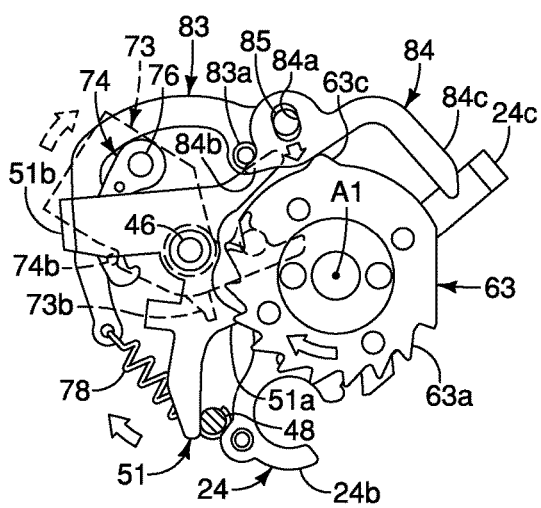
FIG. 38 is a top plan view of the selected parts of the first positioning mechanism, the input mechanism and the restricting structure illustrated in FIGS. 24 to 37, but an intermediate position during the cable releasing operation for releasing the first control body (not shown) from the eighth gear stage or position in FIG. 37 to the seventh gear stage or position of the first control body.
Figure 39:
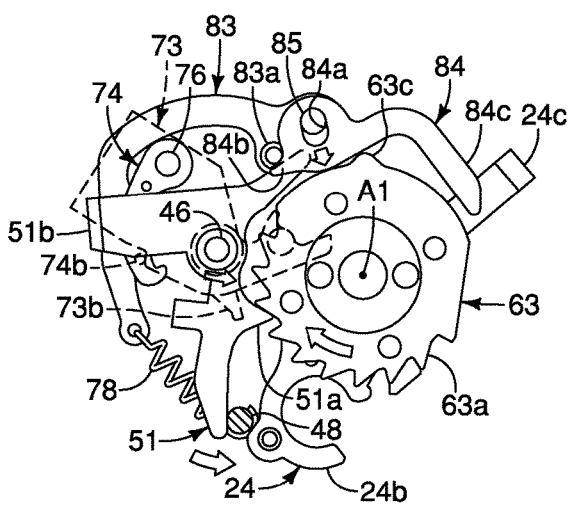
FIG. 39 is a top plan view of the selected parts of the first positioning mechanism, the input mechanism and the restricting structure illustrated in FIGS. 24 to 38, but an intermediate position during the cable releasing operation for releasing the first control body (not shown) from the eighth gear stage or position in FIG. 38 to the seventh gear stage or position of the first control body.
Figure 40:
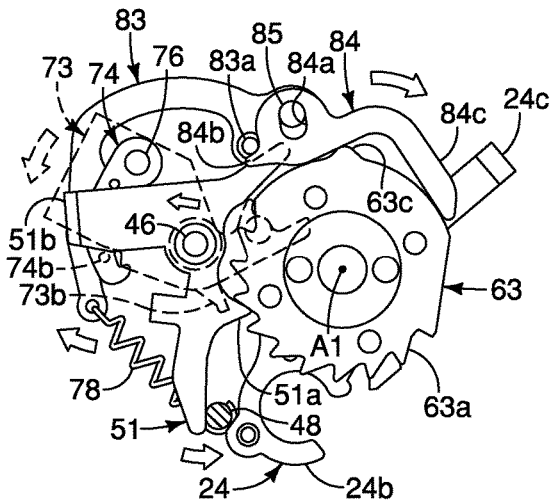
FIG. 40 is a top plan view of the selected parts of the first positioning mechanism, the input mechanism and the restricting structure illustrated in FIGS. 24 to 39, but showing a returning motion of the cable releasing operation from FIG. 39 with the first control body in the seventh gear stage or position and the second control body in the fully released position (top position)
Figure 41:
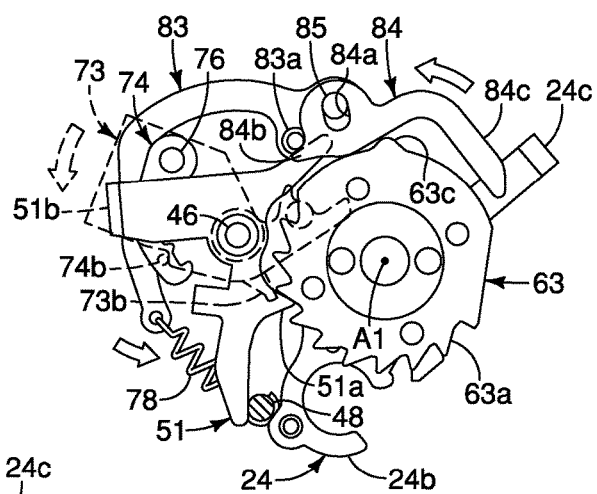
FIG. 41 is a top plan view of the selected parts of the first positioning mechanism, the input mechanism and the restricting structure illustrated in FIGS. 24 to 40, but showing the selected parts returned to their initial or rest positions with the first control body in the seventh gear stage or position and the second control body in the fully released position (top position)
Figure 42:
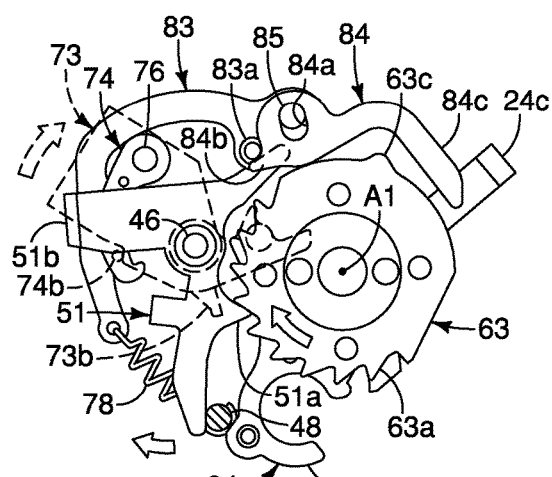
FIG. 42 is a top plan view of the selected parts of the first positioning mechanism, the input mechanism and the restricting structure illustrated in FIGS. 24 to 41, but showing a cable releasing operation for releasing the first control body (not shown) starting from the seventh gear stage or position of the first control body causing one of the first positioning pawls to release from one of the first positioning ratchets (not shown)
Figure 43:
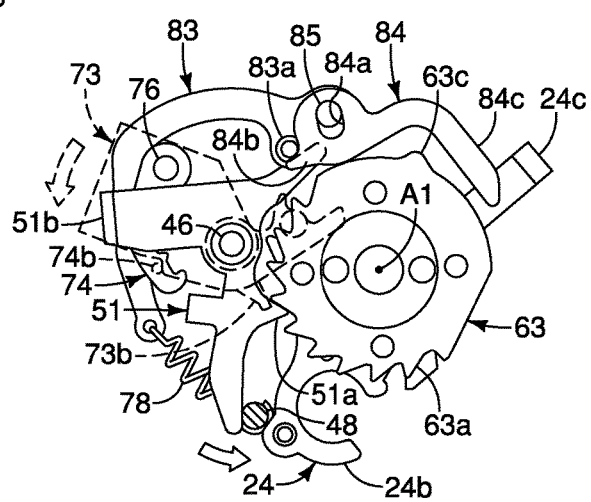
FIG. 43 is a top plan view of the selected parts of the first positioning mechanism, the input mechanism and the restricting structure illustrated in FIGS. 24 to 43, but showing the selected parts returned to their initial or rest positions with the first control body in the sixth gear stage or position and the second control body in the fully released position (top position)
Figure 44:
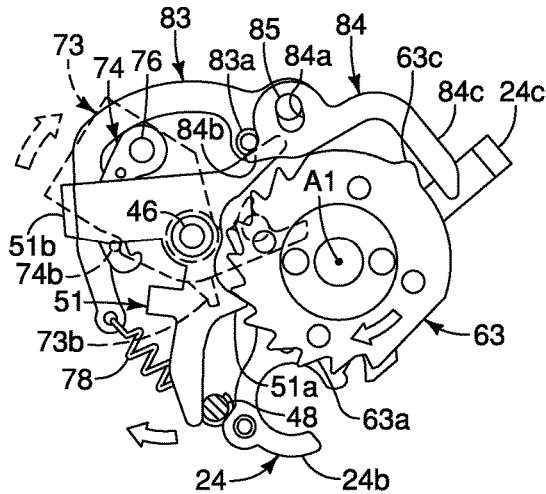
FIG. 44 is a top plan view of the selected parts of the first positioning mechanism, the input mechanism and the restricting structure illustrated in FIGS. 24 to 41, but showing a cable releasing operation for releasing the first control body (not shown) starting from the sixth gear stage or position in FIG. 43 causing one of the first positioning pawls to release from one of the first positioning ratchets (not shown) to the fifth gear stage.
Figure 45:
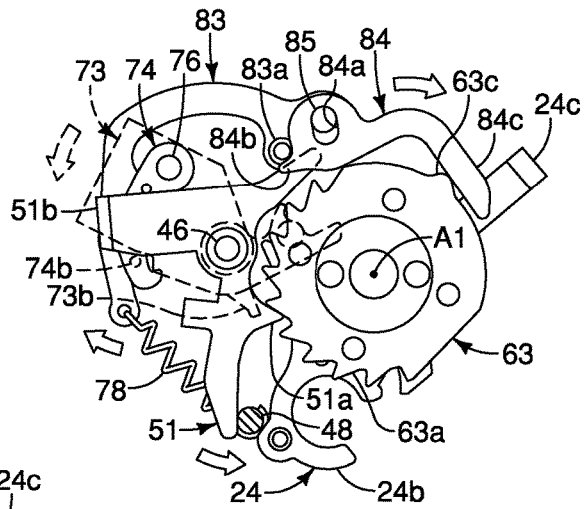
FIG. 45 is a top plan view of the selected parts of the first positioning mechanism, the input mechanism and the restricting structure illustrated in FIGS. 24 to 44, but showing a returning motion of the cable releasing operation from FIG. 44 with the first control body in the fifth gear stage or position and the second control body in the fully released position (top position)
Figure 46:
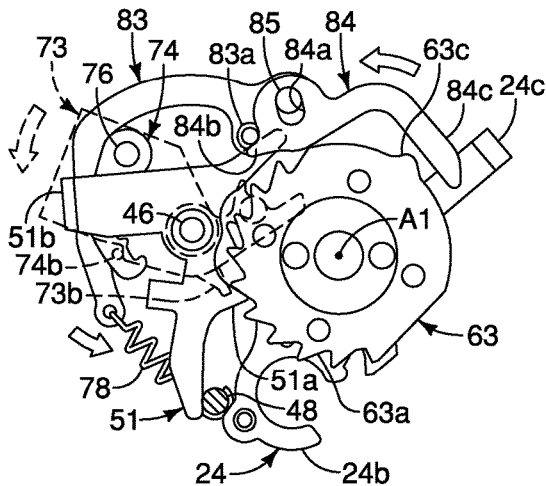
FIG. 46 is a top plan view of the selected parts of the first positioning mechanism, the input mechanism and the restricting structure illustrated in FIGS. 24 to 45, but showing the selected parts returned to their initial or rest positions with the first control body in the fifth gear stage or position and the second control body in the fully released position (top position)
Figure 47:
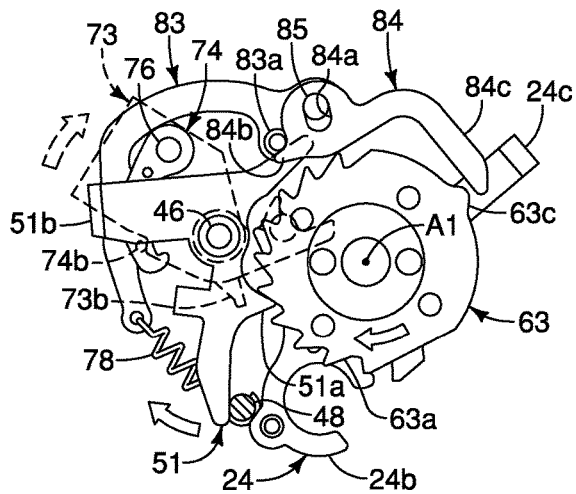
FIG. 47 is a top plan view of the selected parts of the first positioning mechanism, the input mechanism and the restricting structure illustrated in FIGS. 24 to 46, but showing a cable releasing operation for releasing the first control body (not shown) starting from the fifth gear stage or position in FIG. 46 causing one of the first positioning pawls to release from one of the first positioning ratchets (not shown) to the fourth gear stage.
Figure 48:
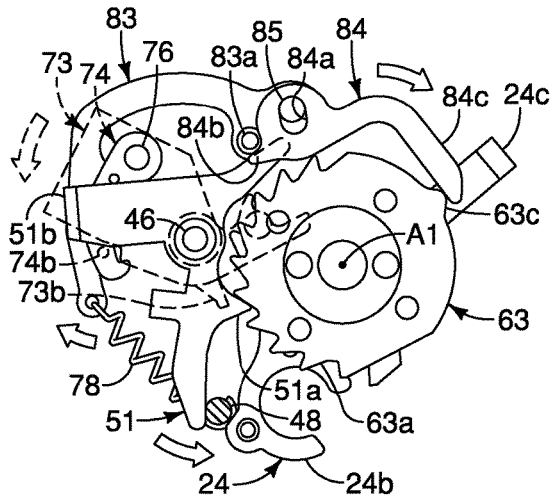
FIG. 48 is a top plan view of the selected parts of the first positioning mechanism, the input mechanism and the restricting structure illustrated in FIGS. 24 to 47, but showing a returning motion of the cable releasing operation from FIG. 47 with the first control body in the fourth gear stage or position and the second control body in the fully released position (top position)
Figure 49:
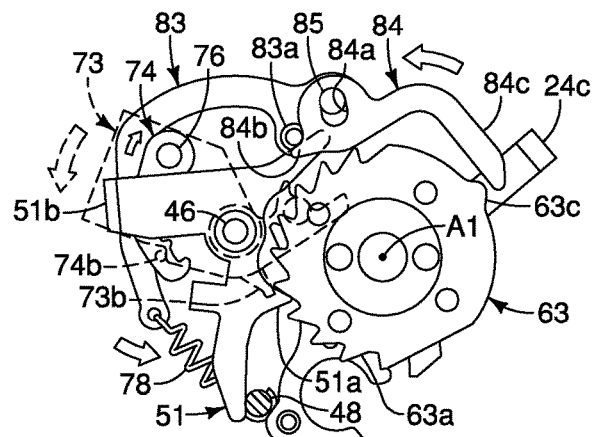
FIG. 49 is a top plan view of the selected parts of the first positioning mechanism, the input mechanism and the restricting structure illustrated in FIGS. 24 to 48, but showing the selected parts returned to their initial or rest positions with the first control body in the fourth gear stage or position and the second control body in the fully released position (top position)
Figure 50:
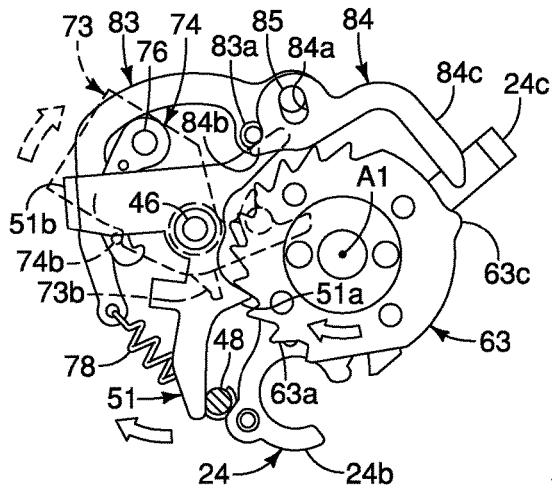
FIG. 50 is a top plan view of the selected parts of the first positioning mechanism, the input mechanism and the restricting structure illustrated in FIGS. 24 to 49, but showing a cable releasing operation for releasing the first control body (not shown) starting from the fourth gear stage or position in FIG. 49 causing one of the first positioning pawls to release from one of the first positioning ratchets (not shown) to the third gear stage.
Figure 51:
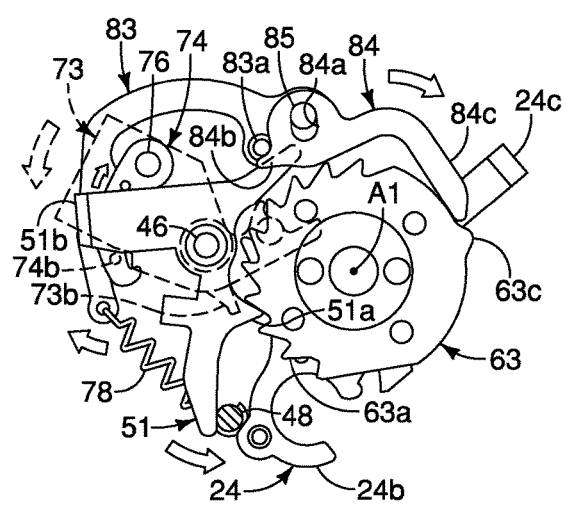
FIG. 51 is a top plan view of the selected parts of the first positioning mechanism, the input mechanism and the restricting structure illustrated in FIGS. 24 to 50, but showing a returning motion of the cable releasing operation from FIG. 50 with the first control body in the third gear stage or position and the second control body in the fully released position (top position)
Figure 52:
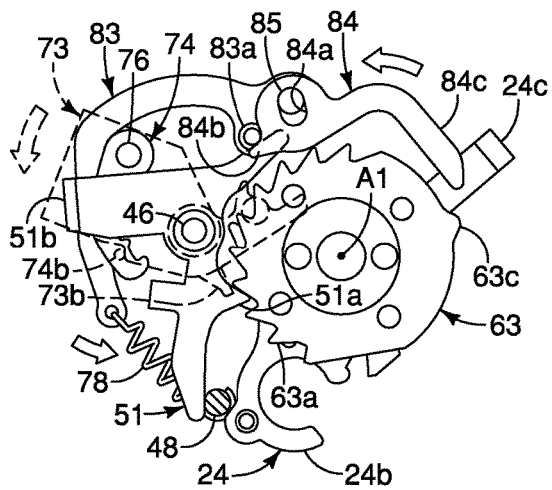
FIG. 52 is a top plan view of the selected parts of the first positioning mechanism, the input mechanism and the restricting structure illustrated in FIGS. 24 to 51, but showing the selected parts returned to their initial or rest positions with the first control body in the third gear stage or position and the second control body in the fully released position (top position)
Figure 53:
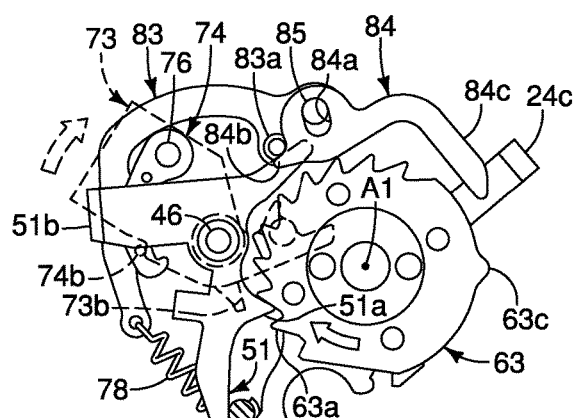
FIG. 53 is a top plan view of the selected parts of the first positioning mechanism, the input mechanism and the restricting structure illustrated in FIGS. 24 to 52, but showing a cable releasing operation for releasing the first control body (not shown) starting from the third gear stage or position in FIG. 52 causing one of the first positioning pawls to release from one of the first positioning ratchets (not shown) to the second gear stage.
Figure 54:
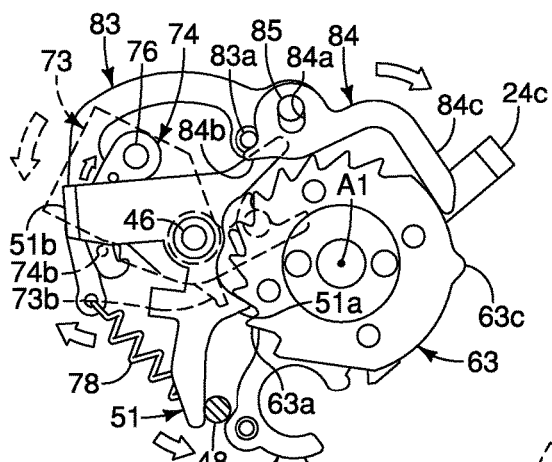
FIG. 54 is a top plan view of the selected parts of the first positioning mechanism, the input mechanism and the restricting structure illustrated in FIGS. 24 to 53, but showing a returning motion of the cable releasing operation from FIG. 53 with the first control body in the second gear stage or position and the second control body in the fully released position (top position)
Figure 55:
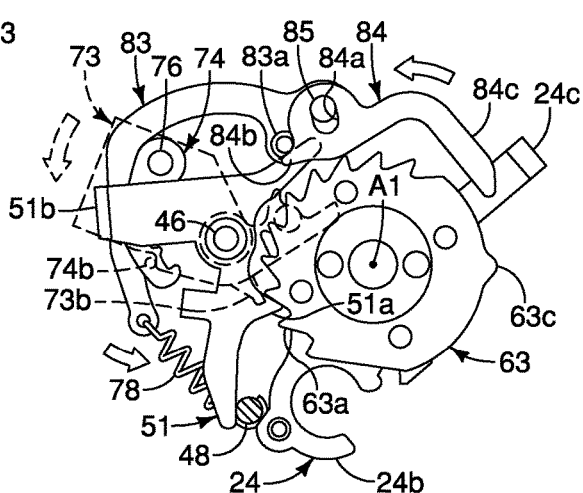
FIG. 55 is a top plan view of the selected parts of the first positioning mechanism, the input mechanism and the restricting structure illustrated in FIGS. 24 to 54, but showing the selected parts returned to their initial or rest positions with the first control body in the second gear stage or position and the second control body in the fully released position (top position)
Figure 56:
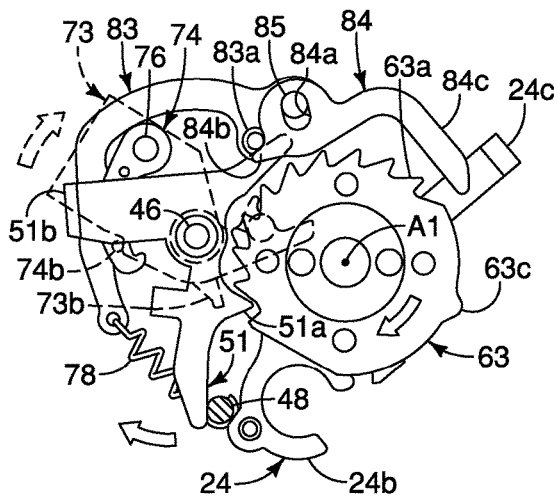
FIG. 56 is a top plan view of the selected parts of the first positioning mechanism, the input mechanism and the restricting structure illustrated in FIGS. 24 to 54, but showing a cable releasing operation for releasing the first control body (not shown) starting from the second gear stage or position in FIG. 54 causing one of the first positioning pawls to release from one of the first positioning ratchets (not shown) to the first gear stage.
Figure 57:
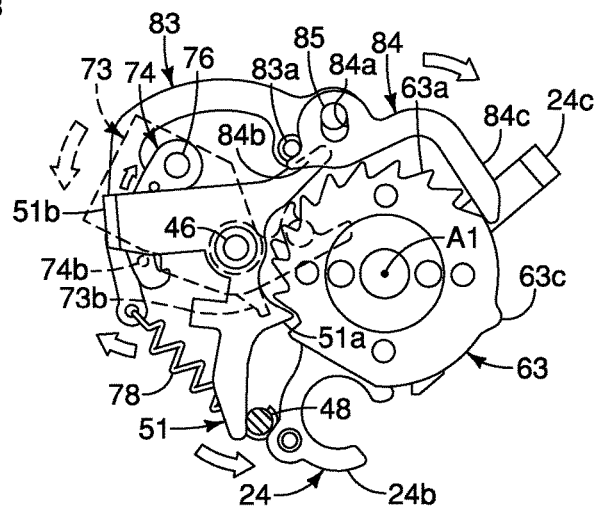
FIG. 57 is a top plan view of the selected parts of the first positioning mechanism, the input mechanism and the restricting structure illustrated in FIGS. 24 to 56, but showing a returning motion of the cable releasing operation from FIG. 56 with the first control body in the first gear stage or position and the second control body in the fully released position (top position)
Figure 58:
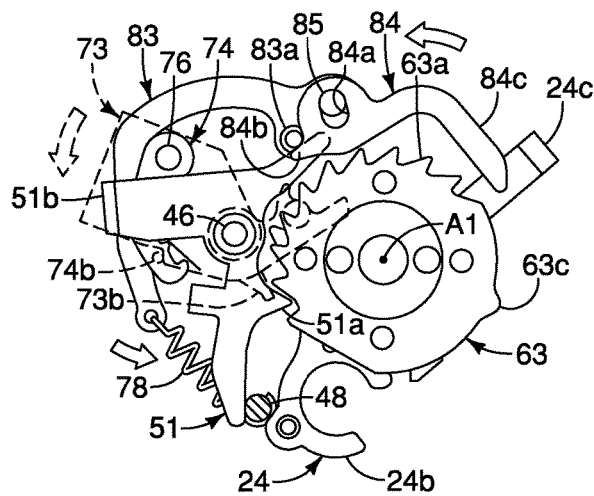
FIG. 58 is a top plan view of the selected parts of the first positioning mechanism, the input mechanism and the restricting structure illustrated in FIGS. 24 to 58, but showing the selected parts returned to their initial or rest positions with the first control body in the first gear stage or position and the second control body in the fully released position (top position)
Figure 76:
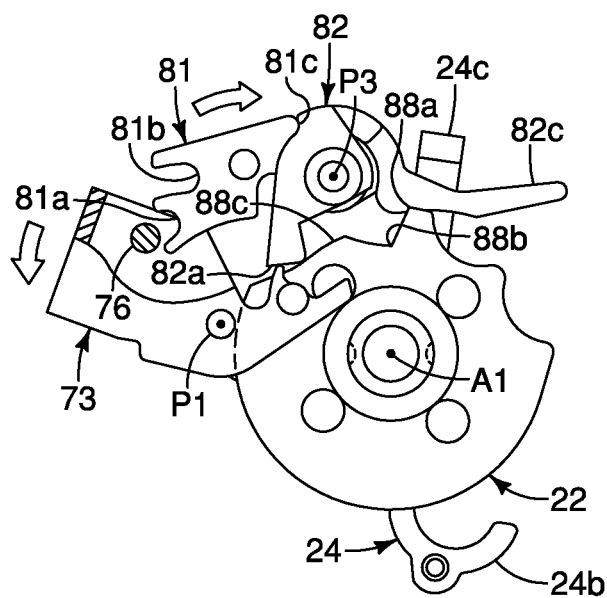
FIG. 76 is a top plan view of the selected parts of the restricting structure, the input mechanism and the first and second control bodies illustrated in FIGS. 72 to 75, but showing in initial or rest position with the first control body in the eighth gear stage and the second control body in the top position and the stopper pivoting outwardly to a blocking position that prohibits the prohibit movement of the first operating member in the cable releasing direction to release the first cable control body while the second control body is in the top position.
Figure 77:
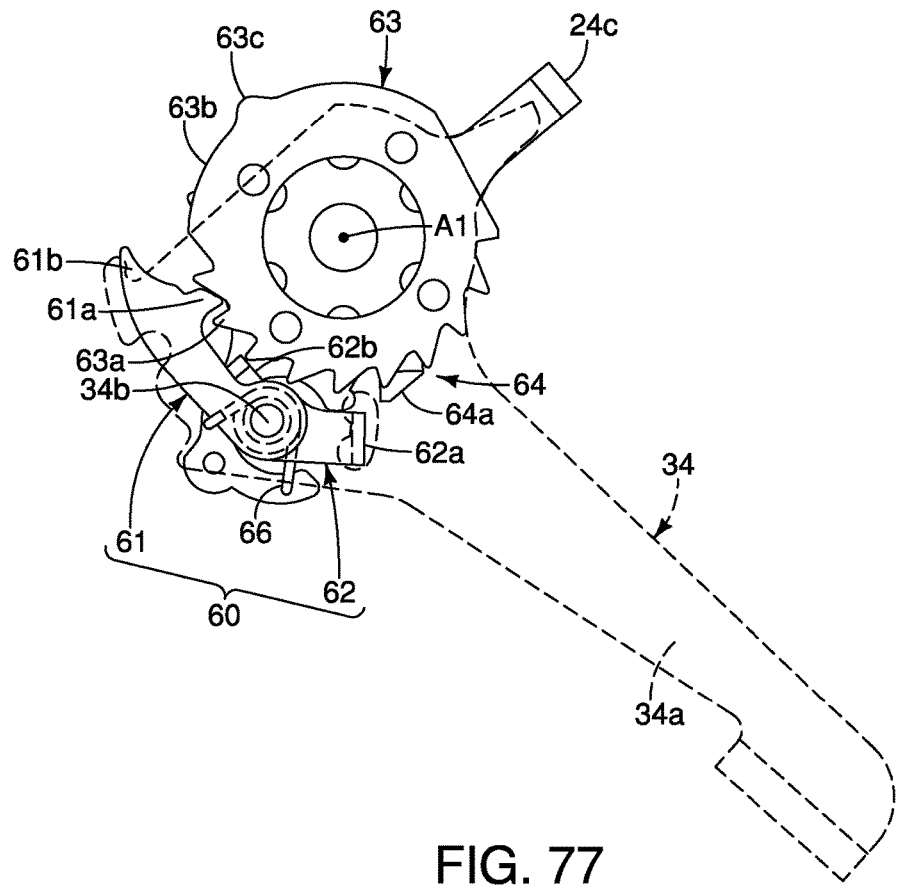
FIG. 77 is a top plan view of selected internal parts of the cable pulling mechanism in their initial or rest positions with the first pulling ratchet in the ninth gear stage or position and the second control body in the low position.
Figure 78:
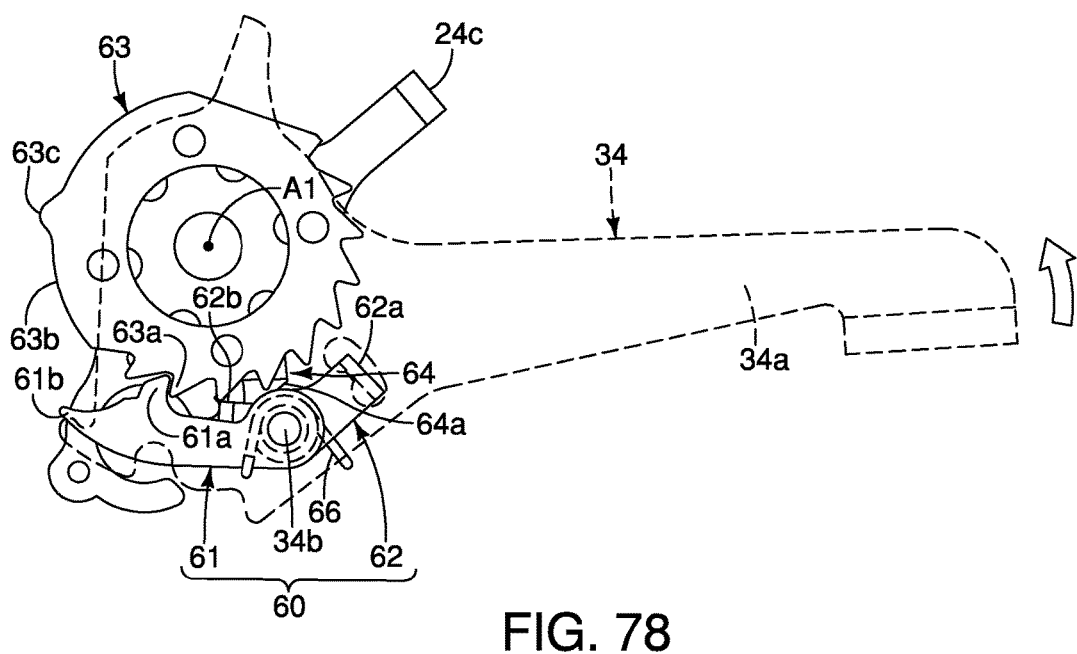
FIG. 78 is a top plan view of the selected internal parts of the cable pulling mechanism illustrated in FIG. 77, but showing the second or additional operating member pivoted to an operating position that moves the first pulling ratchet to the eleventh gear stage or position and the first cable control body (not shown) while the second control body remains in the low position.
Figure 79:
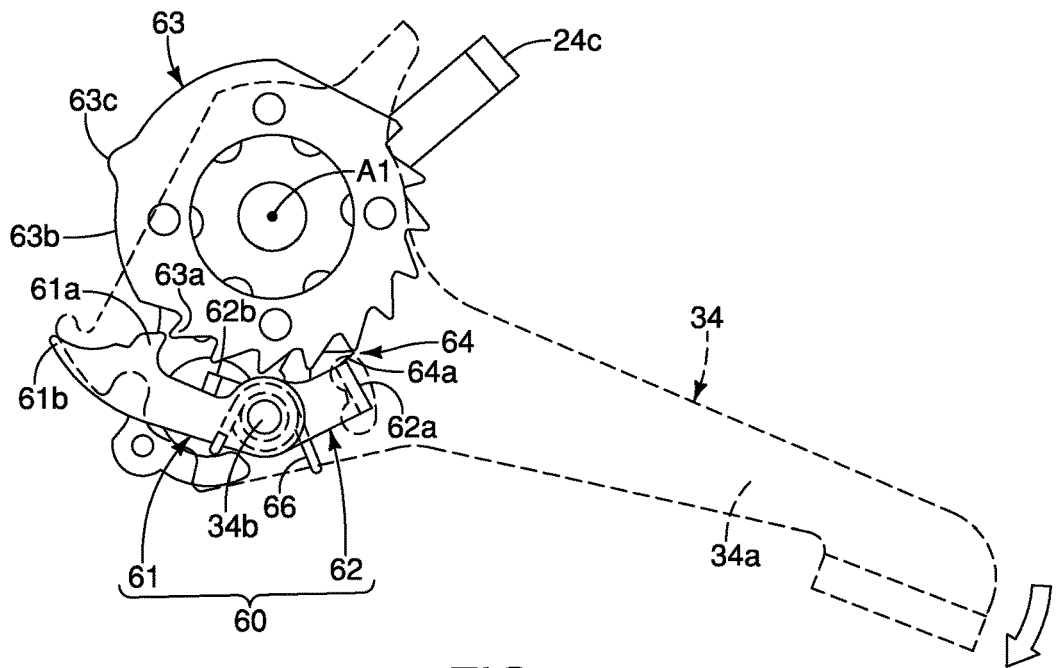
FIG. 79 is a top plan view of the selected internal parts of the cable pulling mechanism illustrated in FIGS. 77 and 78, but showing the second or additional operating member returning towards the initial or rest position with the first pulling ratchet and the first cable control body (not shown) in the eleventh gear stage or position and the second control body in the low position.
Figure 80:
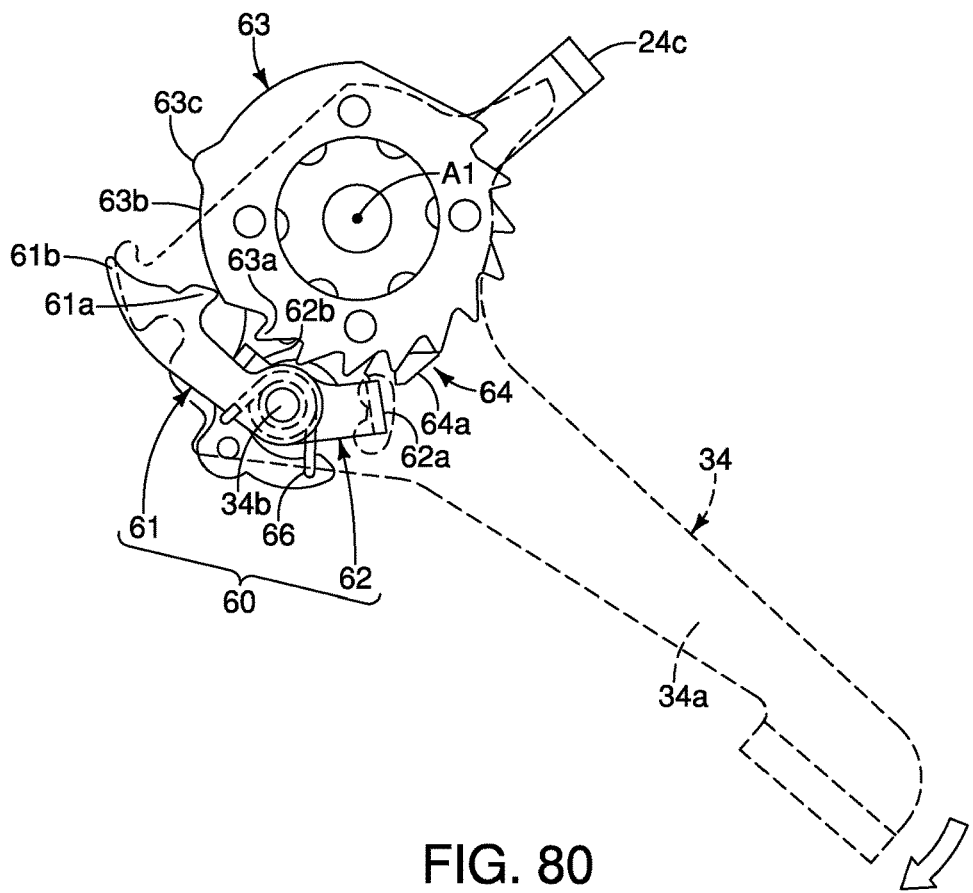
FIG. 80 is a top plan view of the selected internal parts of the cable pulling mechanism illustrated in FIGS. 77 to 79, but showing the second or additional operating member returned to the initial or rest position with the first pulling pawl resting on the first cam member formed by the first pulling ratchet and the second pulling pawl pivoted into an engagement position for engaging the second pulling ratchet formed by the second cable control body while the first pulling ratchet in the eleventh gear stage or position and the second control body in the low position.
Figure 81:
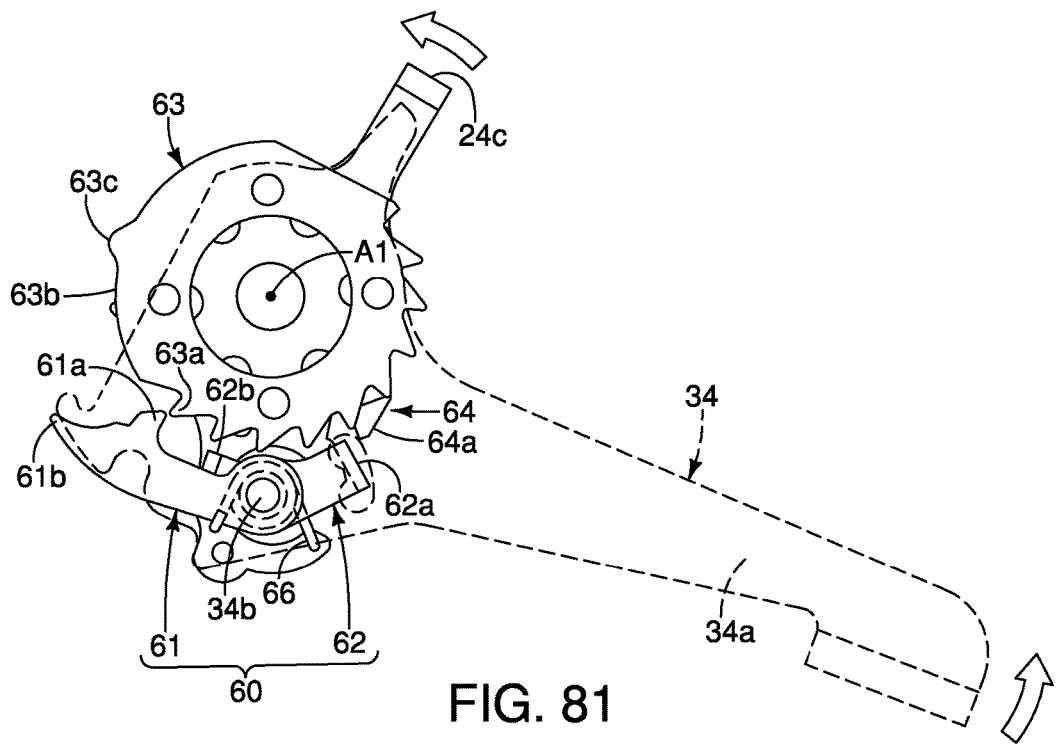
FIG. 81 is a top plan view of the selected internal parts of the cable pulling mechanism illustrated in illustrated in FIGS. 77 to 80, but showing the second or additional operating member pivoted to towards the operating position to move the second pulling ratchet and the second control body from the low position towards the top position while the first pulling ratchet and the first cable control body (not shown) remain in the eleventh gear stage or position.
Figure 82:
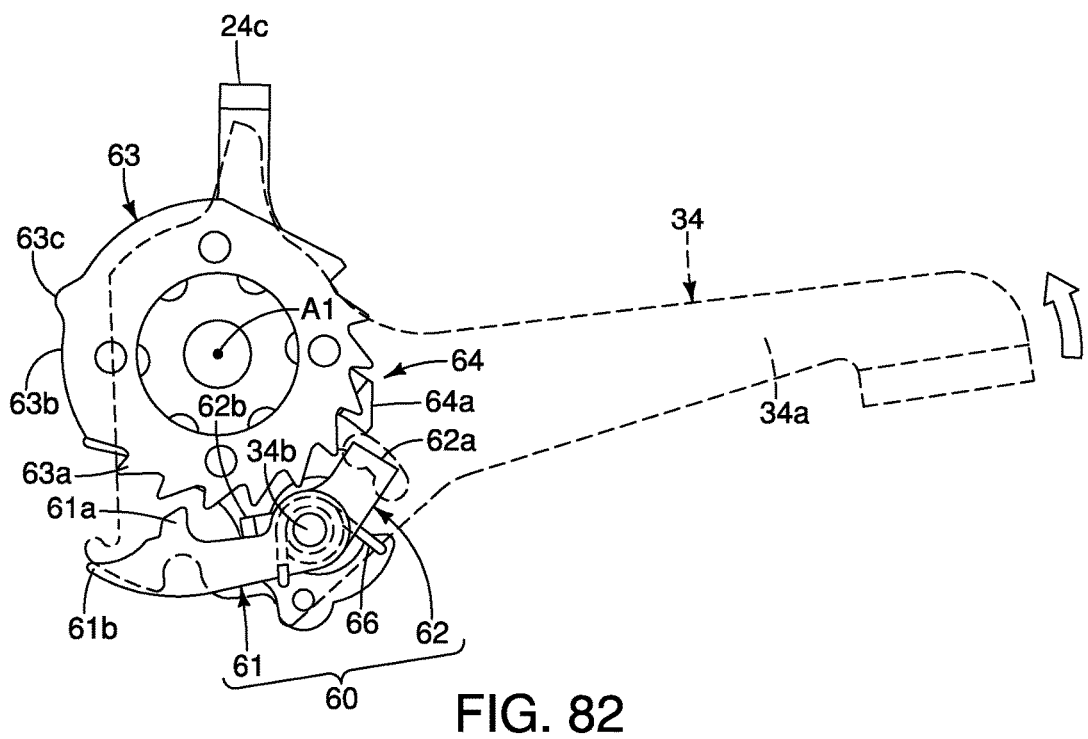
FIG. 82 is a top plan view of the selected internal parts of the cable pulling mechanism illustrated in illustrated in FIGS. 77 to 81, but showing the second or additional operating member pivoted to the operating position so that the second pulling ratchet and the second control body are moved to the top position while the first pulling ratchet and the first cable control body (not shown) remain in the eleventh gear stage or position.
Figure 83:
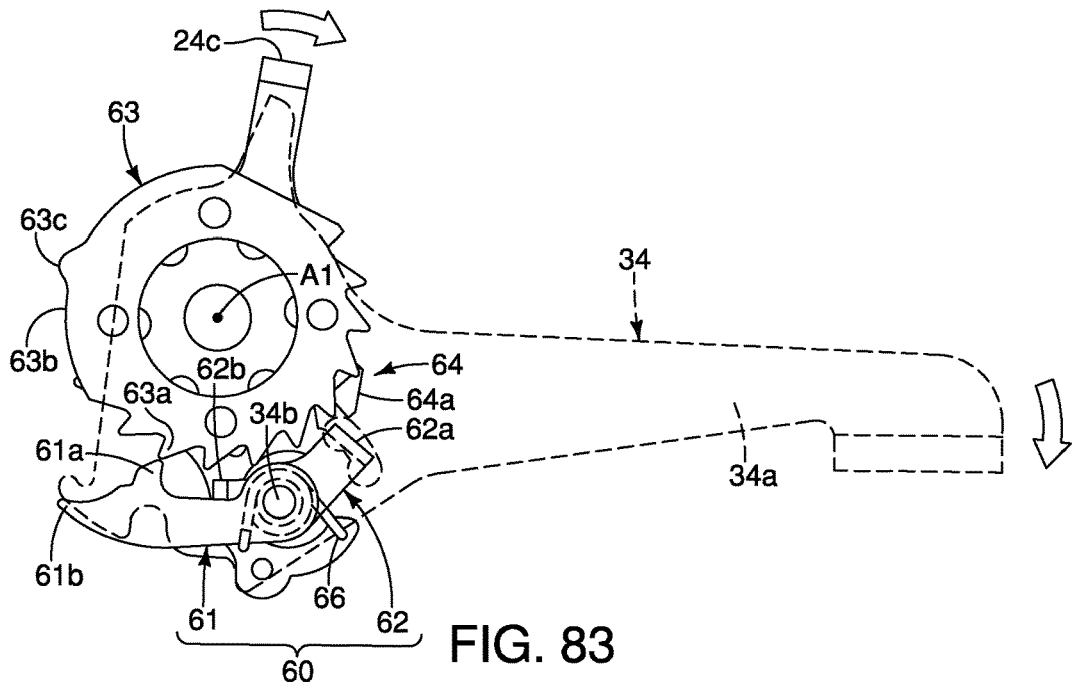
FIG. 83 is a top plan view of the selected internal parts of the cable pulling mechanism illustrated in FIGS. 77 to 82, but showing the second or additional operating member returning towards the initial or rest position with the first pulling ratchet and the first cable control body (not shown) in the eleventh gear stage or position and the second control body in the top position.
Figure 84:
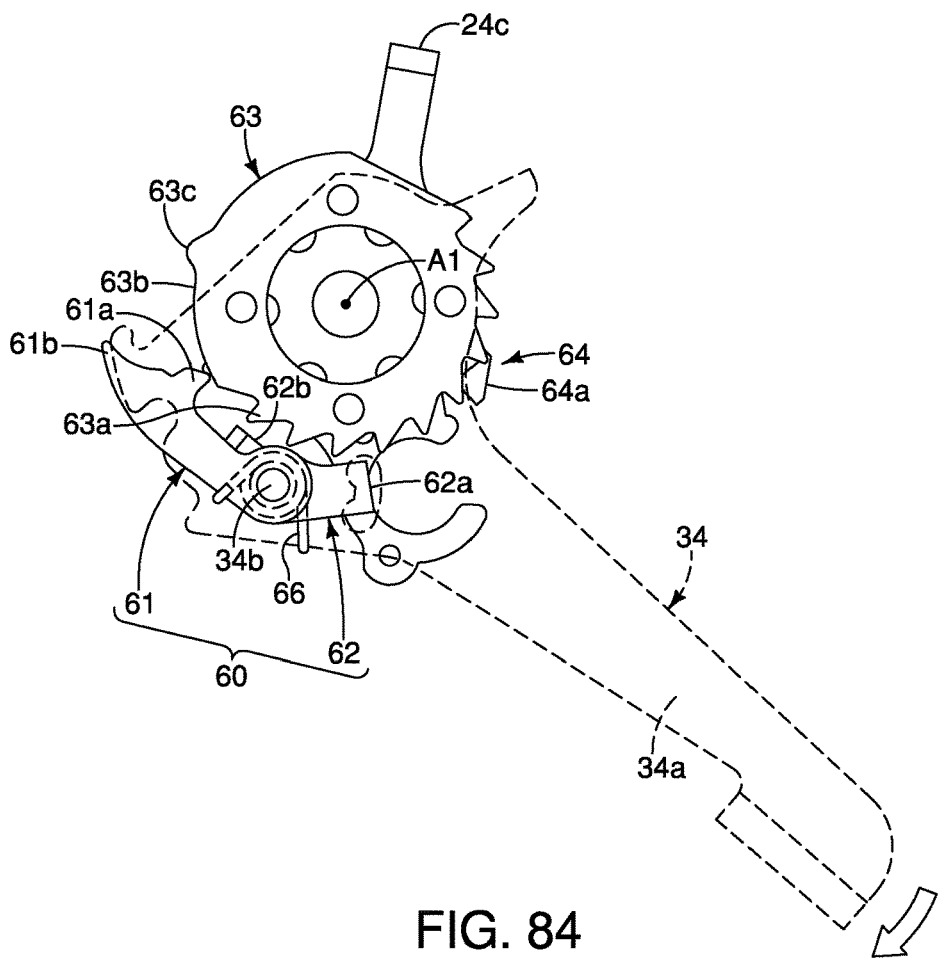
FIG. 84 is a top plan view of the selected internal parts of the cable pulling mechanism illustrated in FIGS. 77 to 83, but showing the second or additional operating member returned to the initial or rest position with the first pulling pawl resting on the first cam member formed by the first pulling ratchet with the first pulling ratchet in the eleventh gear stage or position and the second control body in the top position.

The releasing operation performed by the first operating member 30 is illustrated in FIGS. 24 to 76, while the pulling operation performed by the second operating member 34 is illustrated in FIGS. 77 to 84. More specifically, FIGS. 24 to 58 illustrate release operations from the eleventh position to the first position of the first cable control body 22 with the second cable control body 24 being switched from the low position to the top position at the eighth position of the first cable control body 22. FIGS. 59 to 62 illustrate a single continuous release operation from the eleventh position to the eighth position of the first cable control body 22 with the second cable control body 24 being in the top position. FIGS. 63 to 67 illustrate a release operation from the eleventh position to the eighth position of the first cable control body 22 with the second cable control body 24 being in the low position. FIGS. 68 to 72 illustrate a release operation of the second cable control body 24 from the low position to the top position while the first cable control body 22 remains in the eighth position. FIGS. 73 to 76 illustrate a single continuous release operation from the tenth position to the eighth position of the first cable control body 22 with the second cable control body 24 being in the low position. FIGS. 77 to 80 illustrate a pulling operation that moves the first cable control body 22 from the ninth position of the first cable control body 22 to the eleventh position of the first cable control body 22 while the second cable control body 24 is in the top position. FIGS. 78 to 84 illustrate a pulling operation that moves the second cable control body 24 from the top position to the low position while the first cable control body 22 remains in the eleventh position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle operating device comprising:
a base member;
a first cable control body movably mounted to the base member, and including a first cable attachment structure;

a first positioning mechanism operatively coupled to the first cable control body to selectively maintain the first cable control body in one of a plurality of first predetermined positions;

a second cable control body movably mounted to the base member, and including a second cable attachment structure;

a second positioning mechanism operatively coupled to the second cable control body to selectively maintain the second cable control body in one of a plurality of second predetermined positions;

an operating member movably arranged between an initial position and an operated position; and an input mechanism operatively coupling the operating member to the first and second cable control bodies to move the first cable control body between the first predetermined positions and the second cable control body between the second predetermined positions in accordance with a predetermined operation sequence that includes a changing point to change operation from the first cable control body to the second cable control body, the input mechanism being configured to move the first cable control body by at least two of the first predetermined positions in a single continuous operation of the operating member from the initial position to the operated position to perform a multiple movement operation, the input mechanism including a restricting structure configured to prohibit movement of the first cable control body at the changing point such that the first cable control body is not moved over the changing point during the single continuous operation.

2. The bicycle operating device according to claim 1, wherein
the input mechanism includes a pulling pawl structure that selectively engages the first cable control body and the second cable control body, and does not change engagement between the first cable control body and the second cable control body during the single continuous operation.

3. The bicycle operating device according to claim 2, wherein
the pulling pawl structure is configured to change the engagement from the first cable control body to the second cable control body in a state where the operating member returns from the operated position to the initial position at the changing point.

4. The bicycle operating device according to claim 3, wherein
the input mechanism includes a first cam member that changes the engagement of the pulling pawl structure from the first cable control body to the second cable control body.

5. The bicycle operating device according to claim 4, wherein
the first cam member is configured to move together with the one of the first cable control body and the second cable control body as the operating member moves from the initial position to the operated position.

6. The bicycle operating device according to claim 2, wherein
the pulling pawl structure is configured to change the engagement from the first cable control body to the second cable control body at an end position of the first predetermined positions of the first cable control body.

7. The bicycle operating device according to claim 1, wherein
the restricting structure includes a stopper configured to stop the operation of the operating member toward the operated position at the changing point.

8. The bicycle operating device according to claim 7, wherein
the stopper includes a first abutment that abuts a part that moves together with the first operating member at the changing point to prohibit movement of the first cable control body over the changing point as the operating member starts to be operated from a first predetermined point toward the changing point in the single continuous operation, the first predetermined point is adjacent to the changing point in the predetermined operation sequence.

9. The bicycle operating device according to claim 8, wherein
the stopper includes a second abutment that abuts a part at the changing point to prohibit movement of the first cable control body over the changing point as the operating member starts to be operated from a second predetermined point toward the changing point in the single continuous operation, the second predetermined point is away from the changing point than the first predetermined point in the predetermined operation sequence.

10. The bicycle operating device according to claim 9, wherein
the restricting structure does not restrict the operating member as the operating member starts to be operated from a third predetermined point toward the changing point during the multiple movement operation, the third predetermined point is away from the changing point than the second predetermined point in the predetermined operation sequence.

11. The bicycle operating device according to claim 7, wherein
the restricting structure includes a second cam member configured to change a position of the stopper between an abutting position and a non-abutting position.

12. The bicycle operating device according to claim 11, wherein
the second cam member is moved by at least one of the first cable control body and the second cable control body.

13. The bicycle operating device according to claim 7, wherein
the operating member is configured to release the first cable control body and the second cable control body to move in a cable release direction.

14. The bicycle operating device according to claim 13, wherein
the changing point corresponds to an intermediate position of the first predetermined positions.

15. The bicycle operating device according to claim 1, further comprising
an additional operating member movably arranged between an additional initial position and an additional operated position, and operatively coupled to the input mechanism to move the first cable control body between the first predetermined positions and the second cable control body between the second predetermined positions in accordance with the predetermined operation sequence.

16. The bicycle operating device according to claim 15, wherein one of the operating member and the additional operating member is a cable pulling lever and the other of the operating member and the additional operating member is a cable releasing lever.

17. The bicycle operating device according to claim 1, wherein
the first positioning mechanism includes a first positioning pawl and a first positioning ratchet, the first positioning ratchet being coupled to the first cable control body; and
the second positioning mechanism includes a second positioning pawl and a second positioning ratchet, the second positioning ratchet being coupled to the second cable control body.

* * * * *